US007167253B2

(12) United States Patent
Endoh et al.

(10) Patent No.: US 7,167,253 B2
(45) Date of Patent: Jan. 23, 2007

(54) INFORMATION PROCESSING APPARATUS, INFORMATION PROCESSING METHOD, INFORMATION PROCESSING SYSTEM, AND STORAGE MEDIUM FOR STORING INFORMATION PROCESSING PROGRAM

(75) Inventors: Tomoaki Endoh, Ichikawa (JP); Mamoru Osada, Kawasaki (JP); Takashi Inoue, Yokohama (JP); Yasuhiko Sasaki, Tokyo (JP); Kan Torii, Tokyo (JP); Naoko Shimotai, Kawasaki (JP); Tomoko Takagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 739 days.

(21) Appl. No.: 10/650,704

(22) Filed: Aug. 29, 2003

(65) Prior Publication Data

US 2004/0042030 A1 Mar. 4, 2004

Related U.S. Application Data

(62) Division of application No. 09/383,966, filed on Aug. 26, 1999, now Pat. No. 6,636,903.

(30) Foreign Application Priority Data

Aug. 28, 1998 (JP) ................................ 10-243429
Jul. 29, 1999 (JP) ................................ 11-215404

(51) Int. Cl.
*G06F 15/00* (2006.01)
*G06K 15/00* (2006.01)

(52) U.S. Cl. .................................... 358/1.14; 358/1.15

(58) Field of Classification Search ................ 358/1.1, 358/1.9, 1.13, 1.15, 1.18, 401, 402, 448, 358/501; 709/201, 203
See application file for complete search history.

(56) References Cited

U.S. PATENT DOCUMENTS

| | | | | |
|---|---|---|---|---|
| 5,299,296 | A * | 3/1994 | Padalino et al. | 358/1.13 |
| 5,768,483 | A * | 6/1998 | Maniwa et al. | 358/1.15 |
| 5,935,217 | A | 8/1999 | Sakai et al. | 709/249 |
| 6,003,065 | A | 12/1999 | Yan et al. | 709/200 |
| 6,058,249 | A * | 5/2000 | Matsuda et al. | 358/1.14 |
| 6,104,499 | A | 8/2000 | Yamada | 358/1.15 |
| 6,202,092 | B1 | 3/2001 | Takimoto | 709/225 |
| 6,209,048 | B1 | 3/2001 | Wolff | 707/501.1 |
| 6,292,267 | B1 | 9/2001 | Mori et al. | 358/1.15 |
| 6,321,266 | B1 | 11/2001 | Yokomizo et al. | 709/226 |
| 6,535,932 | B1 | 3/2003 | Endoh et al. | 710/7 |
| 6,636,903 | B1 * | 10/2003 | Endoh et al. | 710/8 |

FOREIGN PATENT DOCUMENTS

| | | |
|---|---|---|
| EP | 0 858 026 A1 | 8/1998 |
| EP | 0 859 309 A2 | 8/1998 |

* cited by examiner

*Primary Examiner*—Gabriel I. Garcia
(74) *Attorney, Agent, or Firm*—Fitzpatrick, Cella, Harper & Scinto

(57) ABSTRACT

There is provided an information processing apparatus which is easy for a user to operate. In the information processing apparatus, it is judged based on a function obtained from a peripheral whether or not a job script can be issued to the peripheral, and a job issuance processing is controlled in accordance with a judgment result.

12 Claims, 72 Drawing Sheets

FIG. 7

Attribute Table (Supervisor)

701 702 703

| Attribute ID | Type ID | Value |
|---|---|---|
| 10 | 1 | 0 |
| 11 | 1 | 0 |
| 100 | 11 | 10, 11, 100, 101 ,102 , 103, 104, 105, · · · |
| 101 | 11 | 1, 2, 3, 7, 9 |
| 102 | 11 | 1, 3 |
| 103 | 1 | 1 |
| 104 | 11 | 1001, 1002, 1003, 1004 |
| 105 | 11 | 1003 |
| 301 | 3 | "SuperMFP-1" |
| 302 | 13 | "Japanese", "English" |
| 303 | 1 | "English" |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| 503 | 53 | Table Data |
| ⋮ | ⋮ | ⋮ |
| 1001 | 101 | Table Data |
| 1002 | 102 | Table Data |
| 1003 | 103 | Table Data |
| 1004 | 104 | Table Data |
| 2001 | 11 | 21, 22, 23, 24 |

FIG. 8

- This shows Supervisor's Attributes
- Client has been informed of Meaning of Attribute ID

- Attribute ID

| | |
|---|---|
| 10 | TaskType |
| 11 | Service ID |
| 100 | List of Attribute ID |
| 101 | Supported Operation |
| 102 | Supported Security Level |
| 103 | Current Security Level |
| 104 | List of Attributes that can be changed only by Manager |
| 105 | List of Attributes that can be obtained only by Manager |
| 301 | Machine Type |
| 302 | Supported Language |
| 303 | Current Language |
| 401 | Current Count Data |
| 402 | Count Data Format |
| 403 | Count Limit Data |
| 404 | Count Unit Price Data |
| 405 | Current Charge Data |
| 406 | Charge Limit Data |
| 501 | List of Supported Events |
| 502 | Event Setting Table |
| 503 | Event Format Table |
| 1001 | SubAddress-SID Table |
| 1002 | SID-TaskType Table |
| 1003 | User Authentication Table |
| 1004 | Access Limit Table |
| 2001 | List of Controller ID |

- Type ID

| | |
|---|---|
| 0 | Boolean |
| 1 | Integer |
| 2 | Real Number |
| 3 | CHR Train |
| 11 | List of Integers |
| 12 | List of Real Numbers |
| 13 | List of CHR Trains |
| 52 | Event Setting Table Type |
| 53 | Event Format Table Type |
| 101 | SUbAddress-SID Table Type |
| 102 | SID-TaskType Table Type |
| 103 | User Authentication Table Type |
| 104 | Access Control Table Type |

FIG. 9

SubAddress-Service ID Table 801 802 803 804 805 806

| Connection Type ID | SubAddress | Service ID | Valid Flag | Valid User | Invalid User |
|---|---|---|---|---|---|
| 0 | 0 | 0 | YES | | |
| 0 | 1 | 1 | YES | 2355,5678 | |
| 0 | 2 | 2 | YES | | 1234,2345 |
| ⋮ | ⋮ | ⋮ | ⋮ | ⋮ | ⋮ |
| 1 | 9600 | 0 | YES | | |
| 1 | 9601 | 1 | YES | | |
| 1 | 9602 | 2 | YES | 1234,2345 | |
| ⋮ | ⋮ | ⋮ | ⋮ | ⋮ | ⋮ |
| 1 | 8001 | 101 | YES | 1234 | |
| 1 | 8002 | 102 | YES | | |
| ⋮ | ⋮ | ⋮ | ⋮ | ⋮ | ⋮ |
| 2 | 45 | 0 | YES | | |
| 2 | 46 | 1 | YES | | |
| 2 | 47 | 2 | YES | | |
| ⋮ | ⋮ | ⋮ | ⋮ | ⋮ | ⋮ |
| 2 | 68 | 8 | NO | | |
| 2 | 89 | 10 | YES | | |
| ⋮ | ⋮ | ⋮ | ⋮ | ⋮ | ⋮ |
| 3 | 23 | 0 | YES | | |
| 3 | 52 | 1 | YES | | |
| ⋮ | ⋮ | ⋮ | ⋮ | ⋮ | ⋮ |
| 3 | 98 | 17 | YES | | |

FIG. 10

- This shows to which SubAddress a Job is to be placed
- This also manages validity/invalidity of Connection Type
- Connection Type ID 0 : Internal
  1 : TCP/IP
  2 : IEEE1284.4
  3 : SBB-2

FIG. 11

Service ID-TaskType Table 901 902

| Service ID | Task Type |
|---|---|
| 0 | 0 |
| 1 | 1 |
| 2 | 1 |
| 3 | 1 |
| 4 | 1 |
| 5 | 1 |
| 6 | 1 |
| 7 | 1 |
| 8 | 1 |
| 9 | 1 |
| 10 | 2 |
| 11 | 3 |
| 12 | 3 |
| 13 | 3 |
| 14 | 3 |
| 15 | 3 |
| 16 | 3 |
| 17 | 3 |
| 18 | 3 |
| 101 | 101 |
| 102 | 102 |
| 103 | 103 |
| 104 | 104 |
| 21 | 201 |
| 22 | 201 |
| 23 | 201 |
| 24 | 202 |

FIG. 12

- This shows Service Type of Service ID
- Task Type corresponds to CPCA Task Type
- This is referred to also by Dispatcher and used also to distribute Command to each Manger
- TaskType 0 : Supervisor
  1 : Print
  2 : Scan
  3 : Copy
  101 : Font
  102 : Form Overlay
  103 : Log
  104 : Color Profile

FIG. 13

User Authentication Table

| UID (1001) | Password (1002) | Manager (1003) |
|---|---|---|
| 2355 | 2345 | NO |
| 3254 | 2223 | NO |
| 4665 | 1145 | YES |
| ⋮ | ⋮ | ⋮ |
| 2664 | 1244 | NO |

FIG. 14

Access Control Table 1101 1102 1103

| SID | Security Level | UID |
|---|---|---|
| 0 | 1 | - |
| 1 | 1 | - |
| 2 | 2 | 2355, 3254 |
| 3 | 3 | 3254, 4665 |
| ⋮ | ⋮ | ⋮ |
| 102 | 2 | 3254 |

FIG. 15

- This shows Security Level for each Service
- Security Level
  - 0 : Discriminate nothing
  - 1 : Discriminate Manager only
  - 2 : Available for authenticated User only (only UID is used for Authentication)
  - 3 : Available for authenticated User only (UID and Password are used for Authentication)
- UID Trains are used only when Security Level is 2 or 3

FIG. 16

Event Setting Table (Supervisor)

1201 1202 1203

| Event ID | Connection Type ID | Addressee |
|---|---|---|
| 200 | 0 | |
| 399 | 1 | 123, 222, 111, 321 : 9340 |
| 432 | 2 | 35 |
| 234 | 3 | 12 |

FIG. 17

Event Format Table 1301 1302

| Event ID | Event Format |
|---|---|
| 200 | 676, 756 |
| 399 | 666 |
| 432 | 698 |
| 234 | 600 |

FIG. 18

Attribute Table (Print Job Manager)

1401 1402 1403

| Attribute ID | Type ID | Value |
|---|---|---|
| 10 | 1 | 1 |
| 11 | 1 | 4 |
| 100 | 11 | 10, 11, 100, 101 ,104 , 401,· · · |
| 101 | 11 | 11, 14, 15, 17 |
| 104 | 11 | 1104, 1105 |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| 601 | 11 | 1, 2 |
| 801 | 81 | 4354:3254, 2464, 2456, 4356:124, 535, 6 |
| 802 | 82 | 3254:1:4324:43143, 2342, 6543, 3245 |
| 803 | 83 | 5425:2:25432:34324:2:12453, 3424, 2343 |
| 804 | 84 | 5425:2:25432:4:5425:5:655:2435, 563 |
| 805 | 85 | 22414:3:4324231:5:43243:2:32144:455 |
| ⋮ | ⋮ | ⋮ |
| 1101 | 11 | 3, 5 |
| 1102 | 0 | NO |
| 1103 | 11 | 1, 2 |
| 1104 | 1 | 400 |
| 1105 | 1 | 100 |
| 2001 | 11 | 21, 22 |
| 2002 | 0 | NO |
| 2003 | 203 | Table Data |
| 2004 | 204 | Table Data |

FIG. 19

- This shows Print Manager's Attributes
- Client has been informed of Meaning of Attribute ID

- Attribute ID

| | |
|---|---|
| 10 | TaskType |
| 11 | Service ID |
| 100 | List of Attribute ID |
| 101 | Supported Operation (Job Script) |
| 104 | List of Attributes that can be changed only by Manager |
| 401 | Current Count Data |
| 402 | Count Data Format |
| 403 | Count Limit Data |
| 404 | Count Unit Price Data |
| 405 | Current Charge Data |
| 406 | Charge Limit Data |
| 501 | List of Supported Events |
| 502 | Event Setting Table |
| 601 | Download Method for Supported Data |
| 801 | List of Attribute Combinations Inhibited (Type 1) |
| 802 | List of Attribute Combinations Inhibited (Type 2) |
| 803 | List of Attribute Combinations Inhibited (Type 3) |
| 804 | List of Attribute Combinations Inhibited (Type 4) |
| 805 | List of Attribute Combinations Inhibited (Type 5) |
| 1101 | List of Supported PDL |
| 1102 | Color Print Possible |
| 1103 | Type of Supported Finishing |
| 1104 | Highest Resolution |
| 1105 | Lowest Resolution |
| 2001 | List of Controller ID Executing Job |
| 2002 | Controller Auto Selection Possible |
| 2003 | Job Table |
| 2004 | Job Request Table |

- Type ID

| | |
|---|---|
| 0 | Boolean |
| 1 | Integer |
| 2 | Real Number |
| 3 | CHR Train |
| 11 | List of Integers |
| 12 | List of Real Numbers |
| 13 | List of CHR Trains |
| 52 | Event Setting Table Type |
| 81 | Type of Inhibited Attribute Combination List 1 |
| 82 | Type of Inhibited Attribute Combination List 2 |
| 83 | Type of Inhibited Attribute Combination List 3 |
| 203 | Job Table Type |
| 204 | Job Request Table Type |

FIG. 20

Job Table 1501 1502

| Job ID | Job File Name |
|---|---|
| 1 | P0001 |
| 2 | P1001 |
| 3 | P2001 |

FIG. 21

Job Request Table 1503 1504 1505

| Job ID | Control ID | Job ID |
|---|---|---|
| 1 | 21 | 100 |
| 1 | 22 | 101 |
| 2 | 21 | 102 |
| 2 | 22 | 403 |
| 3 | - | - |
| | | |
| | | |

FIG. 22

Attribute Table (Scan Job Maneger)

1601 1602 1603

| Attribute ID | Type ID | Value |
|---|---|---|
| 10 | 1 | 2 |
| 11 | 1 | 10 |
| 100 | 11 | 10, 11, 100, 101 ,104, 401, ··· |
| 101 | 11 | 21, 22, 25, 29, |
| 104 | 11 | 602 |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| 602 | 11 | 1, 2 |
| ⋮ | ⋮ | ⋮ |
| 1201 | 11 | 3, 5 |
| 1202 | 0 | YES |
| 1203 | 11 | 100, 200, 300, 400 |
| 2001 | 11 | 24 |
| 2002 | 0 | NO |
| 2003 | 203 | Table Data |

FIG. 23

- This shows Scan Manager's Attributes
- Client has been informed of Meaning of Attribute ID

- Attribute ID

| | |
|---|---|
| 10 | TaskType |
| 11 | Service ID |
| 100 | List of Attribute ID |
| 101 | Supported Operation (Job Script) |
| 104 | List of Attributes that can be changed only by Manager |
| 401 | Current Count Data |
| 402 | Count Data Format |
| 403 | Count Limit Data |
| 404 | Count Unit Price Data |
| 405 | Current Charge Data |
| 406 | Charge Limit Data |
| 501 | List of Supported Events |
| 502 | Event Setting Table |
| 602 | Upload Method for Supported Data |
| 1201 | List of Supported Image Formats |
| 1202 | Color Scan Possible |
| 1203 | List of Available Resolutions |
| 2001 | List of Controller ID Executing Job |
| 2002 | Controller Auto Selection Possible |
| 2003 | Job Table |

- Type ID

| | |
|---|---|
| 0 | Boolean |
| 1 | Integer |
| 2 | Real Number |
| 3 | CHR Train |
| 11 | List of Integers |
| 12 | List of Real Numbers |
| 13 | List of Trains |
| 52 | Event Setting Table Type |
| 203 | Job Table Method |

FIG. 24

Attribute Table (Copy Job Manger)

1701 1702 1703

| Attribute ID | Type ID | Value |
|---|---|---|
| 10 | 1 | 3 |
| 11 | 1 | 18 |
| 100 | 11 | 10, 11, 100, 101 ,104, 401, ··· |
| 101 | 11 | 31, 32, 35 |
| 104 | 11 | 1304, 1305 |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| ⋮ | ⋮ | ⋮ |
| 1302 | 0 | NO |
| 1303 | 11 | 1, 2 |
| 1304 | 1 | 400 |
| 1305 | 1 | 100 |
| 2001 | 11 | 21, 22, 23, 24 |
| 2002 | 0 | YES |
| 2003 | 203 | Table Data |

FIG. 25

- This shows Copy Manager's Attributes
- Client has been informed of Meaning of Attribute ID

- Attribute ID

| | |
|---|---|
| 10 | TaskType |
| 11 | Service ID |
| 100 | List of Attribute ID |
| 101 | Supported Operation (Job Script) |
| 104 | List of Attributes that can be changed only by Manager |
| 401 | Current Count Data |
| 402 | Count Data Format |
| 403 | Count Limit Data |
| 404 | Count Unit Price Data |
| 405 | Current Charge Data |
| 406 | Charge Limit Data |
| 501 | List of Supported Events |
| 502 | Event Setting Table |
| 1302 | Color Print Possible |
| 1303 | Type of Supported Finishing |
| 1304 | Highest Resolution |
| 1305 | Lowest Resolution |
| 2001 | List of Controller ID Executing Job |
| 2002 | Controller Auto Selelction Possible |
| 2003 | Job Table |

- Type ID

| | |
|---|---|
| 0 | Boolean |
| 1 | Integer |
| 2 | Real Number |
| 3 | CHR Train |
| 11 | List of Integers |
| 12 | List of Real Numbers |
| 13 | List of CHR Trains |
| 52 | Event Setting Table Type |
| 203 | Job Request Table Type |

FIG. 26

Attribute Table (Font Manager)

1801 1802 1803

| Attribute ID | Type ID | Value |
|---|---|---|
| 10 | 1 | 101 |
| 11 | 1 | 101 |
| 100 | 11 | 10, 11, 100, 101 ,104, 401, · · · |
| 101 | 11 | 110, 111, 112, |
| 104 | 11 | |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| 601 | 11 | 1, 2 |
| 602 | 11 | 1, 2 |
| ⋮ | ⋮ | ⋮ |
| 1501 | 11 | 3, 5 |
| 1502 | 1 | 10 |
| 1503 | 1 | 3 |
| 1504 | 150 | Table Data |

FIG. 27

- This shows Font Manager's Attributes
- Client has been informed of Meaning of Attribute ID

- Attribute ID

| | |
|---|---|
| 10 | TaskType |
| 11 | Service ID |
| 100 | List of Attribute ID |
| 101 | Supported Operation (Resource Script) |
| 104 | List of Attributes that can be changed only by Manager |
| 401 | Current Count Data |
| 402 | Count Data Format |
| 403 | Count Limit Data |
| 404 | Count Unit Price Data |
| 405 | Current Charge Data |
| 406 | Charge Limit Data |
| 501 | List of Supported Events |
| 502 | Event Setting Table |
| 601 | Download Method for Supported Data |
| 602 | Upload Method for Supported Data |
| 1501 | List of Supported Font Types |
| 1502 | Max No. of Retainable Fonts |
| 1503 | No. of Currently Retained Fonts |
| 1504 | List of Retained Fonts |

- Type ID

| | |
|---|---|
| 0 | Boolean |
| 1 | Integer |
| 2 | Real Number |
| 3 | CHR Train |
| 11 | List of Integers |
| 12 | List of Real Numbers |
| 13 | List of Trains |
| 52 | Event Setting Table Type |
| 150 | Font Table |

FIG. 28

Font Table 1901 1902 1902 1903

| Font ID | Font Type | Font Name | Font Data File Name |
|---|---|---|---|
| 1 | 1 | Gothic | 1500 |
| 2 | 2 | Times | 1501 |
| 3 | 1 | Helvetica | 1502 |
| | | | |
| | | | |
| | | | |
| | | | |
| | | | |
| | | | |

FIG. 29

Attribute Table (Form Overlay Manager)

2001 2002 2003

| Attribute ID | Type ID | Value |
|---|---|---|
| 10 | 1 | 102 |
| 11 | 1 | 102 |
| 100 | 11 | 10, 11, 100, 101 ,104, 401 · · · |
| 101 | 11 | 110, 111, 112, |
| 104 | 11 | |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| 601 | 11 | 1, 2 |
| 602 | 11 | 1, 2 |
| ⋮ | ⋮ | ⋮ |
| 1601 | 11 | 1, 2 |
| 1602 | 1 | 10 |
| 1603 | 1 | 3 |
| 1604 | 160 | Table Data |

FIG. 30

- This shows Form Overlay Manager's Attributes
- Client has been informed of Meaning of Attribute ID

- Attribute ID

| | |
|---|---|
| 10 | TaskType |
| 11 | Service ID |
| 100 | List of Attribute ID |
| 101 | Supported Operation (Resource Script) |
| 104 | List of Attributes that can be changed only by Manager |
| 401 | Current Count Data |
| 402 | Count Data Format |
| 403 | Count Limit Data |
| 404 | Count Unit Price Data |
| 405 | Current Charge Data |
| 406 | Charge Limit Data |
| 501 | List of Supported Events |
| 502 | Event Setting Table |
| 601 | Download Method for Supported Data |
| 602 | Upload Method for Supported Data |
| 1601 | List of Supported Formats |
| 1602 | Max No. of Retainable Forms |
| 1603 | No. of Currently Retained Forms |
| 1604 | List of Retained Forms |

- Type ID

| | |
|---|---|
| 0 | Boolean |
| 1 | Integer |
| 2 | Real Number |
| 3 | CHR Train |
| 11 | List of Integers |
| 12 | List of Real Numbers |
| 13 | List of Trains |
| 52 | Event Setting Table Type |
| 160 | Form Table |

FIG. 31

Form Table 2101 2102 2103 2104

| Form ID | Format | Form Name | Form Data File Name |
|---|---|---|---|
| 1 | 1 | Confidential | 1600 |
| 2 | 2 | Reference | 1601 |
| 3 | 1 | Logo | 1602 |
| | | | |
| | | | |
| | | | |
| | | | |
| | | | |
| | | | |

FIG. 32

Attribute Table (Log Manager)

2201 2202 2203

| Attribute ID | Type ID | Value |
|---|---|---|
| 10 | 1 | 103 |
| 11 | 1 | 103 |
| 100 | 11 | 10, 11, 100, 101 ,104, 401 · · · |
| 101 | 11 | 110, 111, 112, |
| 104 | 11 | |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| 602 | 11 | 1, 2 |
| ⋮ | ⋮ | ⋮ |
| 1703 | 1 | 3 |
| 1704 | 170 | Table Data |
| 1705 | 171 | Table Data |

FIG. 33

- This shows Log Manager's Attributes
- Client has been informed of Meaning of Attribute ID

- Attribute ID

| | |
|---|---|
| 10 | TaskType |
| 11 | Service ID |
| 100 | List of Attribute ID |
| 101 | Supported Operation (Resource Script) |
| 104 | List of Attributes that can be changed only by Manager |
| 401 | Current Count Data |
| 402 | Count Data Format |
| 403 | Count Limit Data |
| 404 | Count Unit Price Data |
| 405 | Current Charge Data |
| 406 | Charge Limit Data |
| 501 | List of Supported Events |
| 502 | Event Setting Table |
| 602 | Upload Method for Supported Data |
| 1703 | No. of Retained Logs |
| 1704 | List of Retained Logs |
| 1705 | Log Format Table |

- Type ID

| | |
|---|---|
| 0 | Boolean |
| 1 | Integer |
| 2 | Real Number |
| 3 | CHR Train |
| 11 | List of Integers |
| 12 | List of Real Numbers |
| 13 | List of Trains |
| 52 | Event Setting Table Type |
| 170 | Log Table |
| 171 | Log Format Table Type |

FIG. 34

Log Table 2301 2302

| Log ID | Log Data File Name |
|---|---|
| 1 | 1700 |
| 2 | 1701 |
| 3 | 1702 |
| | |
| | |
| | |
| | |
| | |
| | |

FIG. 35

Contents of Log Data (File Name : 1700)

2401 2402 2403

| Log Format ID | Date / Time | Value |
|---|---|---|
| 1 | 98 / 1/3 1 : 23 | 12345, 4, 1.23, "OK" |
| 2 | 98 / 1/3 1 : 25 | 22345, 12, 4.22, "OK" |
| 1 | 98 / 1/3 1 : 43 | 98763, 11, 3.45, "Canceled" |
| 2 | 98 / 1/3 2 : 33 | 77623, 5, 1.44, "NG" |
| 1 | 98 / 1/3 3 : 32 | 12346, 5, 1.66, "OK" |

FIG. 36

Log Format Table 2501 2502

| Log Format ID | Format |
|---|---|
| 1 | 1 : 701, 1 : 565, 1 : 765, 1 :777 |
| 2 | 11 : 701, 11 : 565, 11 : 765, 11 :777 |

FIG. 37

Attribute Table (Color Profile Manager)

2601 2602 2603

| Attribute ID | Type ID | Value |
|---|---|---|
| 10 | 1 | 104 |
| 11 | 1 | 104 |
| 100 | 11 | 10, 11, 100, 101 ,104, 401, ··· |
| 101 | 11 | 110, 111, 112, |
| 104 | 11 | |
| ⋮ | ⋮ | |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| 601 | 11 | 1, 2 |
| 602 | 11 | 1, 2 |
| ⋮ | ⋮ | |
| 1801 | 11 | 3, 5 |
| 1802 | 1 | 10 |
| 1803 | 1 | 3 |
| 1804 | 180 | Table Data |

FIG. 38

- This shows Color Profile Manager's Attributes
- Client has been informed of Meaning of Attribute ID

- Attribute ID

| | |
|---|---|
| 10 | TaskType |
| 11 | Service ID |
| 100 | List of Attribute ID |
| 101 | Supported Operation (Resource Script) |
| 104 | List of Attributes that can be changed only by Manager |
| 401 | Current Count Data |
| 402 | Count Data Format |
| 403 | Count Limit Data |
| 404 | Count Unit Price Data |
| 405 | Current Charge Data |
| 406 | Charge Limit Data |
| 501 | List of Supported Events |
| 502 | Event Setting Table |
| 601 | Download Method for Supported Data |
| 602 | Upload Method for Supported Data |
| 1801 | List of Supported Formats |
| 1802 | Max No. of Retainable Profiles |
| 1803 | No. of Currently Retained Profiles |
| 1804 | List of Retained Profiles |

- Type ID

| | |
|---|---|
| 0 | Boolean |
| 1 | Integer |
| 2 | Real Number |
| 3 | CHR Train |
| 11 | List of Integers |
| 12 | List of Real Numbers |
| 13 | List of Trains |
| 52 | Event Setting Table Type |
| 180 | Profile Table |

FIG. 39

Color Profile Table 2701 2702 2703

| Profile ID | Format | Profile Data File Name |
|---|---|---|
| 1 | 3 | 1800 |
| 2 | 5 | 1801 |
| 3 | 3 | 1802 |
| | | |
| | | |
| | | |
| | | |
| | | |
| | | |

FIG. 40

Attribute Table (Printer Controller)

2801 2802 2803

| Attribute ID | Type ID | Value |
|---|---|---|
| 12 | 1 | 1 |
| 13 | 1 | 21 |
| 100 | 11 | 12, 13, 104 ··· |
| 104 | 11 | |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| ⋮ | ⋮ | ⋮ |
| 5001 | 0 | NO |
| 5002 | 11 | 1, 2, 3 |
| 5003 | 1 | 1200 |
| 5004 | 1 | 100 |
| 5005 | 500 | Table Data |

FIG. 41

- This shows Printer Controller's Attributes
- Client has been informed of Meaning of Attribute ID

- Attribute ID

| | |
|---|---|
| 12 | Controller Type |
| 13 | Controller ID |
| 100 | List of Attribute ID |
| 104 | List of Attributes that can be changed only by Manager |
| 401 | Current Count Data |
| 402 | Count Data Format |
| 403 | Count Limit Data |
| 404 | Count Unit Price Data |
| 405 | Current Charge Data |
| 406 | Charge Limit Data |
| 501 | List of Supported Events |
| 502 | Event Setting Table |
| 5001 | Color Print Possible |
| 5002 | Type of Supported Finishing |
| 5003 | Highest Resolution |
| 5004 | Lowest Resolution |
| 5005 | Job Queue Table |

- Type ID

| | |
|---|---|
| 0 | Boolean |
| 1 | Integer |
| 2 | Real Number |
| 3 | CHR Train |
| 11 | List of Integers |
| 12 | List of Real Numbers |
| 13 | List of CHR Trains |
| 52 | Event Setting Table Type |
| 500 | Job Queue Table Type |

FIG. 42

Job Queue Table 2901 2902 2903

| Job ID | Status | File Name |
|---|---|---|
| 100 | 1 | C100 |
| 101 | 2 | C101 |
| 102 | 3 | C102 |
| 103 | 3 | C103 |
| 104 | 3 | C104 |
| 105 | 3 | C105 |
| | | |

FIG. 43

- List of Job Being Executed and on Standby in Printer Controller
- Status

1 : Executed
  2 : Being Executed by Engine
  3 : On Standby

FIG. 44

Attribute Table (Scanner Controller)

3001 3002 3003

| Attribute ID | Type ID | Value |
|---|---|---|
| 12 | 1 | 2 |
| 13 | 1 | 24 |
| 100 | 11 | 12, 13, 104 · · · |
| 104 | 11 | |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | Table Data |
| ⋮ | ⋮ | ⋮ |
| 6001 | 0 | YES |
| 6002 | 12 | 200.00, 300.00 |
| 6003 | 1 | 1200 |
| 6004 | 1 | 100 |

FIG. 45

- This shows Scanner Controller's Attributes
- Client has been informed of Meaning of Attribute ID

- Attribute ID

| | |
|---|---|
| 12 | Controller Type |
| 13 | Controller ID |
| 100 | List of Attribute ID |
| 104 | List of Attributes that can be changed only by Manager |
| 401 | Current Count Data |
| 402 | Count Data Format |
| 403 | Count Limit Data |
| 404 | Count Unit Price Data |
| 405 | Current Charge Data |
| 406 | Charge Limit Data |
| 501 | List of Supported Events |
| 502 | Event Setting Table |
| 6001 | Color Scan Possible |
| 6002 | Max Original Size |
| 6003 | Highest Resolution |
| 6004 | Lowest Resolution |

- Type ID

| | |
|---|---|
| 0 | Boolean |
| 1 | Integer |
| 2 | Real Number |
| 3 | CHR Train |
| 11 | List of Integers |
| 12 | List of Real Numbers |
| 13 | List of CHR Trains |
| 52 | Event Setting Table Type |

FIG. 76

| |
|---|
| DISK315 |
| UI Driver401 |
| Network Interface Driver402 |
| IEEE1284 Interface Driver403 |
| IEEE1394 Interface Driver404 |
| User Interface Manager405 |
| TCP/IP,UDP/IP Module406 |
| IEEE1284.4 Module407 |
| SBP-2 Module408 |
| Interpreter/Generator409 |
| Supervisor410 |
| Security Gate411 |
| Dispatcher412 |
| Font Manager413 |
| Form Overlay Manager414 |
| Log Manager415 |
| Color Profile Manager416 |
| PDL (PS) Rasterizer 417 |
| PDL (PCL) Rasterizer 418 |
| Scan Job Manager419 |
| Scan Controller420 |
| Print Job Manager501 |
| Print Job Manager502 |
| Print Job Manager503 |
| Print Job Manager504 |
| Print Job Manager505 |
| Print Job Manager506 |
| Print Job Manager507 |
| Print Job Manager508 |
| Print Job Manager509 |
| LBT Controller510 |
| LBT Controller511 |
| Inkjet Controller512 |
| Copy Job Manager601 |
| Copy Job Manager602 |
| Copy Job Manager603 |
| Copy Job Manager604 |
| Copy Job Manager605 |
| Copy Job Manager606 |
| Copy Job Manager607 |
| Copy Job Manager608 |
| Program Shown in Fig. 47 |
| Program Shown in Fig. 48 |
| Program Shown in Fig. 49 |
| Program Shown in Fig. 50 |
| Program Shown in Fig. 51 |
| Program Shown in Fig. 53 |
| Program Shown in Fig. 54 |
| Program Shown in Fig. 55 |
| Program Shown in Fig. 56 |
| Program Shown in Fig. 57 |
| Program Shown in Fig. 58 |
| Program Shown in Fig. 59 |
| Program Shown in Fig. 60 |
| Program Shown in Fig. 61 |
| Program Shown in Fig. 62 |
| Other Program and Data |

FIG. 77

| |
|---|
| DISK6009 |
| Database504 |
| Database502 |
| User I/F Program501 |
| Apparatus Information Obtaining Program503 |
| Printer Driver505 |
| Scanner Driver506 |
| Copy Driver507 |
| Font Management Utility508 |
| Form Management Utility509 |
| Log Management Utility 510 |
| Color Profile Management Utility511 |
| Job Management Utility512 |
| Apparatus Management Utility513 |
| Charge Management Utility514 |
| Interpreter/Generator515 |
| SBB-2 Module517 |
| IEEE1394 Interface Driver518 |
| TCP/IP,UDP/IP Module519 |
| Network Interface Driver520 |
| IEEE1284.4 Module521 |
| IEEE1284.4Interface Driver522 |
| Program Shown in Fig. 65 |
| Program Shown in Fig. 66 |
| Program Shown in Fig. 67 |
| Program Shown in Fig. 69 |
| Program Shown in Fig. 70 |
| Program Shown in Fig. 71 |
| Program Shown in Fig. 72 |
| Program Shown in Fig. 73 |
| Program Shown in Fig. 74 |
| Program Shown in Fig. 75 |
| Operation System |
| Document Editing Program |
| Other Program and Data |

FIG. 81

| Printer Driver A | | |
|---|---|---|
| Supported PDL | : | PDL1, PDL2 |
| Color | : | Not Available |
| Highest Resolution | : | 1200 dpi |
| Lowest Resolution | : | 600 dpi |

FIG. 82

| Printer Driver B | | |
|---|---|---|
| Supported PDL | : | PDL3 |
| Color | : | Available |
| Highest Resolution | : | 600 dpi |
| Lowest Resolution | : | 300 dpi |

INFORMATION PROCESSING APPARATUS, INFORMATION PROCESSING METHOD, INFORMATION PROCESSING SYSTEM, AND STORAGE MEDIUM FOR STORING INFORMATION PROCESSING PROGRAM

This application is a division of Application Ser. No. 09/383,966, filed on Aug. 26, 1999, now U.S. Pat. No. 6,636,903, the entire disclosure of which is incorporated herein by reference.

BACKGROUND OF THE INVENTION

1. Field of the Invention

The present invention relates to an information processing apparatus which controls peripherals such as a printer, a scanner, a facsimile machine, a copying machine, and the like via a network, IEEE 1394, and other connection forms and which issues jobs to the peripherals, an information processing method, an information processing system, and a storage medium in which an information processing program is stored.

2. Related Background Art

When jobs are issued to a printer, scanner, facsimile machine, and copying machine connected via a network, and the like from a host computer and these peripherals are managed, types, models, and the like of the peripherals are grasped beforehand, then peripheral control software (control programs) such as appropriate drivers suitable for the machine types, and the like need to be prepared in the host computer.

SUMMARY OF THE INVENTION

For example, a peripheral function in which a finisher can be designated only when the number of designated sheets is 99 or less in a printer is represented by a scholar amount "a value of n or less can be set to an attribute value A", and also determined by composite conditions as combinations of attribute values of a plurality of function attributes. In a prior art, these composite conditions cannot be grasped on the side of a host computer. Moreover, particularly, under an environment in which a large number of peripherals having various functions are connected via a network or the like, it is difficult to store the functions of these peripherals, data locations, data storage positions, and the like beforehand on the side of the host computer, and even a system configuration change cannot flexibly be handled.

Wherefore, an object of the present invention is to provide an information processing apparatus, an information processing method, an information processing system, and a storage medium in which an information processing program is stored, which are easy for a user to operate.

To attain the object, according to the present invention, there is provided an information processing apparatus for controlling a peripheral, comprising obtaining means for obtaining a function of the peripheral, judgment means for judging based on the function obtained by the obtaining means whether or not a job script can be issued to the peripheral, and control means for controlling a job issuance processing in accordance with a judgment result of the judgment means.

To attain the object, according to the present invention, there is provided an information processing method in an information processing apparatus for controlling a peripheral, comprising judging based on a function obtained from the peripheral whether or not a job script can be issued to the peripheral, and controlling a job issuance processing in accordance with a judgment result.

To attain the object, according to the present invention, there is provided a storage medium in which an information processing program to be executed by an information processing apparatus for controlling a peripheral is stored. The information processing program judges based on a function obtained from the peripheral whether or not a job script can be issued to the peripheral, and controls a job issuance processing in accordance with a judgment result.

To attain the object, according to the present invention, there is provided an information processing system provided with a peripheral and an information processing apparatus, comprising the peripheral having a plurality of functions, obtaining means for obtaining the functions from the peripheral, judgment means for judging based on the functions obtained by the obtaining means whether or not a job script can be issued to the peripheral and control means for controlling a job issuance processing in accordance with a judgment result of the judgment means.

BRIEF DESCRIPTION OF THE DRAWINGS

FIG. 7 is a diagram showing an attribute table of Supervisor 410 shown in FIG. 4.

FIG. 8 is a diagram showing meanings of attribute ID and type ID of the attribute table of FIG. 7.

FIG. 9 is a diagram showing a subaddress to service ID table.

FIG. 10 is a diagram showing meanings of connection type ID of FIG. 9.

FIG. 11 is a diagram showing a service ID to task type table.

FIG. 12 is a diagram showing meanings of task type ID of FIG. 11.

FIG. 13 is a diagram showing a user authentication table.

FIG. 14 is a diagram showing an access control table.

FIG. 15 is a diagram showing a security level.

FIG. 16 is a diagram showing an event setting table.

FIG. 17 is a diagram showing an event format table.

FIG. 18 is a diagram showing an attribute table of a print manager.

FIG. 19 is a diagram showing meanings of attribute ID and type ID of the attribute table shown in FIG. 18.

FIG. 20 is a diagram showing a job table.

FIG. 21 is a diagram showing a job request table.

FIG. 22 is a diagram showing an attribute table of a skin job manager.

FIG. 23 is a diagram showing meanings of attribute ID and type ID of the attribute table shown in FIG. 22.

FIG. 24 is a diagram showing an attribute table of a copy job manager.

FIG. 25 is a diagram showing meanings of attribute ID and type ID of the attribute table shown in FIG. 24.

FIG. 26 is a diagram showing an attribute table of a font manager.

FIG. 27 is a diagram showing meanings of attribute ID and type ID of the attribute table shown in FIG. 26.

FIG. 28 is a diagram showing a font table.

FIG. 29 is a diagram showing an attribute table of a form overlay manager.

FIG. 30 is a diagram showing meanings of attribute ID and type ID of the attribute table shown in FIG. 29.

FIG. 31 is a diagram showing a form overlay table.

FIG. 32 is a diagram showing an attribute table of a log manager.

FIG. 33 is a diagram showing meanings of attribute ID and type ID of the attribute table shown in FIG. 32.

FIG. 34 is a diagram showing a log table.

FIG. 35 is a diagram showing contents of log data.

FIG. 36 is a diagram showing a log format table.

FIG. 37 is a diagram showing an attribute table of a color profile manager.

FIG. 38 is a diagram showing meanings of attribute ID and type ID of the attribute table shown in FIG. 37.

FIG. 39 is a diagram showing a color profile table.

FIG. 40 is a diagram showing an attribute table of a printer controller.

FIG. 41 is a diagram showing meanings of attribute ID and type ID of the attribute table shown in FIG. 40.

FIG. 42 is a diagram showing a job queue table.

FIG. 43 is a diagram showing a status of FIG. 42.

FIG. 44 is a diagram showing an attribute table of a scanner controller.

FIG. 45 is a diagram showing meanings of attribute ID and type ID of the attribute table shown in FIG. 44.

FIG. 76 is a memory map of DISK 315 of MFP.

FIG. 77 is a memory map of DISK 6009 of Client PC.

FIG. 81 is a diagram showing a sample of a display screen displayed on a display.

FIG. 82 is a diagram showing a sample of the display screen displayed on the display.

DESCRIPTION OF PREFERRED EMBODIMENTS (Configuration of Multi-Function Peripheral)

Figure 1:
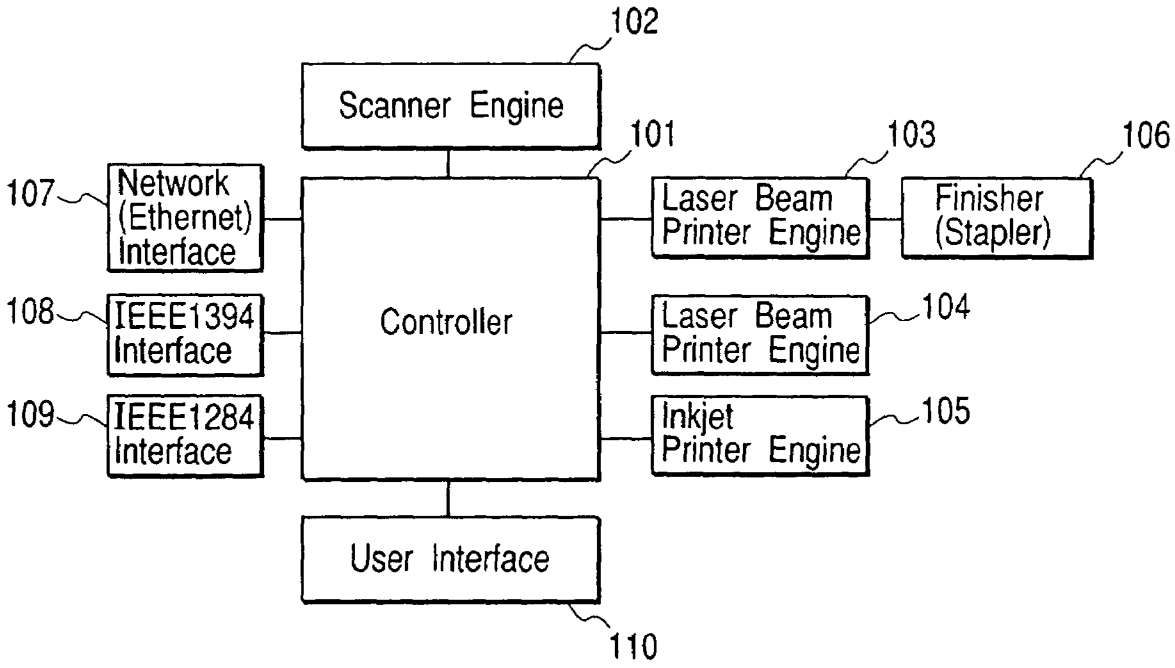
FIG. 1 is a diagram of a configuration of a multi-function peripheral (MFP) showing an embodiment of the present invention.

FIG. 1 is a diagram of a configuration of a multi-function peripheral (MFP) showing an embodiment of the present invention.

Figure 3:
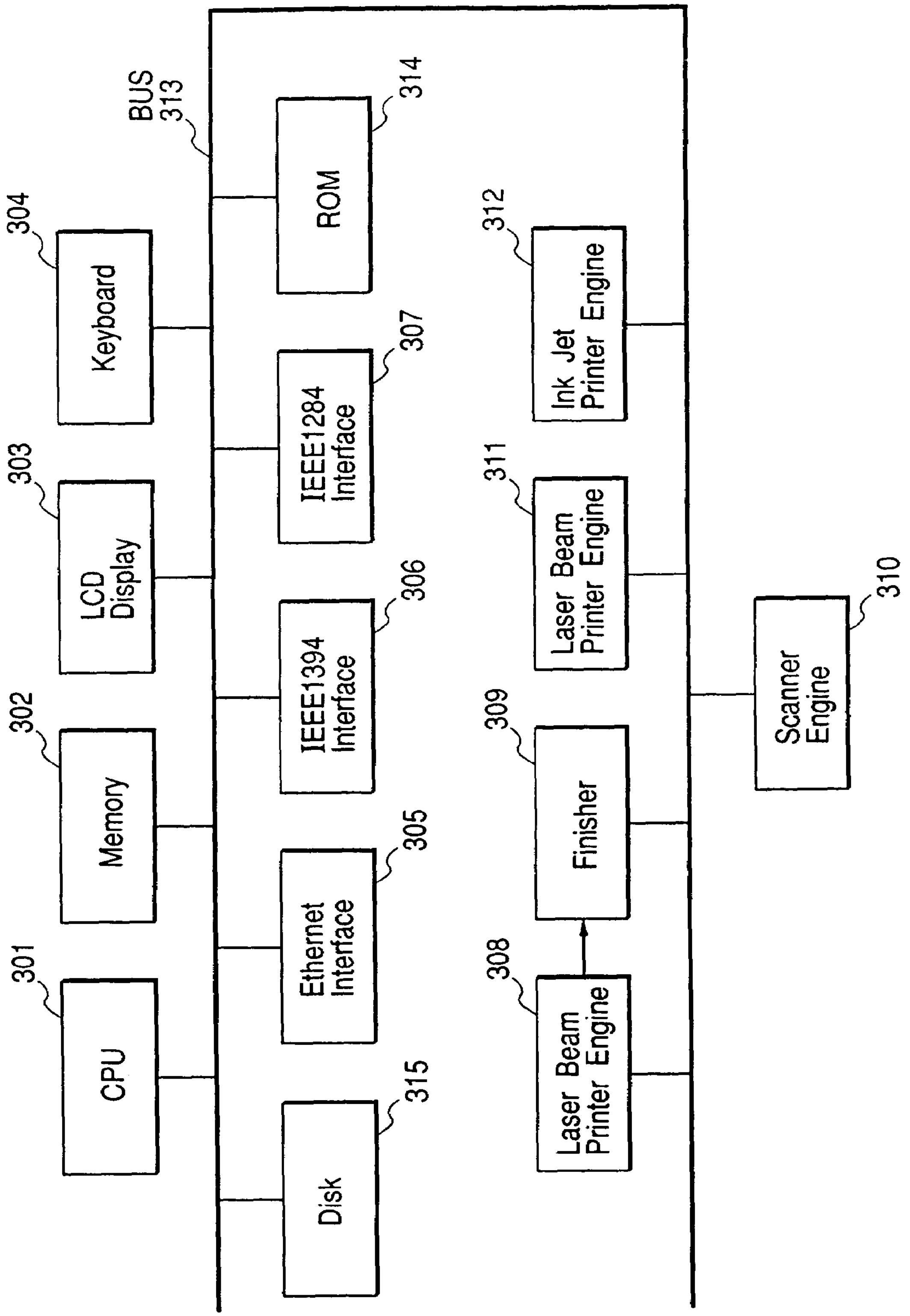
FIG. 3 is a diagram showing a hard configuration of a controller of MFP shown in FIG. 1.

In FIG. 1, a controller 101 for controlling the multi-function peripheral has a hardware configuration shown in FIG. 3, and has a software (control program) configuration shown in DISK 315 of FIG. 76 as a storage medium. A scanner engine 102 is controlled by the controller 101. Laser beam printer engines (LBP) 103, 104 are controlled by the controller 101. The laser beam printer engine 103 is connected to a finisher 106, so that a plurality of recording media (e.g., paper) outputted from the printer engine can collectively be stapled (Hotchkiss) and processed. The finisher 106 is also controlled by the controller 101. An inkjet printer engine (IJP) 105 can also perform color printing, and is controlled by the controller 101. A network (Ethernet) interface 107 provides the controller 101 with bidirectional communication through the interface. IEEE 1394 interface 108 provides the controller 101 with bidirectional communication through the interface. IEEE 1284 interface 109 provides the controller 101 with bidirectional communication through the interface. A user interface 110 is constituted of LCD display and a keyboard to display information from the controller 101 and to transmit an instruction from a user to the controller 101.

For the multi-function peripheral configured as described above, a selection is made from three physical printers LBP 103 (B/W, with Finisher), LBP 104 (B/W), and IJP 105 (Color) so that print job issuance is enabled. Moreover, a selection is made from four logical (cluster) printers LBP 103+LBP 104, LBP 104+IJP 105, LBP 103+IJP 105, LBP 103+LBP 104+IJP 105 so that the print job issuance is enabled. Furthermore, an automatic selection is made from the seven printers LBP 103, LBP 104, IJP 105, LBP 103+LBP 104, LBP 104+IJP 105, LBP 103+IJP 105, and LBP 103+LBP 104+IJP 105 so that the print job issuance is enabled. Furthermore, IJP is used to constitute a logical printer as a printer which can print only white and black so that the print job issue is enabled.

Moreover, scan job can be issued from the outside, and a color original can be read. Furthermore, a selection is made (automatic selection can also be made) from the scanner and the eight printers LBP 103, LBP 104, IJP 105, LBP 103+LBP 104, LBP 104+IJP 105, LBP 103+IJP 105, LBP 103+LBP 104+IJP 105, and IJP which can print only white and black so that the copy job can be issued. Furthermore, when only the printer IJP is present, color copy job can be issued.

Moreover, font, and form overlay can be used in the print job, upload/download can be realized, and resource management can be performed. Moreover, color profile can be used in the print job, scan job, and copy job, upload/download can be realized, and resource management can be performed. Furthermore, log can automatically be generated inside the apparatus and upload can be realized.

Moreover, all the functions can be used from any interface of Network (Ethernet, TCP/IP), IEEE 1284, and IEEE 1394. Furthermore, each interface is associated with a subaddress, physical/logical devices (printer, scanner, copy) and each resource. By selecting the subaddress, these physical/logical devices and each resource can be selected. To each subaddress of each interface, the job can be issued and download/upload can be instructed at the same time. Moreover, the association of the subaddress with the physical/logical device and the resource can be obtained by inquiring of the apparatus itself. Furthermore, the function can be used via an internal user interface.

Moreover, by inquiring of Supervisor described later through the above-described interface from the outside, the outlines of provided functions (a type of job to be issued, a type of resource to be utilized, and the like), job issuance, subaddresses for use in download/upload of the resources, and detailed information of each function (the maximum number of copy sheets, PDL supporting a finisher type, the number of output BIN to be designated, and the like) can be obtained. By using the above-described information, software (control program) can automatically be formed on the side of Client. However, Client needs to know beforehand only the subaddress for use in the inquiry in each interface. A manager can limit the above-described various functions by the connection form and user.

(Entire System Configuration)

Figure 2:
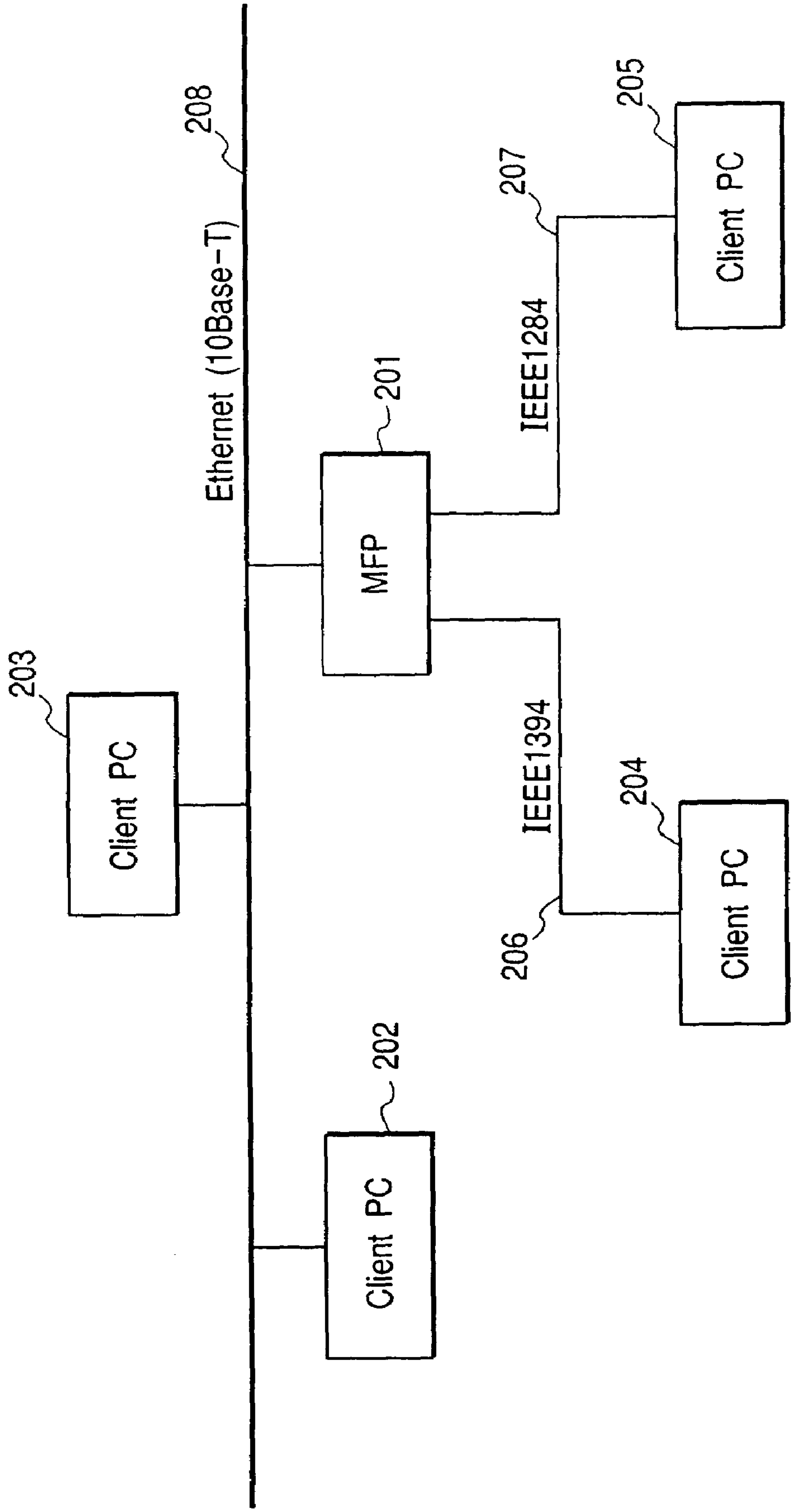
FIG. 2 is a diagram of a system configuration showing the embodiment of the present invention.
Figure 78:
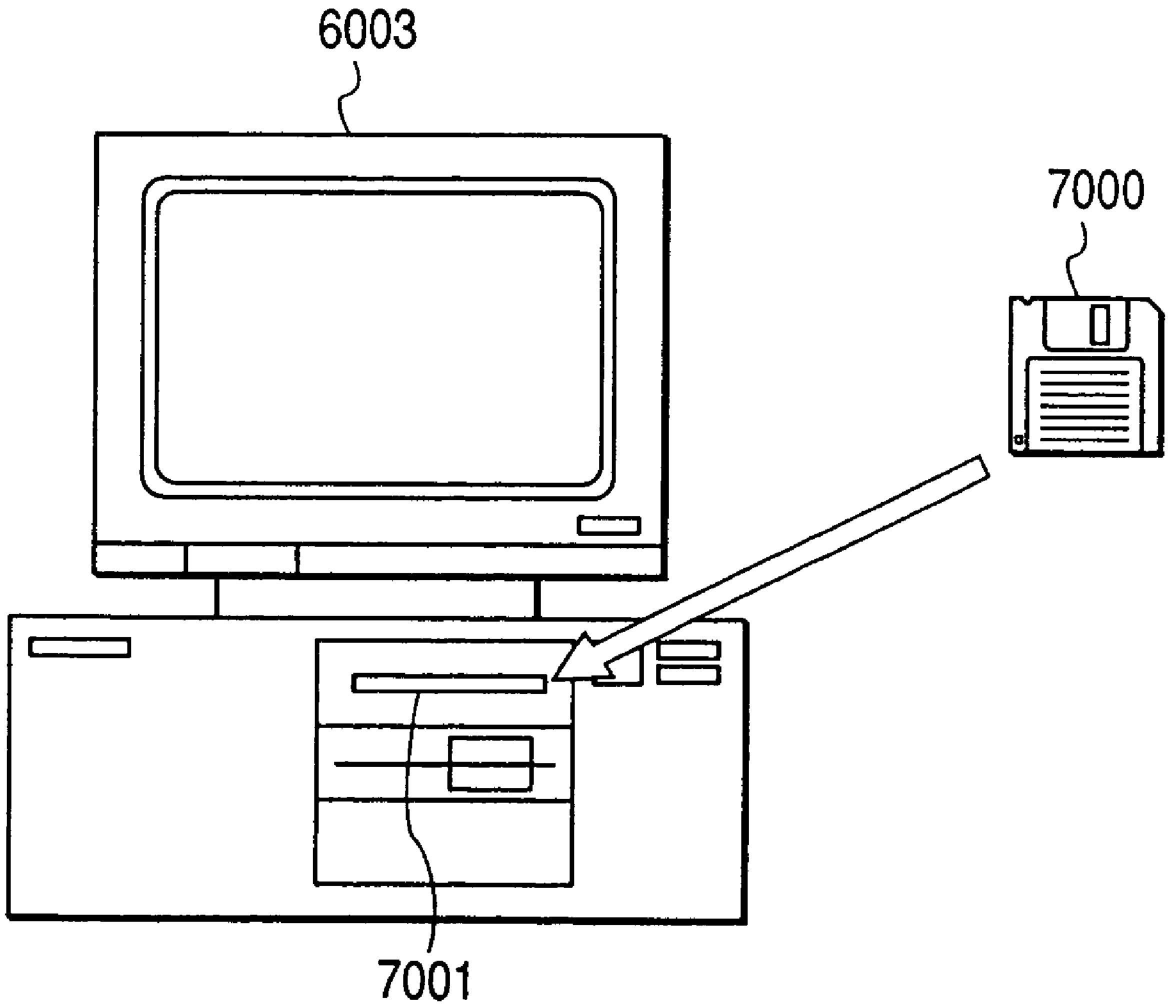
FIG. 78 is a diagram showing a configuration of Client PC.

FIG. 2 is a diagram showing a system configuration of the present embodiment. In FIG. 2, numeral 201 denotes the multi-function peripheral (MFP) shown in FIG. 1, and the multi-function peripheral 201 is connected to Client PC 202 to 205 (information processing apparatuses) via a network interface cable 208 (10 BASE-T), IEEE 1394 interface cable 206, and IEEE 1284 interface cable 207, respectively. In each Client PC as shown in FIG. 78, various software (control programs) stored in DISK 6009 described later as the storage medium shown in FIG. 77 are operating. Client PC 202 and 203 connected via Ethernet 208 designate ID address and a port number to connect with the multi-function peripheral 201, and output IP packet data. Client PC 204 connected via IEEE 1394 interface 206 designates a node ID and LUN (logical unit number) to connect with the multi-function peripheral 201, and outputs SBP-2 packet data. Client PC 205 connected via IEEE 1284 interface 207 designates a socket number to connect with the multi-function peripheral 201, and outputs IEEE 1284.4 packet data.

(Hardware Configuration of Controller)

FIG. 3 is a diagram showing a hardware configuration of the controller 101 of the embodiment shown in FIG. 1. Inside the controller 101, CPU 301 is connected via a bus 313 to Memory (RAM) 302, LCD display 303 and a keyboard 304 constituting the user interface (operating portion) 110, ROM 314, and DISK 315. Various programs and data shown in FIG. 76 are stored in DISK 315 (storage medium) such as a hard disk, a floppy disk, and the like, sequentially read into Memory (RAM) 302 if necessary, and executed by CPU 301. The DISK 315 may be detachably attached to MFP 201 or incorporated in MFP 201. Furthermore, the program shown in FIG. 76 may be configured to be downloaded from Client PC 202 to 205 or another MFP via the network interface cable 208 (10 BASE-T), IEEE 1394 interface cable 206, and IEEE 1284 interface cable 207 and stored in DISK 315.

The LCD display 303 and the keyboard 304 constitute the user interface (operating portion) 110 shown in FIG. 1. When CPU 301 writes data to LCD display 303, display is performed. When CPU 301 reads data from the keyboard 304, the instruction from the user is entered.

Moreover, to the bus 313 a network interface connector 305, IEEE 1394 interface connector 306, and IEEE 1284 interface connector 307 are connected, and correspond to the network interface 107, IEEE 1394 interface 108, and IEEE 1284 interface 109 shown in FIG. 1, respectively. Then, Ethernet (10 BASE-T) cable 208, IEEE 1394 cable 206, and IEEE 1284 cable 207 shown in FIG. 2 are connected. When CPU 301 reads or writes data from or to these interfaces, communication is performed using the interfaces.

Furthermore, to the bus 313 connected are Laser Beam Printer Engine 308, Finisher 309, Scanner Engine 310, Laser Beam Printer Engine 311, and Ink Jet Printer Engine 312. These correspond to Laser Beam Printer Engine 103, Finisher 106, Scanner Engine 102, Laser Beam Printer Engine 104, and Ink Jet Printer Engine 105 shown in FIG. 1, respectively. When CPU 301 performs data reading/writing via these engines, engine operations such as printing and scanning are performed and various statuses are obtained. Additionally, Laser Beam Printer Engine 308, Finisher 309, Scanner Engine 310, Laser Beam Printer Engine 311, and Ink Jet Printer Engine 312 are arranged not inside MFP 201, but are arranged as separate peripheral units on the network, and may be controlled by the controller 101 of MFP 201.

(Software Configuration of Controller 101)

Figure 4:
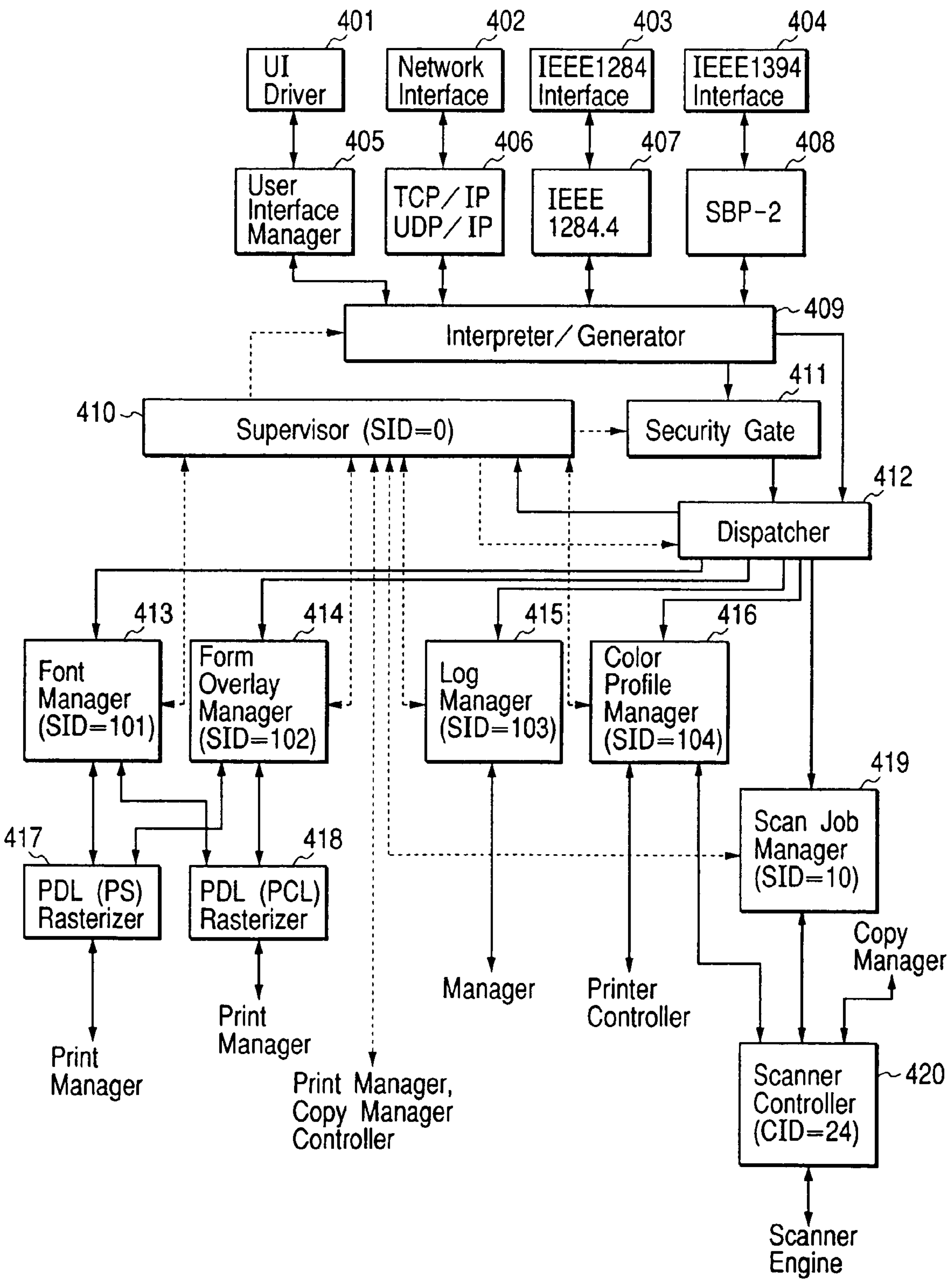
FIG. 4 is a diagram showing a soft configuration of the controller of MFP shown in FIG. 1.

FIG. 4 is a diagram showing a software (control program) configuration of DISK 315 in the controller 101, and the software (control program) is executed by CPU 301. In the drawing, solid lines indicate data and control, while dotted lines indicate setting and ability obtaining. A user interface driver 401 controls LCD display 303 and a keyboard 304. A user interface manager (control program) 405 interprets input information entered via UI driver 401 from the user, generates a command packet shown in FIG. 46, and transmits an output to an interpreter (control program) 409. The user interface manager 405 also interprets the command packet entered via the interpreter 409, and performs display on LCD display 303 via UI driver (control program) 401.

A network interface driver (control program) 402 controls the network interface connector 305, and processes a physical layer of network packet (physical packet) by extracting a transport packet from the physical packet and generating the physical packet from the transport packet. A TCP/IP, UDP/IP processing module 406 processes the transport packet outputted from the network interface 402, extracts a command packet, and transmits an output to the interpreter 409. Moreover, the module generates the transport packet from the command packet outputted from the interpreter 409, and transmits an output to the network interface 402.

IEEE 1284 driver (control program) 403 controls the IEEE 1284 interface 307. Numeral 407 denotes a processing module (control program) of IEEE 1284.4. IEEE 1284.4 is a standard of a transport layer mainly for the purpose of being used in IEEE 1284 interface. A processing module (control program) 407 of IEEE 1284.4 processes the transport packet outputted from the IEEE 1284 driver 403 to extract the command packet and transmits an output to the interpreter 409. Moreover, the module generates the transport packet from the command packet outputted from the interpreter 409, and transmits an output to the IEEE 1284 driver 403. IEEE 1394 driver (control program) 404 controls the IEEE 1394 interface 306.

A module (control program) 408 processes SBP (serial bus protocol)-2 which is the transport layer in the IEEE 1394. The SBP-2 processing module 408 processes the transport packet outputted from the IEEE 1394 driver 404 to extract the command packet and transmits an output to the interpreter 409. The module also generates the transport packet from the command packet outputted from the interpreter 409, and transmits an output to the IEEE 1394 driver 404. Numeral 409 denotes a packet interpreter which interprets the command packets transmitted from the transport processors 406, 407, 408 and the user interface manager 405 and generates commands. The packet interpreter 409 also generates the command packet in response to a request from another module (control program). In accordance with a subaddress to service ID table (FIG. 9) of Supervisor (general administration manager) 410, the interpreter 409 processes only the command packet transmitted from the subaddress which is valid, and cancels the command packets transmitted from the other subaddresses.

Supervisor (general administration manager) 410 retains in DISK 315 various data shown in FIG. 7 (attribute table), FIG. 9 (subaddress to service ID table), FIG. 11 (service ID to task type table), FIG. 13 (user authentication table), FIG. 14 (access control table), FIG. 16 (event setting table), and FIG. 17 (event format table), and generally manages an operation of the controller 101. In response to entered command instructions, Supervisor 410 refers to or changes various data retained by itself, various data retained by managers (font manager 413, form overlay manager 414, log manager 415, color profile manager 416, print managers 501 to 509, scan job manager 419 and copy job managers 601 to 608), and various data retained by controllers (printer controllers 510 to 512, scanner controller 420).

For the command packet interpreted by the interpreter 409, in accordance with the user authentication table (FIG. 13) and access control table (FIG. 14) of Supervisor 410 (control program), a security gate 411 limits a command input in such a manner that only the user who possesses a correct right to use can use the multi-function peripheral 201. A dispatcher (control program) 412 distributes the commands transmitted from the interpreter 409 to the resource managers (font manager 413, form overlay manager 414, log manager 415, color profile manager 416) and the job managers (print managers 501 to 509, scan job manager 419 and copy job managers 601 to 608) which are control programs for processing the commands. The font manager 413 manages fonts. The font manager 413 retains data as shown in FIG. 26 (attribute table) and FIG. 28 (FONT table) in DISK 315. The font (stored in DISK 315 or ROM 314) managed by the font manager 413 is transferred to PDL rasterizers 417 and 418, and used during a print job processing.

The form overlay manager 414 manages form overlays. The form overlay manager 414 retains data as shown in FIG. 29 (attribute table) and FIG. 31 (FORM table) in DISK 315. The form overlay (stored in DISK 315 or ROM 314) managed by the form overlay manager 414 is transferred to PDL rasterizers 417 and 418, and used during the print job processing. The log manager 415 manages logs. The log manager 415 retains data as shown in FIG. 32 (attribute table) and FIG. 34 (LOG table) in DISK 315. The log is outputted from each manager, and placed under control of the log manager. An execution log file is stored in RAM 302 or DISK 315 and updated at any time.

The color profile manager 416 manages color profile data for a color scanner or a color printer to perform color matching. The color profile manager 416 retains data as shown in FIG. 37 (attribute table) and FIG. 39 (color profile table) in DISK 315. Color profiles managed by the color profile manager 416 are transferred to the printer controllers (control programs) 510, 511, 512 and the scanner controller (control program) 420, and used during processing of the print job, copy job and scan job. The PDL rasterizer 417 processes document data written in PS (registered trademark) as one type of PDL (page description language), and outputs image data. The PDL rasterizer 418 processes document data written in PCL (registered trademark) as one type of PDL (page description language), and outputs image data. The scan job manager 419 manages the scan job. The scan job manager 419 retains data as shown in FIG. 22 (attribute table) in DISK 315. The scan job manager 419 instructs the scanner controller 420 to execute scanning. The scanner controller 420 controls the scanner engine 310. The scanner controller 420 retains data indicating a function, state and performance of the scanner engine 310 as shown in FIG. 44 (attribute table) in DISK 315. The scan job manager 419 and scanner controller 420 have the data indicating the functions and performances (FIGS. 22 and 44), but the functions shown by these data do not need to be the same. By rewriting the data (FIG. 22) retained by the scan job manager 419 through Supervisor 410, the function can be limited.

The above-described font manager 413, form overlay manager 414, log manager 415, and color profile manager 416 are resource management programs, the scan job manager 419, print job managers 501 to 509, the copy job managers 601 to 608 are logical device (scanner, printer) control programs, and the laser beam printer controllers 510, 511, ink jet printer controller 512, and scanner controller 420 are physical device (printer, scanner) control programs.

(Configuration of Print Job Manager)

Figure 5:
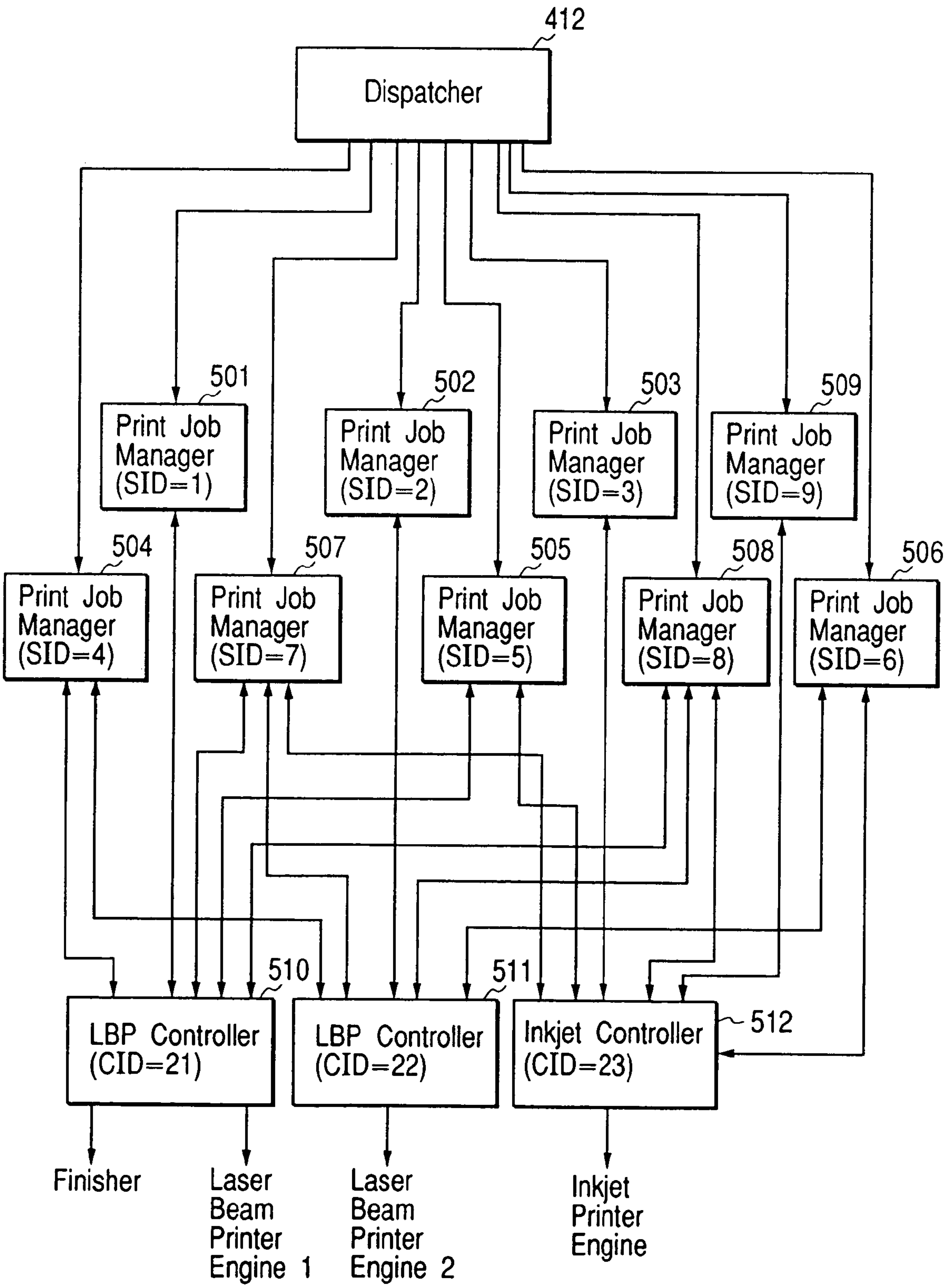
FIG. 5 is a diagram showing the soft configuration of the controller of MFP shown in FIG. 1.

FIG. 5 is a diagram which supplements the software (control program) configuration diagram shown in FIG. 4. A dispatcher 412 is the same as the dispatcher 412 shown in FIG. 4, and distributes the command packets to the print job managers (control programs) 501 to 509. The print job managers 501 to 509 manage the print job. Each print job manager has data as shown in FIG. 18 (attribute table) in DISK 315. For each print job manager, a printer controller for use in processing the print job (LBP Controller 510, LBP Controller 511, Ink Jet Controller 512, or an arbitrary combination of the controllers 510, 511, 512) and a print engine connected to the controller are determined, and the type of printer controller (control program) to be used is described in data shown by attribute ID 2001 of FIG. 18. However, only the print job manager 508 has a function of dynamically selecting the print engine for use, and it is described in data (attribute table) of the print job manager 508 that the manager has the function. Each print manager retains the entered print job, and data indicating the type of printer controller and the type of job to be executed by the printer controller as shown in FIG. 20 (job table) and FIG. 21 (job request table) in DISK 315. The printer controllers 510 to 512 control the print engines 308, 311 and 312. The printer controller 510 also controls the finisher 309. Each printer controller has data indicating a function, state and performance of the corresponding printer engine as shown in FIG. 40 (attribute table) in DISK 315. Each controller retains data indicating a state of entered print job as shown in FIG. 42 (job queue table) in DISK 315.

The print job managers 501 to 509 and the printer controllers 510 to 512 have data indicating the functions and performances as shown in FIG. 18 (attribute table) and FIG. 40 (attribute table) in DISK 315. In general the print job manager has a performance equal to a sum of the performances of the controllers for use, and a function corresponding to a common item of the function of each controller. However, some of the functions can be changed by rewriting the data (FIG. 18) of the print job manager through Supervisor 410. For example, since the print job managers 503 and 509 use the same printer controller 512, they can present the same performance and function. However, the data of the print job managers can be set by a setting processing described later in such a manner that the print job manager 503 can perform color printing and the print job manager 509 cannot perform the color printing.

(Configuration of Copy Job Manager)

Figure 6:
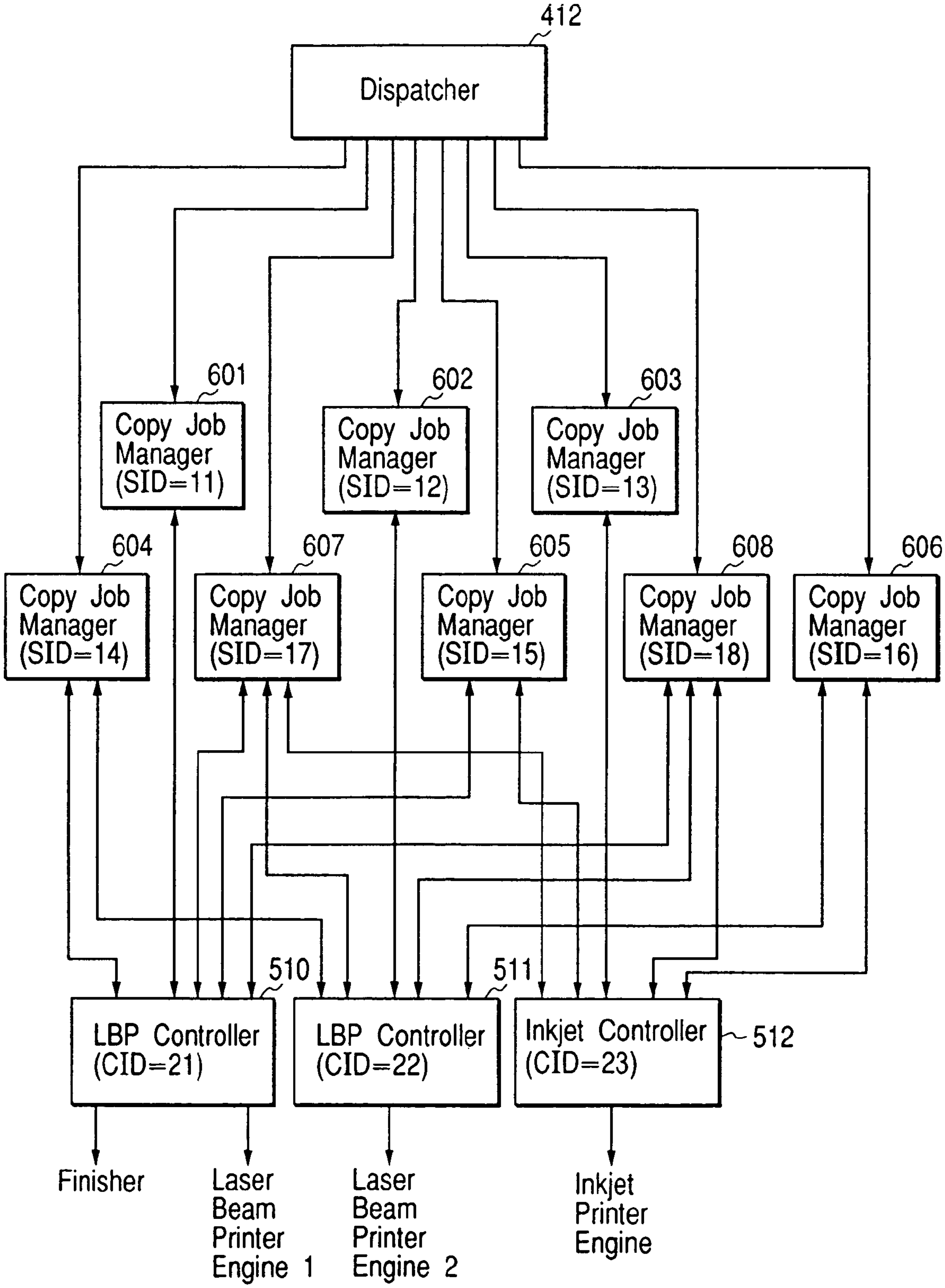
FIG. 6 is a diagram showing the soft configuration of the controller of MFP shown in FIG. 1.

FIG. 6 is a diagram which supplements the software (control program) configuration diagram shown in FIGS. 4 and 5. A dispatcher 412 is the same as the dispatcher 412 shown in FIG. 4, and distributes the command packets to the copy job managers (control programs) 601 to 608. The copy job managers 601 to 608 manage the copy job. Each copy job manager has data as shown in FIG. 24 (attribute table) in DISK 315. For each copy job manager, a printer controller and a scanner controller for use in processing the copy job and a print engine and a scanner engine connected to the controllers are determined, and the types of printer controller and scanner controller to be used are described in the data (attribute ID 2001) shown in FIG. 24. However, only the copy job manager 608 has a function of dynamically selecting the print engine for use, and it is described in data (attribute ID 2002) of the copy job manager 608 that the manager has the function. Each copy manager holds the entered copy job, and data indicating the type of printer controller or scanner controller and the type of job to be executed by the controller as shown in FIG. 20 (job table) and FIG. 21 (job request table) in DISK 315. The printer controllers 510 to 512 control the print engines, and are the same as those shown in FIG. 5.

(Attribute Table of Supervisor)

FIG. 7 shows data (attribute table) which Supervisor (control program) 410 retains in DISK 315 and manages. This table shows a function outline, connection information, security information, and the like of the multi-function peripheral 201. In the table, each line shows one information unit (record), and the data is constituted as an aggregate of a plurality of records. Each record is constituted of attribute ID 701, type ID 702 and attribute value 703, and indicates an attribute of Supervisor. The attribute ID 701 indicates a type of information, thereby indicating a meaning of the value 703. The attribute ID 701 is unique inside the apparatus, and the same attribute ID indicates the same information type. The type ID 702 indicates a type of data which the value 703 has, and is used in interpreting the value 703. The type ID is univocally determined by the attribute ID and defined uniquely inside the apparatus. In the embodiment, the attribute ID 701 and the type ID 702 are both shown in the attribute table, but by retaining an attribute ID to type ID table as data separated from the attribute table, only the attribute ID and value may be shown in the attribute table. The value 703 indicates an attribute value in accordance with the attribute ID 701.

FIG. 8 is a diagram showing details of attribute ID 701 and type ID 702 of the attribute table of FIG. 7. In the drawing, attribute ID 102 “a list of supported security levels” retains a list of security levels which can be set, among security levels required for issuing operation for Supervisor. The security levels will be described in description of an access control table of FIG. 14. Attribute 103 “current security level” indicates a security level which is currently set in Supervisor. Attribute ID 401 “current count data” indicates a list of information as count targets in Supervisor, and its meaning is shown by attribute ID 402 “count data format”. For example, count data 45, 78, 34, 13 indicate the number of print sheets having a paper size shown in the count data format. The attribute ID 402 “count data format” is shown as a list of attribute ID. Since the attribute ID is defined to be unique in the apparatus, by designating the attribute ID, the meaning of the count data can be designated. For example, an attribute value 565 of attribute ID 402 means the number of print sheets with a sheet size of A2, an attribute value 537 means the number of print sheets with a sheet size of A3, an attribute value 545 means the number of print sheets with a sheet size of A4, and an attribute value 523 means the number of print sheets with a sheet size of A5. Count limit data of attribute ID 403 shows a maximum value which the attribute ID 401 “current count data” can have. When even one of the values of “current count data” exceeds the maximum value, by invalidating a valid flag of the subaddress to service ID table shown in FIG. 9, CPU 301 invalidates all the services (by the manager). Count unit price data of attribute ID 404 shows a unit price for every count of the attribute ID retained in the attribute ID 402 “count data format” in terms of a currency unit. Current charge data of attribute ID 405 indicates a value obtained by multiplying corresponding values of the attribute ID 401 “current count data” and attribute ID 404 “count unit price data” and taking a sum. Charge limit data of attribute ID 406 shows a maximum value which the attribute ID 405 “current charge data” can have. When the attribute ID 405 “current charge data” exceeds an attribute ID 406 “charge limit data”, by changing a valid flag to an invalid flag in the subaddress to service ID table shown in FIG. 9, the CPU 301 invalidates all the services (by the manager). A list of supported events of attribute ID 501 shows events which can be set to be notified to Supervisor by a list of event ID which is univocally defined for every event type. Actual event transmission is set by setting a connection type and addressee of event notification with event ID in the event setting table shown in FIG. 16. For the values of the attribute table of FIG. 7, description "Table Data" indicates that values (52 to 104) are data each having a table format shown by type ID.

(Subaddress to Service ID Table)

FIG. 9 shows a subaddress to service ID table. This table is retained in DISK 315 as attribute values of an attribute ID 1001 (subaddress to SID table) in the attribute table shown in FIG. 7. The subaddress to SID table shows a type of service (e.g., print, font download, and the like) obtained by placing the command packet in a subaddress, and the subaddress. Moreover, in accordance with the valid flag, and the like of the table, the interpreter 409 controls each connection form concerning whether a job service is provided. In the table each line shows one information unit (record), and the data is constituted as an aggregate of a plurality of records. Each record is constituted of a connection type ID 801, subaddress 802, service ID 803, valid flag 804, valid user list 805, and invalid user list 806. The connection type ID 801 indicates an identifier indicating the connection form. FIG. 10 is a diagram showing meanings of connection type ID: 0 denotes Internal (user interface); 1 denotes TCP/IP (network); 2 denotes IEEE 1284.4 (IEEE 1284); and 3 denotes SBP-2 (IEEE 1394).

The subaddress 802 shows a subaddress of each connection form. Although the user interface has no subaddress, for the sake of convenience the subaddress is allocated to the interface, and the command packet is placed together with subaddress information from the user interface.

The service ID 803 is an identifier indicating a service. The service ID 803 is allocated to each manager shown in FIGS. 4, 5 and 6 in one-to-one correspondence.

The valid flag 804 shows whether the subaddress is valid. When the value is true (YES), the subaddress is valid, so that the user can issue the command packet to the subaddress. When the value is false (NO), the subaddress is invalid, which means that even if the command packet is transmitted to the subaddress, the packet is canceled. FIG. 8 shows that when the connection form of connection type ID 2 (IEEE 1284) is used, a service of service ID 8 (print job manager) cannot be provided.

The valid user list 805 shows a list of user ID which can receive the service when the subaddress is valid. The invalid user list 806 shows a list of user ID which cannot receive the service even when the subaddress is valid. The value can be set to only one of the valid user list 805 and the invalid user list 806.

(Service ID to Task Type Table)

FIG. 11 shows a service ID to task type table. This table is retained in DISK 315 as attribute values of attribute ID 1002 (SID to Task Type Table) of the attribute table shown in FIG. 7. The service ID to task type table shows the type of service provided by the service ID. In the table each line shows one information unit (record), and data is constituted as an aggregate of a plurality of tasks. Each record is constituted of service ID 901 and task type 902. The task type 902 shows the type of service. FIG. 12 is a diagram showing meanings of values of the task type 902: 0 denotes the service performed by Supervisor; 1 denotes print; 2 denotes scan; 3 denotes copy; 101 denotes font; 102 denotes form overlay; 103 denotes log; and 104 denotes color profile. Service ID has a one-to-one correspondence with the manager which provides the service. Therefore, the service ID can be used for accessing a function table of each manager. Since each printer controller or scanner controller also has the function table, in order to access the table, a controller ID equivalent to the service ID is allocated to the printer controller or the scanner controller, and the type of controller shown by the controller ID is managed in the service ID to task type table. A task type 201 denotes a printer controller, and 202 denotes a scanner controller. The controller ID has a one-to-one correspondence with each controller shown in FIGS. 4 and 5.

Meanings of service ID are as follows:

0: Supervisor 410
1: print job manager 501
2: print job manager 502
3: print job manager 503
4: print job manager 504
5: print job manager 505
6: print job manager 506
7: print job manager 507
8: print job manager 508
9: print job manager 509
10: scan job manager 419
11: copy job manager 601
12: copy job manager 602
13: copy job manager 603
14: copy job manager 604
15: copy job manager 605
16: copy job manager 606
17: copy job manager 607
18: copy job manager 608
101: font manager 413
102: form overlay manager 414
103: log manager 415
104: color profile manager 416
21: printer controller 510
22: printer controller 511
23: printer controller 512
24: scanner controller 420

(User Authentication Table)

FIG. 13 shows a user authentication table retained by Supervisor, and shows authentication information of users who can use the apparatus. This table is retained in DISK 315 as attribute values of attribute ID 1003 (user authentication table) of the attribute table shown in FIG. 7. The user authentication table shows a set of valid user ID and password, together with information as to whether the user has a manager privilege. In the table each line shows one information unit (record), and data is constituted as an aggregate of a plurality of records. Each record is constituted of user ID 1001, password 1002 and manager privilege flag 1003. The manager privilege flag 1003 indicates whether the user has a right as a manager.

(Access Control Table)

FIG. 14 is an access control table retained by Supervisor, and shows a security level of each service. This table is retained in DISK 315 as attribute values of attribute ID 1004 (access control table) of the attribute table shown in FIG. 7. The access control table retains the security level necessary for each service ID, and a list of users who are permitted to be given services. In the table each line shows one information unit (record), and data is constituted as an aggregate of a plurality of records. Each record is constituted of service ID 1101, security level 1102 and user ID list 1103. The security level 1102 shows authentication information necessary for receiving the service designated by the service ID 1101, that is, for issuing the command packet to the manager indicated by the service ID 1101. FIG. 15 shows meanings of security levels: security level 0 shows that user authentication is unnecessary; 1 shows that only the manager is discriminated; 2 shows that the service is available only for an authenticated user, but the user ID is used and no password is used for authentication; and 3 shows that the service is available only for the authenticated user, and the user ID and password are used for the authentication. The user ID list 1103 shows a list of user ID permitted to use (access) when the security level 1102 is 2 or 3.

(Event Setting Table)

FIG. 16 shows an event setting table retained by Supervisor. This table is retained in DISK 315 as attribute values of attribute ID 502 (event setting table) of the attribute table shown in FIG. 7. The event setting table retains, for each event type, a method of transmitting event notification and an addressee when a designated event occurs in the apparatus. In the table each line shows one information unit (record), and data is constituted as an aggregate of a plurality of records. Each record is constituted of an event ID 1201, connection type 1202 and notification addressee 1203. The addressee is constituted of the connection type and a notification address dependent on the connection type. The event ID 1201 shows an event type, and is defined to be unique in the apparatus. For example, Event ID 200 indicates that there is no paper, ID 399 indicates that there is no toner, ID 432 indicates that there is no ink, and ID 234 indicates that a cover of the multi-function peripheral is open. The connection type ID 1202 shows a connection type by which the event notification is transmitted, and values are the same as those which are used in the subaddress to service ID table of FIG. 9. The notification addressee 1203 shows event notification addressees suitable for the connection type 1202.

(Event Format Table)

FIG. 17 is an event format table retained by Supervisor showing event contents. This table is retained in DISK 315 as attribute values of attribute ID 503 (event format table) of the attribute table shown in FIG. 7. The event format table retains a type of additional data transmitted as the event notification, for each event ID defined to be unique in the apparatus. In the table each line shows one information unit (record), and data is constituted as an aggregate of a plurality of records. Each record is constituted of event ID 1301 and event format 1302. The event format 1302 is a type of the additional data transmitted as the event notification, and shown as an attribute ID list. The attribute ID is defined to be unique in the apparatus. Since the type is also univocally determined by the attribute ID, by designating the attribute ID, a format of the additional data can be shown. For example, an attribute ID 676 of the event format 1302 indicates a paper size, ID 756 indicates a paper type, ID 666 indicates a toner type, ID 698 indicates an ink type, and ID 600 indicates a cover position. As described hereinafter, event transmission methods and addressees are set in the data (attribute table) retained by each manager and controller, and the event which occurs in each manager and controller can be notified, but the additional data format of the event is also retained in the event format table shown in FIG. 17. When the designated event occurs, the content defined by the event format is notified with predetermined data for each event ID.

(Attribute Table of Print Job Manager)

FIG. 18 shows data (attribute table) retained by each of the print job managers (control programs) 501 to 509 in DISK 315. This table shows performances and functions of print jobs which can be handled by the print job manager. In the table each line shows one information unit (record), and data is constituted as an aggregate of a plurality of records. Each record content is the same as that of Supervisor shown in FIG. 7, and each record is constituted of attribute ID 1401, type ID 1402 and value 1403. FIG. 19 is a diagram showing values of attribute ID 1401 and type ID 1402 of the attribute table of FIG. 18. Type IDs other than type ID 203 (job table type), type ID 204 (job request table type), type ID 81 (type of inhibited attribute combination list 1), type ID 82 (type of inhibited attribute combination list 2), type ID 83 (type of inhibited attribute combination list 3), type ID 84 (type of inhibited attribute combination list 4), and type ID 85 (type of inhibited attribute combination list 5) are the same as those which are used in the Supervisor attribute table of FIG. 7.

An attribute ID 601 "download method for supported data" shows a method of transmitting document data to be printed to the apparatus. In the embodiment supported are a method 1 which comprises including the document data in the job; and a method 2 which comprises including a reference pointer (URL: Unified Resource Locator) of the document data in the job, and reading the document data indicated by the reference pointer from the apparatus if necessary.

Attribute IDs 801 to 805 are inhibited attributes indicating limits on attributes to be set in the print job placed for the print job manager. These attributes are used to show limit items. For example, when the number of copy sheets exceed 100, finisher setting becomes impossible. There are five types of methods of representing the limits in the inhibited attributes. As shown in {attribute ID 1: {attribute ID 2}}, the attribute ID 801 holds a plurality of pairs of lists of another attribute ID 2 to a certain attribute ID 1. This means that when the attribute ID 1 is being set, the setting of each attribute ID 2 cannot be performed in a print job script.

As shown in {attribute ID 1: operator identifier: value: {attribute ID 2}}, the attribute ID 802 retains a plurality of pairs of lists of another attribute ID 2 relative to a certain attribute ID1, operator identifier and value. This means that in a case where the operator shown by the operator identifier for the attribute ID 1 is applied to the value, when a result is true, the setting of each attribute ID 2 cannot be performed in the print job script. The operator identifier has a one-to-one correspondence with calculation of two terms of integer values. For example, 0 denotes "=(equal)".

As shown in {attribute ID 1: operator identifier 1: value 1: {attribute ID 2: operator identifier 2: value 2}}, the attribute ID 803 retains a plurality of pairs of lists of a set of another attribute ID2, operator identifier 2 and value 2 relative to a certain attribute ID1, operator identifier 1 and value 1. This means that in a case where the operator shown by the operator identifier 1 for the attribute ID 1 is applied to the value 1, when a result is true, setting cannot be performed in the print job script in such a manner that a result of application of the operator indicated by the operator identifier 2 for each attribute ID2 to the value 2 becomes true.

As shown in {(attribute ID 1: operator identifier 1: value 1): operator identifier 3: (attribute ID 2: operator identifier 2: value 2): {attribute ID 3}}, the attribute ID 804 retains a plurality of pairs of lists of still another attribute ID3, relative to a certain attribute ID1, operator identifier 1 and value 1 and the operator identifier 3 and another attribute ID2, operator identifier 2 and value 2. This means that in a case where the result of application of the operator shown by the operator identifier 1 for the attribute ID 1 to the value 1 and the result of application of the operator shown by the operator identifier 2 for the attribute ID 2 to the value 2 are calculated as shown by the operator identifier 3, when a result is true, each attribute ID 3 cannot be set in the print job script.

As shown in {(attribute ID 1: operator identifier 1: value 1): operator identifier 3: (attribute ID 2: operator identifier 2: value 2): {attribute ID 4: operator identifier 4: value 4}}, the attribute ID 805 retains a plurality of pairs of lists of a set of still another attribute ID4, operator identifier 4 and value 4, relative to a certain attribute ID1, operator identifier 1 and value 1 and the operator identifier 3 and another attribute ID2, operator identifier 2 and value 2. This means that in a case where the result of application of the operator shown by the operator identifier 1 for the attribute ID 1 to the value 1 and the result of application of the operator shown by the operator identifier 2 for the attribute ID 2 to the value 2 are calculated as shown by the operator identifier 3, when a result is true, setting cannot be performed in the print job script in such a manner that when calculation is performed on each attribute ID 4 and calculation shown by 4 is applied to the value 4, a result becomes true.

The attribute ID 2001 "list of controller ID (possibly) executing Job" is a list of controller ID of the controller which executes the print job, and the print job managers other than the print job manager 508 are surely on a list of controllers which surely execute the job. Since the print job manager 508 dynamically selects the controller in accordance with the function demanded for the job, the attribute indicates a controller selection range. The attribute ID 2002 "controller auto selection is possible or not" indicates whether the print job manager automatically selects the controller. In the embodiment, only the print job manager 508 sets the value to be true. The other attribute IDs are the same as those which are used in the Supervisor attribute table of FIG. 7. However, setting ranges and influenced ranges are limited to those which are under control of the printer job manager to which the attribute table belongs. For example, an attribute value 101 "supported operation" is a list of operations which can be issued to the print job manager, and an attribute value 406 "charge limit data" puts a charge limit on the print job executed by the print job manager. For treatment in a case where the charge limit is exceeded, the service of the print job manager is merely invalidated, and services of the other managers are not influenced. Additionally, the attribute table of the print job manager shown in FIG. 18 is an attribute table of service ID 4 (print job manager 504), and attribute tables of print job managers 501, 502, 503, 505, 506, 507, 508, 509 corresponding to service IDs 1, 2, 3, 5, 6, 7, 8, 9, respectively are stored in DISK 315 and differ from one another.

(Job Table)

Figure 52:
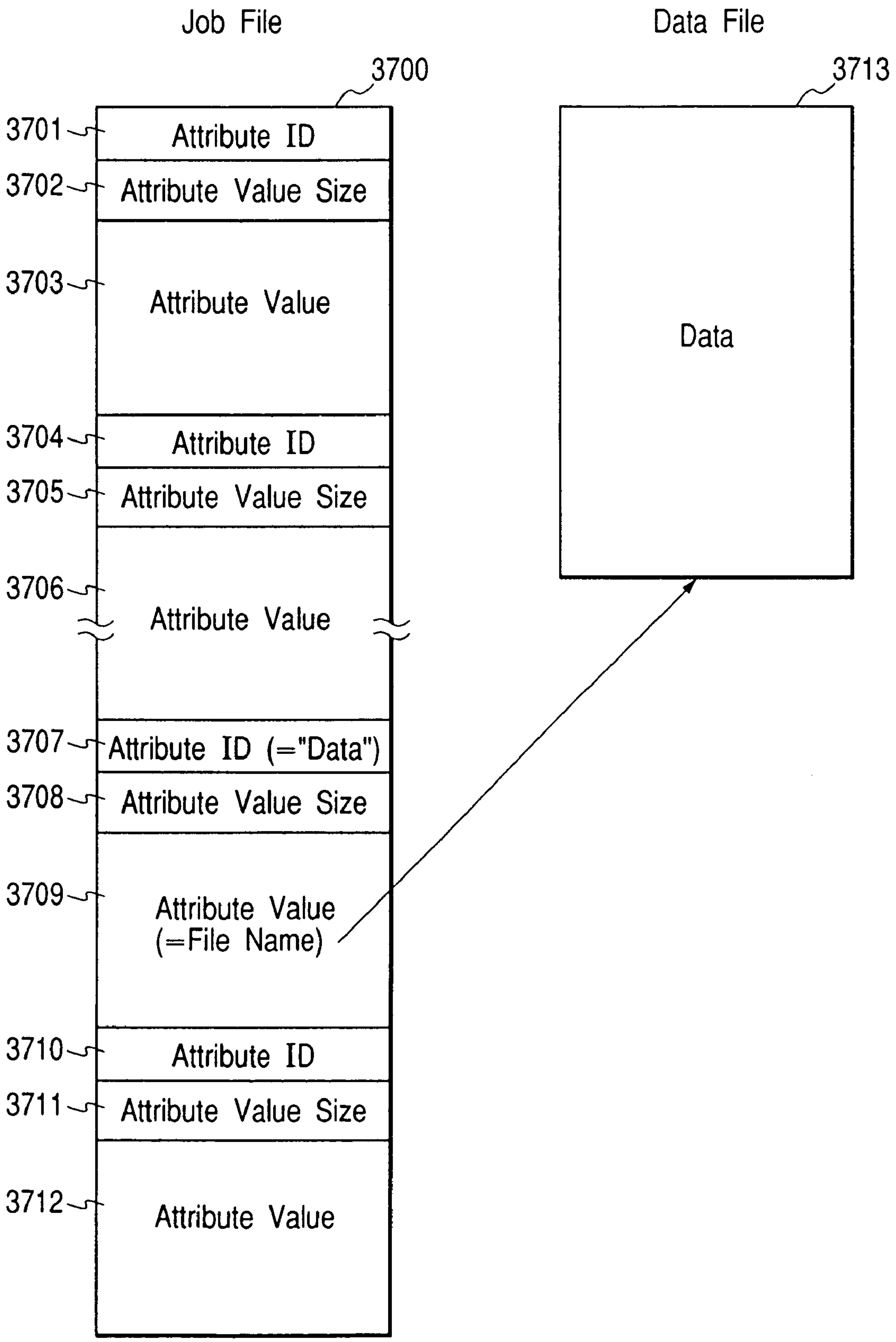
FIG. 52 is a diagram showing a job structure.

FIG. 20 is a diagram showing data (job table) retained by the print job manager, and shows a file name to job ID table in which a job entity managed by the print job manager is retained. The table is retained in RAM 302 as attribute values of attribute ID (job table) of the attribute table shown in FIG. 18. The print job manager dynamically changes the job table on RAM 302 and stores the table in DISK 315 if necessary. In the table each line shows one information unit (record), and data is constituted as an aggregate of a plurality of records. Each record is constituted of a job ID 1501 and a file name 1502 in which the job entity is retained. The job ID 1501 is an identifier allocated to the job by the print job manager when the job is transmitted to the print job manager. The job file name 1502 is a name of the file in which the job entity is retained. As shown in FIG. 52, the Job entity is constituted of a plurality of sets of attribute ID, attribute value size and attribute value.

(Job Request Table)

FIG. 21 is a diagram showing a job request table retained by the print job manager, and shows a relation between a job managed by the print manager and a job executed by the controller. This table is retained in DISK 315 as attribute values of attribute ID 2004 (job request table) of the attribute table shown in FIG. 18. The job request table shows a type of controller to execute a job managed by the print job manager and a type of job executed by the controller. In the table each line shows one information unit, and data is constituted as an aggregate of a plurality of records. Each record is constituted of a job ID 1503, a controller ID 1504, and a job ID 1505 allocated in the controller. The job ID 1503 is an identifier allocated to the job by the print job manager when the job is transmitted to the print job manager, and corresponds to the job ID 1501 in the job table (FIG. 20). The controller ID 1504 shows ID of the controller by which the job is executed. The job ID 1505 is a job identifier allocated by the controller to execute the job.

(Attribute Table of Scan Job Manager)

FIG. 22 shows an attribute table which is data retained by the scan job manager 419. This table shows performances and functions of scan jobs which can be treated by the scan job manager. In the table each line shows one information unit (record), and data is constituted as an aggregate of a plurality of records. Each record content is the same as that of Supervisor shown in FIG. 7, and is constituted of attribute ID 1601, type ID 1602 and value 1603. FIG. 23 is a diagram showing values of attribute ID 1601 and type ID 1602 of the attribute table of FIG. 22. An attribute ID=602 "upload method for supported data" shows a method of transmitting scanned document data to the apparatus. In the embodiment, supported are a method 1 which comprises including the document data during returning of the job; and a method 2 which comprises retaining the document data in the apparatus, including a reference pointer (URL: Unified Resource Locator) to the document data during the job returning, and reading the document data indicated by the reference pointer from host (Client) if necessary. An attribute ID=1201 "list of supported image formats" shows data formats of images which can be outputted, and one of the formats can be designated as a data format during issuance of the scan job. A job table of attribute ID=2003 is the same as that retained by the print job manager shown in FIG. 20. The other attribute IDs are the same as those used in the Supervisor attribute table of FIG. 7. However, setting ranges and influenced ranges are limited to those which are under control of the scan job manager to which the attribute table belongs. Type IDs other than the type ID 203 (job table type) of the attribute table of FIG. 23 are the same as those which are used in the Supervisor attribute table of FIG. 7.

(Attribute Table of Copy Job Manager)

FIG. 24 shows data (attribute table) retained by each of the copy job managers 601 to 608. This table shows performances and functions of copy jobs which can be treated by the copy job manager. In the table each line shows one information unit (record), and data is constituted as an aggregate of a plurality of records. Each record content is the same as that of Supervisor shown in FIG. 7, and is constituted of attribute ID 1701, type ID 1702 and value 1703. FIG. 25 shows values of attribute ID 1701 and type ID 1702 of the attribute table of FIG. 24. An attribute ID 1302 (color print is possible or not), attribute ID 1303 (type of supported finishing), attribute ID 1304 (highest resolution that can be set), attribute ID 1305 (lowest resolution that can be set), attribute ID 2001 (list of controller ID possibly executing Job), attribute ID 2002 (controller auto selection is possible or not), and attribute ID 2003 (job table) are the same as those which have been shown in descriptions of the print job manager and scan job manager. Moreover, attribute IDs and type IDs other than the attribute ID 1302 (color print is possible or not), attribute ID 1303 (type of supported finishing), attribute ID 1304 (highest resolution that can be set), attribute ID 1305 (lowest resolution that can be set), attribute ID 2001 (list of controller ID possibly executing Job), attribute ID 2002 (controller auto selection is possible or not), attribute ID 2003 (job table), and type ID 203 (job request table type) are the same as those which are used in the Supervisor attribute table of FIG. 7. Additionally, the attribute table of the copy job manager shown in FIG. 24 is an attribute table of service ID 18 (copy job manager 608), and the attribute tables of the copy job managers 601 to 607 corresponding to service IDs 11 to 17 are stored in DISK 315, respectively, and differ from one another.

(Attribute Table of Font Manager)

FIG. 26 shows data (attribute table) retained in DISK 315 by the font manager 413. This table shows font types which can be treated by the font manager, a font list currently managed by the font manager, and the like. In the table each line shows one information unit (record), and data is constituted as an aggregate of a plurality of records. Each record content is the same as that of Supervisor shown in FIG. 7, and is constituted of attribute ID 1801, type 1802 and value 1803. FIG. 27 shows values of attribute ID 1801 and type ID 1802 of the attribute table of FIG. 26. Attribute IDs and type IDs other than attribute ID 601 (download method for supported data), attribute ID 602 (upload method for supported data), attribute ID 1501 (list of supported font types), attribute ID 1502 (Max. No. of retainable fonts), attribute ID 1503 (No. of currently retained fonts), attribute ID 1504 (list of retained fonts), and type ID 150 (font table) are the same as those which are used in the Supervisor attribute table of FIG. 7. However, setting ranges and influenced ranges are limited to those under control of the font manager to which the attribute table belongs. The attribute ID 601 "download method for supported data" and attribute ID 602 "upload method for supported data" are the same as those which are described in descriptions of the print job manager and scan job manager, respectively, and show methods of downloading and uploading supported font data.

(Font Table)

FIG. 28 shows a font table retained by the font manager. This table is retained in DISK 315 as attribute values of the type ID 1504 (font table) of the attribute table shown in FIG. 26. The font table shows a type of font which is currently managed by the font manager. In the table each line shows one information unit (record), and data is constituted as an aggregate of a plurality of records. Each record is constituted of a font ID 1901, a font type 1902, a font name 1903, and a file name 1904 including font data. The font data is stored in DISK 315, and is an identifier allocated to the font by the font manager when the font data is downloaded to RAM 302.

(Attribute Table of Form Overlay Manager)

FIG. 29 shows data (attribute table) retained in DISK 315 by the form overlay manager 414. This table shows formats of form overlays which can be treated by the form overlay manager, a list of form overlays currently managed by the form overlay manager, and the like. In the table each line shows one information unit (record), and data is constituted as an aggregate of a plurality of records. Each record content is the same as that of Supervisor shown in FIG. 7, and is constituted of attribute ID 2001, type ID 2002, and value 2003. FIG. 30 shows values of the attribute ID and type ID of the attribute table of FIG. 29. Attribute IDs and type IDs other than the attribute ID 601 (download method for supported data), attribute ID 602 (upload method for supported data), attribute ID 1601 (list of supported form overlay formats), attribute ID 1602 (Max. No. of retainable form overlays), attribute ID 1603 (No. of currently retained form overlays), attribute ID 1604 (list of retained form overlays) and type ID 160 (form table) are the same as those which are used in the Supervisor attribute table of FIG. 7. However, setting ranges and influenced ranges are limited to those under control of the form overlay manager to which the attribute table belongs. The attribute ID 601 "download method for supported data" and attribute ID 602 "upload method for supported data" are the same as those which are described in descriptions of the print job manager and scan job manager, respectively, and show methods of downloading and uploading supported form overlay data.

(Form Overlay Table)

FIG. 31 shows a form overlay table retained by the form overlay manager 414. This table is retained in DISK 315 as attribute values of attribute ID 1604 (form overlay table) of the attribute table shown in FIG. 29. The form overlay table shows a type of form overlay which is currently managed by the form overlay manager. In the table each line shows one information unit (record), and data is constituted as an aggregate of a plurality of records. Each record is constituted of a form overlay ID 2101, a form overlay data format 2102, a form overlay name 2103, and a file name 2104 including form overlay data. The form overlay data is stored in DISK 315, and the form overlay ID 2101 is an identifier allocated to the font by the form overlay manager when the form overlay data is downloaded to RAM 302.

(Attribute Table of Log Manager)

FIG. 32 shows data (attribute table) retained in DISK 315 by the log manager 415. This table shows a list of logs currently managed by the log manager, and the like. In the table each line shows one information unit (record), and data is constituted as an aggregate of a plurality of records. Each record content is the same as that of Supervisor shown in FIG. 7, and is constituted of attribute ID 2201, type ID 2202, and value 2203. FIG. 33 shows values of attribute ID and type ID of the attribute table of FIG. 32. Attribute IDs and type IDs other than the attribute ID 602 (upload method for supported data), attribute ID 1703 (No. of retained Logs), attribute ID 1704 (list of retained logs), attribute ID 1705 (Log format table), type ID 170 (log table), and type ID 171 (log format table type) are the same as those which are used in the Supervisor attribute table of FIG. 7. However, setting ranges and influenced ranges are limited to those under control of the log manager to which the attribute table belongs.

(Log Table)

FIG. 34 shows a log table retained by the log manager 415. This table is retained in DISK 315 as attribute values of the attribute ID 1704 (log table) of the attribute table shown in FIG. 32. The log table shows a type of log currently managed by the log manager. In the table each line shows one information unit (record), and data is constituted as an aggregate of a plurality of records. Each record is constituted of a log ID 2301, and a file name 2302 including log data. The log ID 2301 is a log identifier prescribed beforehand for the type.

(Contents of Log Data)

FIG. 35 shows contents of log data managed by the log manager with DISK 315. The log data is constituted as an aggregate of log records. Each log record is constituted of log format ID 2401, record date 2402 and log data 2403. The log format ID 2401 refers to log format information recorded in the log format table shown in FIG. 36, and shows formats of the log data 2403. For example, log data "12345, 4, 1.23, "OK"" of Log Format ID 1 means that user ID from which the job is issued to the print job manager of service ID 1 is 12345, the number of outputted sheets is 4, an amount of used toner is 1.23, and job completion state is OK.

(Log Format Table)

FIG. 36 shows a log format table retained by the log manager 415. This table is retained in DISK 315 as attribute values of the attribute ID (log format table) of the attribute table shown in FIG. 32. The log format table shows a format of the log recorded in each log data managed by the log manager 415. In the table each line shows one information unit (record), and data is constituted as an aggregate of a plurality of records. Each record is constituted of log format ID 2501, and log format 2502. The log format is shown as a list of a pair of service ID and attribute ID. The attribute ID is defined to be unique in the apparatus, and the type is univocally determined by the attribute ID. Therefore, by designating the attribute ID, the format of log data can be shown. The list of the pair of service ID and attribute ID of log format 2502, and a list of values in the log data 2403 correspond to each other by sequence. For example, a third pair of service ID and attribute ID of the list of log format 2502 means a format of a third value of log data. For example, format "1:701, 1:565, 1:765, 1:777" of Log Format ID 1 shows the user ID from which the job is issued to the print job manager of service ID 1, the number of outputted sheets, the amount of used toner, and the completion state of the job. Moreover, format "11:701, 11:565, 11:765, 11:777" of Log Format ID 2 shows the user ID from which the job is issued to the print job manager of service ID 11, the number of outputted sheets, the amount of used toner, and the completion state of the job.

(Attribute Table of Color Profile Manager)

FIG. 37 shows data (attribute table) retained in DISK 315 by the color profile manager 416. This table shows formats of color profiles which can be treated by the color profile manager, and a list of color profiles currently managed by the color profile manager. In the table each line shows one information unit (record), and data is constituted as an aggregate of a plurality of records. Each record content is the same as that of Supervisor shown in FIG. 7, and is constituted of attribute ID 2601, type ID 2602, and value 2603. FIG. 38 shows values of attribute ID and type ID of the attribute table of FIG. 37. Attribute IDs other than attribute ID 601 (download method for supported data), attribute ID 602 (upload method for supported data), attribute ID 1801 (list of formats of supported color profile data), attribute ID 1802 (Max. No. of retainable color profiles), attribute ID 1803 (list of currently retained color profiles), attribute ID 1804 (color profile table), and type ID 180 (color profile table type) are the same as those which are used in the Supervisor attribute table of FIG. 7. However, setting ranges and influenced ranges are limited to those under control of the color profile manager to which the attribute table belongs. The attribute ID 601 "download method for supported data" and attribute ID 602 "upload method for supported data" are the same as those which are described in descriptions of the print job manager and scan job manager, respectively, and show methods of downloading and uploading supported font data.

(Color Profile Table)

FIG. 39 shows color profiles retained by the color profile manager. This table is retained in DISK 315 as attribute values of attribute ID 1804 (color profile table) of the attribute table shown in FIG. 37. The color profile table shows a type of color profile currently managed by the color profile manager. In the table each line shows one information unit (record), and data is constituted as an aggregate of a plurality of records. Each record is constituted of a color profile ID 2701, a color profile format 2701 and a file name 2703 including color profile data. The color profile ID 2701 is an identifier allocated to the color profile by the color profile manager when the color profile data is downloaded. The color profile data comprises data transmitted from Scanner Engine 102 and correction data for correcting data transmitted to Ink Jet Printer Engine 105 to perform color matching.

(Attribute Table of Printer Controller)

FIG. 40 shows data (attribute table) retained in DISK 315 by each of the printer controllers 510, 511, 512. This table shows performances and functions of the print engine and finisher controlled by the printer controller, and values concerning the performances and functions cannot be rewritten. In the table each line shows one information unit (record), and data is constituted as an aggregate of a plurality of records. Each record content is the same as that of Supervisor shown in FIG. 7, and is constituted of attribute ID 2801, type ID 2802, and value 2803. FIG. 41 shows values of attribute ID and type ID of the attribute table of FIG. 40. Attribute IDs and type IDs other than attribute ID 12 (controller type), attribute ID 13 (controller ID), attribute ID 5001 (color print is possible or not), attribute ID 5002 (type of supported finishing), attribute ID 5003 (highest resolution that can be set), attribute ID 5004 (lowest resolution that can be set), attribute ID 5005 (job queue table), and type ID 500 (job queue table type) are the same as those used in the Supervisor attribute table of FIG. 7. However, setting ranges and influenced ranges are limited to those under control of the printer controller to which the attribute table belongs. Additionally, the attribute table of the printer controller shown in FIG. 40 is an attribute table of service ID 21 (printer controller 510), and the attribute tables of the printer controllers 511, 512 corresponding to service IDs 22, 23 are stored in DISK 315, respectively, and differ from each other.

(Job Queue Table)

FIG. 42 shows a job queue table retained by the printer controller. This table is retained in DISK 315 as attribute values of attribute ID 5005 (job queue table) of the attribute table shown in FIG. 40. The job queue table shows a state of the job managed and executed by the printer controller. In the table each line shows one information unit (record), and data is constituted as an aggregate of a plurality of records. Each record is constituted of a job ID 2901, a job status 2902 and a file name 2903 in which a job entity is retained. The job ID 2901 is an identifier allocated to the job by the printer controller when the job is transmitted to the printer controller. FIG. 43 is a diagram showing the job status 2902 (job state) of FIG. 42: 1 denotes that the job is completely executed; 2 denotes that the job is being executed by the engine; and 3 denotes that the job is on standby. The job file name 2903 is a name of a file in which the job entity is retained. As shown in FIG. 52, the job entity has a plurality of sets of attribute ID, attribute value size and attribute value.

(Attribute Table of Scanner Controller)

FIG. 44 shows data (attribute table) retained in DISK 315 by the scanner controller 420. This table shows performances and functions of the scanner engine controlled by the scanner controller, and values concerning the performances and functions cannot be rewritten. In the table each line shows one information unit (record), and data is constituted as an aggregate of a plurality of records. Each record content is the same as that of Supervisor shown in FIG. 7, and is constituted of attribute ID 3001, type ID 3002, and value 3003. FIG. 45 shows values of the attribute ID and type ID of the attribute table of FIG. 44. Attribute IDs other than attribute ID 12 (controller type), attribute ID 13 (controller ID), attribute ID 6001 (color scan is possible or not), attribute ID 6002 (maximum original size), attribute ID 6003 (highest resolution that can be set), and attribute ID 6004 (lowest resolution that can be set) are the same as those which are used in the Supervisor attribute table of FIG. 7. However, setting ranges and influenced ranges are limited to those under control of the printer controller to which the attribute table belongs.

(Structure of Command Packet)

Figure 46:
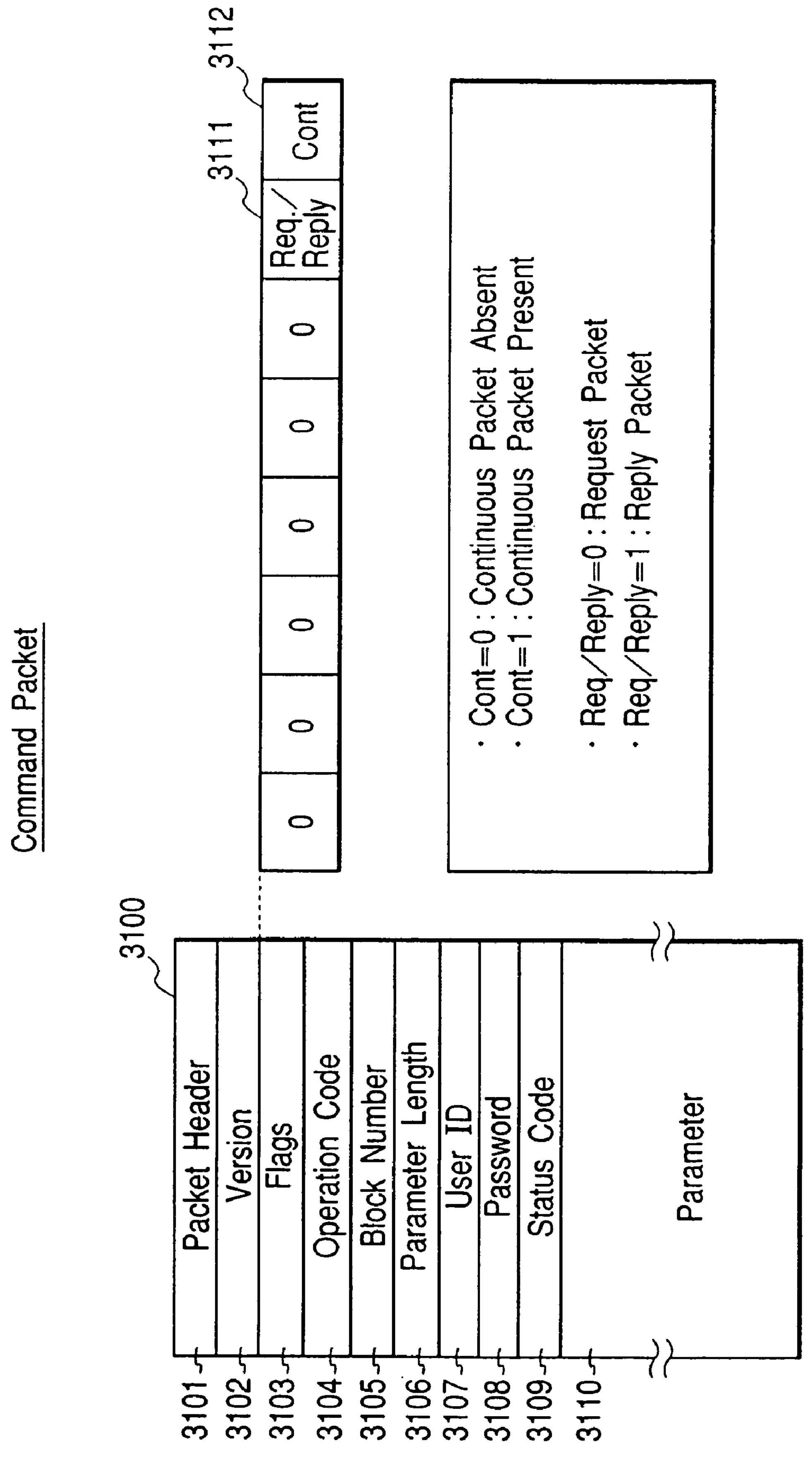
FIG. 46 is a diagram showing a structure of a command packet.

FIG. 46 shows a structure of the command packet transmitted to the interpreter 409 from the user interface manager 405, the TCP/IP, UDP/IP processing module 406, the IEEE 1284.4 processing module 407 and the SBP-2 processing module 408. The command packet also shows structures of a reply packet and an event packet transmitted to the user interface manager 405, the TCP/IP, UDP/IP processing module 406, the IEEE 1284.4 processing module 407 and the SBP-2 processing module 408 from the interpreter 409. The packet comprises a packet header 3101 indicating a top of the packet, a packet version 3102 indicating a packet structure version, a flag 3103 indicating a packet property, an operation code 3104 indicating a type of operation to be performed, a block number 3105 used for Client (PC) to recognize the reply packet, a parameter length 3106 indicating a length of parameter 3110, user ID 3107 and password 3108 for use in user authentication, a status code 3109 used only in the reply packet and indicating a general reply state, and a parameter 3110 having a format determined for each operation code 3105. The parameter 3110 includes access target service ID, access target attribute ID, and the like. The flag 3104 includes a flag 3111 indicating that the packet is a command packet, event packet or reply packet, and a continuous flag 3112 indicating that data to be transmitted cannot be included in the parameter 3110 and continued data is also included in the packet to be transmitted next. The length of the parameter 3110 is limited to a numeral (64 k byte) indicative of the parameter length 3106. Specifically, Client PC 202 and 203 connected to Ethernet 208 designate IP address and port number to connect with the multi-function peripheral 201 and output IP packet data to Network Interface 305 (107). Client PC 204 connected to IEEE 1394 interface 206 designates node ID and LUN (logical unit number) to connect to the multi-function peripheral 201 and output SBP-2 packet data to IEEE 1394 Interface 306 (108). Client PC 205 connected to IEEE 1284 interface 207 designates the socket number to connect to the multi-function peripheral 201 and outputs IEEE 1284.4 packet data to IEEE 1284 Interface 307 (109). Via Network Interface Driver 402, IEEE 1284 Interface Driver 403, and IEEE 1394 Interface Driver 404, the command packets shown in FIG. 46 with IP Header, 1284 Header, and 1394 Header added to their tops, respectively, are outputted to the TCP/IP, UDP/IP processing module 406, the IEEE 1284.4 processing module 407, and the SBP-2 processing module 408. The TCP/IP, UDP/IP processing module 406, the IEEE 1284.4 processing module 407, and the SBP-2 processing module 408 process the received transport packets to extract the command packets shown in FIG. 46 and transmit outputs to Interpreter/Generator 409.

(Processing of Command Packet)

Figure 47:
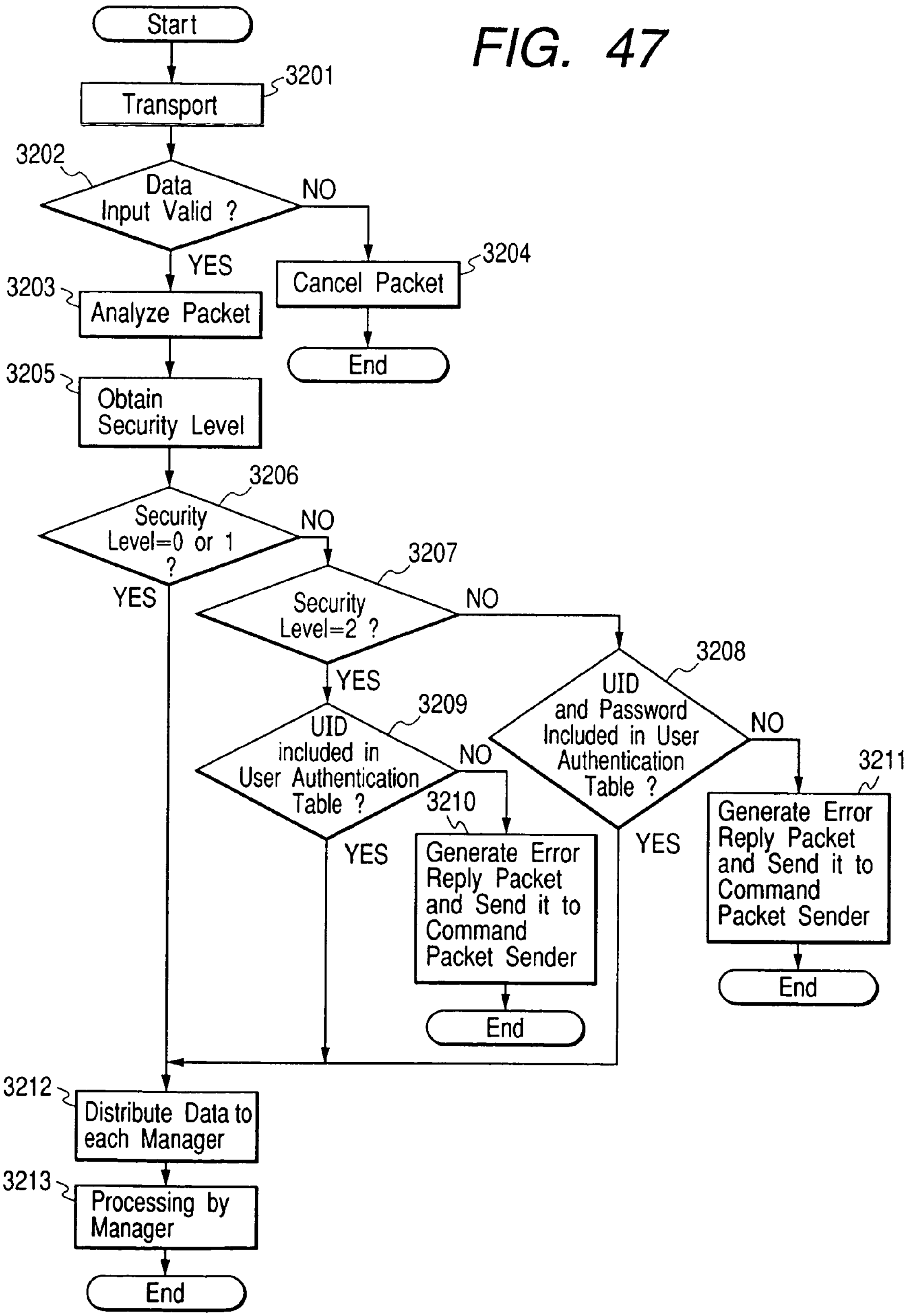
FIG. 47 is a flowchart showing a processing of the command packet.

FIG. 47 shows a processing flow of the command packet in the multi-function peripheral 201. In step 3201, data transmitted from the interfaces 401 to 404 are processed by the transport processing modules 405 to 408 to extract the command packets shown in FIG. 46. The extracted command packets, together with information of the connection type by which the data is entered (connection type ID) and the subaddress, are transmitted to the interpreter 409 from the TCP/IP, UDP/IP processing module 406, the IEEE 1284.4 processing module 407, and the SBP-2 processing module 408. In step 3202, the interpreter 409 refers to the subaddress to service ID table (FIG. 9) retained by Supervisor 410, and compares the entered connection type ID and subaddress to obtain the service ID and to check whether or not the data input is valid. As a check result, when the data input is not valid, in step 3204 the command packet is canceled to end the flow. When the data input is valid, in step 3203 the command packet is analyzed based on the packet structure of FIG. 46. As a result of the packet analysis, each item shown in FIG. 46 is outputted as independent and separate information. In step 3205, by referring to the access control table (FIG. 14) based on the service ID, the security level for the service ID is obtained.

In step 3206, it is checked whether the security level obtained in the step 3205 is 0 or 1. When the security level is 0 or 1, is transmitted to the dispatcher 412 without checking the security level (security gate 411). In the step 3206, when the security level is other than 0 and 1, in step 3207 it is checked whether or not the security level is 2. When the security level is 2, in step 3209 it is checked whether or not the user ID included in the command packet is in the user authentication table (FIG. 13). When the user ID is not included, it is judged that there is no authority. In step 3210 error reply information is generated, a packet is generated by the interpreter 409 (fill the status code 3109 with error information), and the packet is sent to a command packet sender. When the user ID is included, data is transmitted to the dispatcher 412. A sender address is extracted from the transport packet (Header). In step 3207, when the security level is other than 2, in step 3208 it is checked whether the pair of user ID and password included in the command packet is present in the user authentication table (FIG. 13). When the pair of user ID and password is not included, it is judged that there is no authority. In step 3211 the error reply information is generated, the packet is generated by the interpreter 409, and the packet is sent to the command packet sender. When the user ID is included, data is transmitted to the dispatcher 412. In step 3212 the dispatcher 412 determines a distribution addressee manager based on the service ID, and distributes to the determined manager the connection type ID and subaddress to which the data is transmitted, sender address, operation code, block number, flag information, user ID, password, parameter length and parameter. Subsequently, in step 3213 each manager processes these information.

(Access Processing of Attribute Table)

Figure 48:
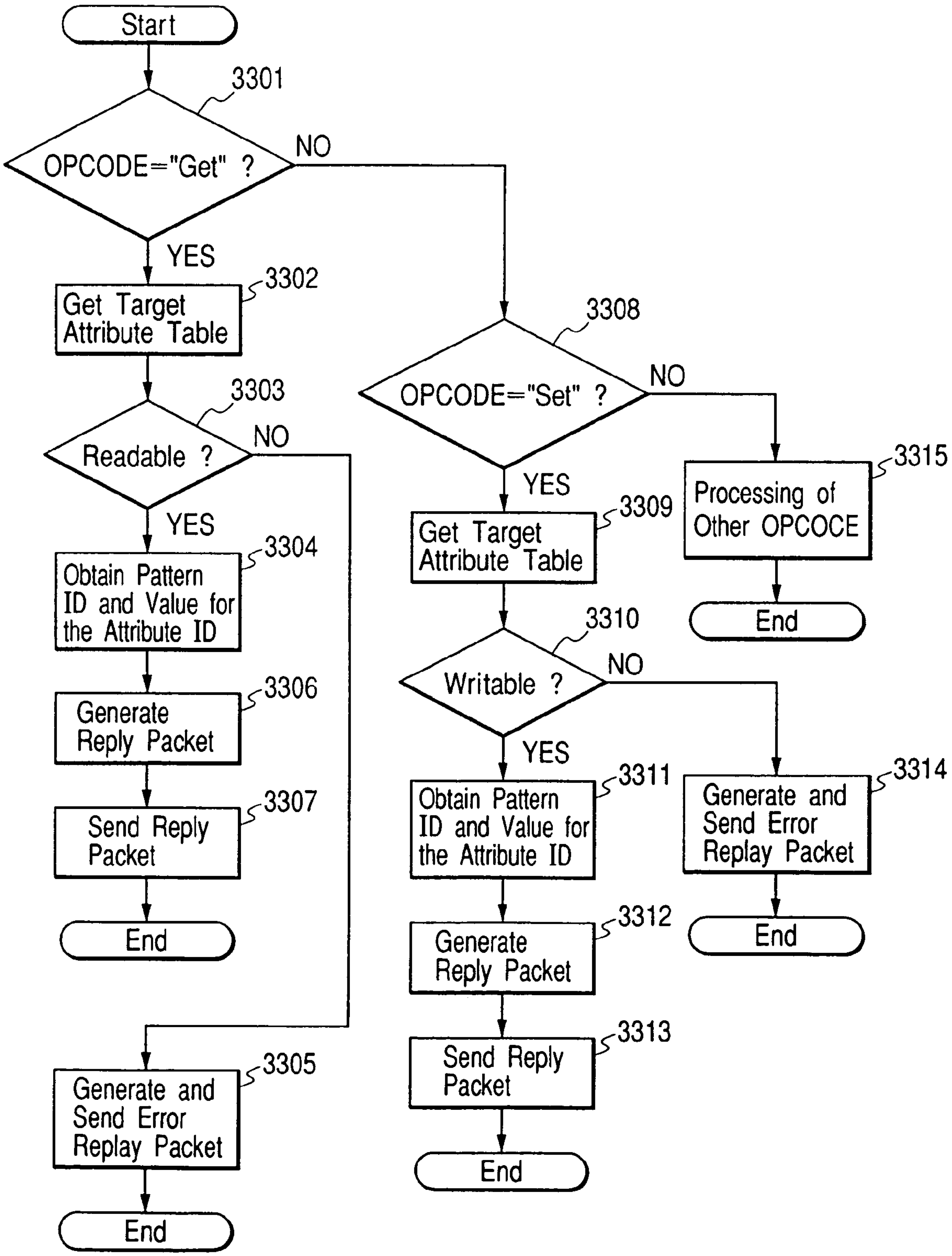
FIG. 48 is a flowchart showing an access processing of the attribute table.

FIG. 48 shows a processing when Client instructs reading or writing for the attribute table of each manager or controller retained by the multi-function peripheral 201. The reading and writing for the attribute table retained by each manager or controller are performed by transmitting an appropriate command packet to the subaddress of Supervisor. In the attribute table reading command packet, as parameters, access target service ID and access target attribute ID are included. Moreover, in the attribute table writing command packet, as parameters, access target service ID, access target attribute ID and attribute value corresponding to the attribute ID are included. The packet data transmitted to the multi-function peripheral 201 from Client is processed by the flow shown in FIG. 47, and distributed to Supervisor. In step 3301 it is checked whether or not the operation code 3104 is a code for reading the attribute value ("Get"). When the operation code is "Get", in step 3301 based on the service ID the entire attribute table of the access target is obtained. When the service ID is 0, the attribute table of Supervisor 410 shown in FIG. 7 is obtained. When the service ID is 1, 2, 3, 4, 5, 6, 7, 8, 9, the attribute table of the print job manager as shown in FIG. 18 is obtained. When the service ID is 10, the attribute table of the scan job manager 419 as shown in FIG. 22 is obtained. When the service ID is 11, 12, 13, 14, 15, 16, 17, 18, the attribute table of the copy job manager a shown in FIG. 24 is obtained. When the service ID is 101, the attribute table of the font manager 413 as shown in FIG. 26 is obtained. When the service ID is 102, the attribute table of the form overlay manager 414 as shown in FIG. 29 is obtained. When the service ID is 103, the attribute table of the log manager 415 as shown in FIG. 32 is obtained. When the service ID is 104, the attribute table of the color profile manager 416 as shown in FIG. 37 is obtained. When the service ID is 21, 22, 23, the attribute table of the printer controller as shown in FIG. 40 is obtained. When the service ID is 24, the attribute table of the scanner controller 420 as shown in FIG. 44 is obtained. Additionally, the attribute table of the print job manager shown in FIG. 18 is an attribute table of service ID 4 (print job manager 504), and the attribute tables of print job managers 501, 502, 503, 505, 506, 507, 508, 509 corresponding to service ID 1, 2, 3, 5, 6, 7, 8, 9, respectively, are stored in DISK 315. In the same manner, the attribute table of the copy job manager shown in FIG. 24 is an attribute table of service ID 18 (copy job manager 608), and the attribute tables of copy job managers 601 to 607 corresponding to service IDs 11 to 17, respectively, are stored in DISK 315. Furthermore, in the same manner, the attribute table of the printer controller shown in FIG. 40 is an attribute table of service ID 21 (printer controller 510), and the attribute tables of printer controllers 511, 512 corresponding to service IDs 22, 23, respectively, are stored in DISK 315.

Thereafter, in step 3303, it is examined whether or not the designated attribute value can be obtained. The examination is performed by obtaining a value of "attribute ID list available only for the manager" (attribute ID=105) of the target attribute table, and checking whether or not the attribute ID instructed to be obtained is included. When the attribute ID is included, the value cannot be obtained. Therefore, in step 3305 the error reply packet is generated, and transmitted, thereby ending the flow. When the attribute ID is not included, in step 3304 the attribute table is searched based on the designated attribute ID, and pattern ID having the corresponding attribute ID and attribute value are obtained. In step 3306, based on the pattern ID the reply packet is generated, and in step 3307 the reply packet is transmitted, thereby ending the flow. When in step 3301 the operation code is not "Get", in step 3308 it is checked whether or not the operation code is an attribute value writing code ("Set"). When the operation code is "Set", in step 3309 based on the service ID an access target attribute table is entirely obtained. Thereafter, in step 3310, it is examined whether or not the designated attribute value can be set. The examination is performed by obtaining a value of "attribute ID list which can be set only by the manager" (attribute ID=104) of the target attribute table, and checking whether or not the attribute ID instructed to be set is included. When the attribute ID is included, the value cannot be obtained. Therefore, in step 3314 the error reply packet is generated, and transmitted, thereby ending the flow. When the attribute ID is not included, in step 3311 based on the designated attribute ID the attribute table is searched, and the pattern ID having the corresponding attribute ID and attribute value are obtained. In step 3312, the attribute value designated based on the pattern ID is set, and the reply packet informing that the setting has succeeded is generated. In step 3313 the reply packet is transmitted, thereby ending the flow. In step 3308 when the operation code is not "Set", another processing step 3315 described later is performed in accordance with the operation code to end the flow.

(Service ID List Inquiry Processing)

Figure 49:
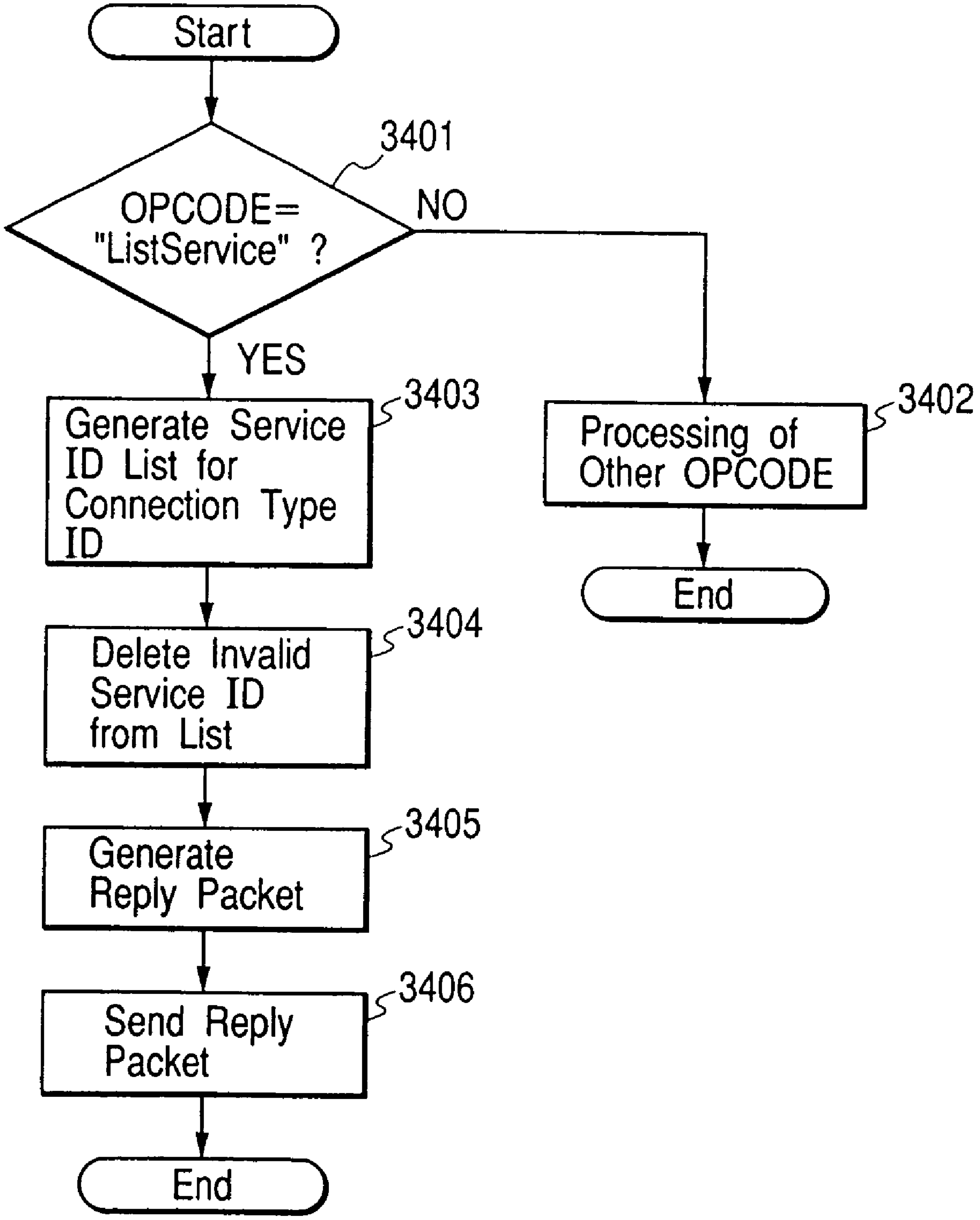
FIG. 49 is a flowchart of a service ID list inquiry processing.

FIG. 49 shows a processing when Client inquires a list of services (list of service ID) provided by the multi-function peripheral 201. The inquiry for the service list is performed by transmitting an appropriate command packet to the subaddress of Supervisor, and reading and processing the subaddress to service ID table shown in FIG. 9. The flow shown in FIG. 49 shows details of the step 3315 (processing of other Operation Code) of the flow shown in FIG. 48. In step 3401, it is checked whether or not the operation code is a service list obtaining code ("List Service"). When the operation code is not "List Service", other processing step 3402 described later in accordance with the operation code is performed to end the flow. In step 3401, when the operation code is "List Service", in step 3403, only the service IDs corresponding to the connection type ID used in the inquiry are extracted from the subaddress to service ID table to generate the list. In step 3404, each record of the list prepared in the step 3403 is examined. When the valid flag 804 is valid, and there is a value in the valid user list 805, the record not corresponding to the value for the user ID used in the inquiry is deleted. When there is a value in the invalid user list 806, the record corresponding to the value for the user ID used in the inquiry is deleted from the list. In step 3405, the reply packet including the service ID list updated in the step 3404 is generated, and the generated reply packet is transmitted in step 3406.

(Subaddress Inquiry Processing)

Figure 50:
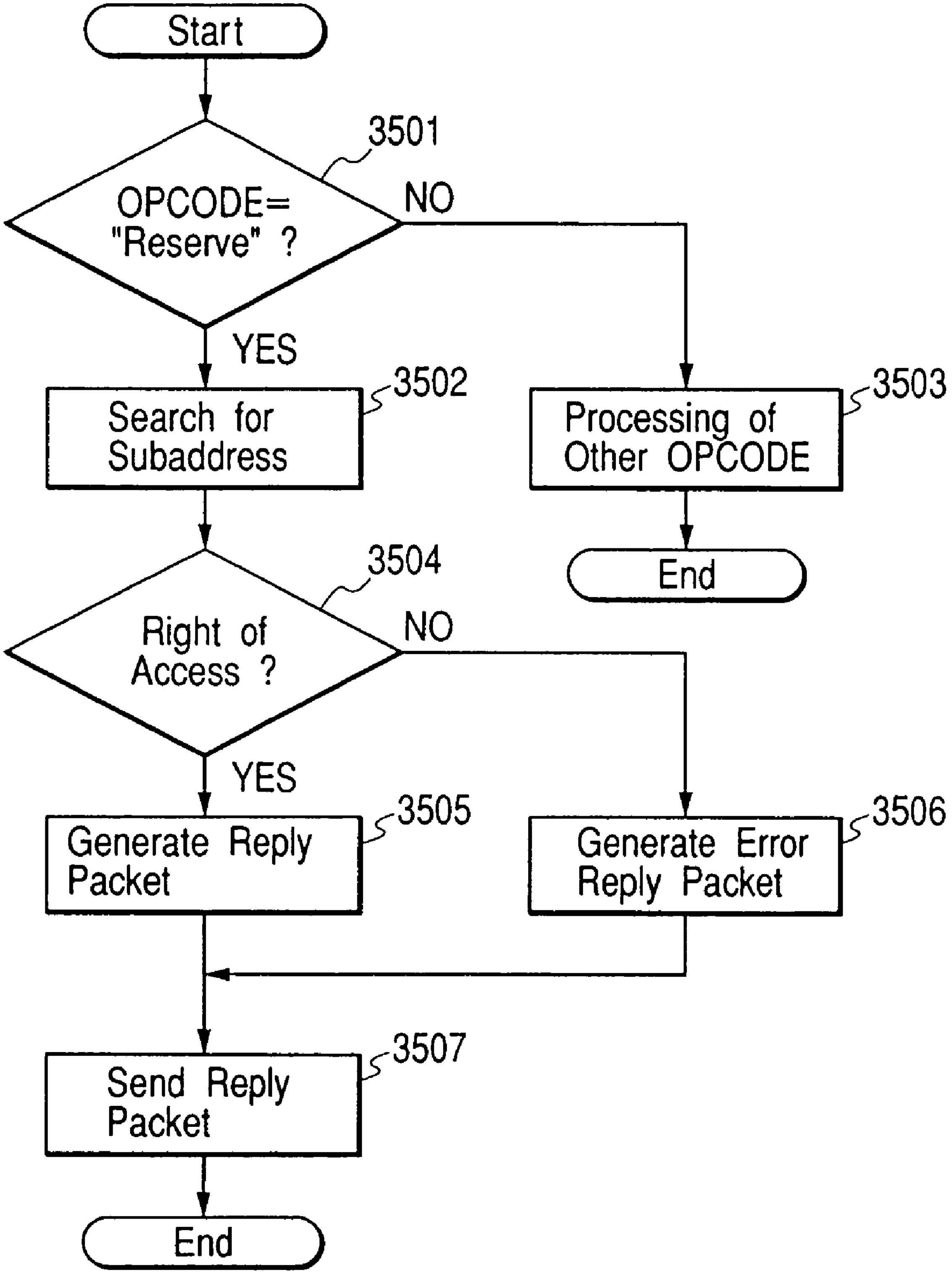
FIG. 50 is a flowchart of a subaddress inquiry processing.

FIG. 50 shows a processing when Client designates service ID to inquire subaddress information necessary for using the service provided by the multi-function peripheral 201. The inquiry of the subaddress is performed by transmitting an appropriate command packet to the subaddress of Supervisor 410, and reading and processing the subaddress to service ID table shown in FIG. 9. The subaddress inquiry command packet includes the service ID as the parameter. The flow shown in FIG. 50 shows details of the step 3402 (processing of other Operation Code) of the flow shown in FIG. 49. In step 3501, it is checked whether or not the operation code is a subaddress obtaining code ("Reserve"). When the operation code is not "Reserve", other processing step 3502 described later in accordance with the operation code is performed to end the flow. In step 3501, when the operation code is "Reserve", in step 3502, from the connection type ID used in the inquiry and the service ID designated in the parameter, the subaddress to service ID table is scanned to search for the corresponding record. For the record searched in the step 3504, it is checked whether or not the valid flag is valid. When there is a value in the valid user list, it is checked whether or not the user ID used in the inquiry is in the list. When there is a value in the invalid user list, it is checked whether no user ID used in the inquiry is in the list. As a check result, when answer is not OK, it is judged that there is no right to access (right to use) the designated service. In step 3506 the error reply packet is generated, and in step 3507 the packet is sent, thereby ending the flow. As a result of the check in the step 3504, when the answer is all OK, in step 3505 the reply packet including the subaddress is generated, and in step 3507 the packet is sent, thereby ending the flow.

(Task Type Designated Service ID Inquiry Processing)

Figure 51:
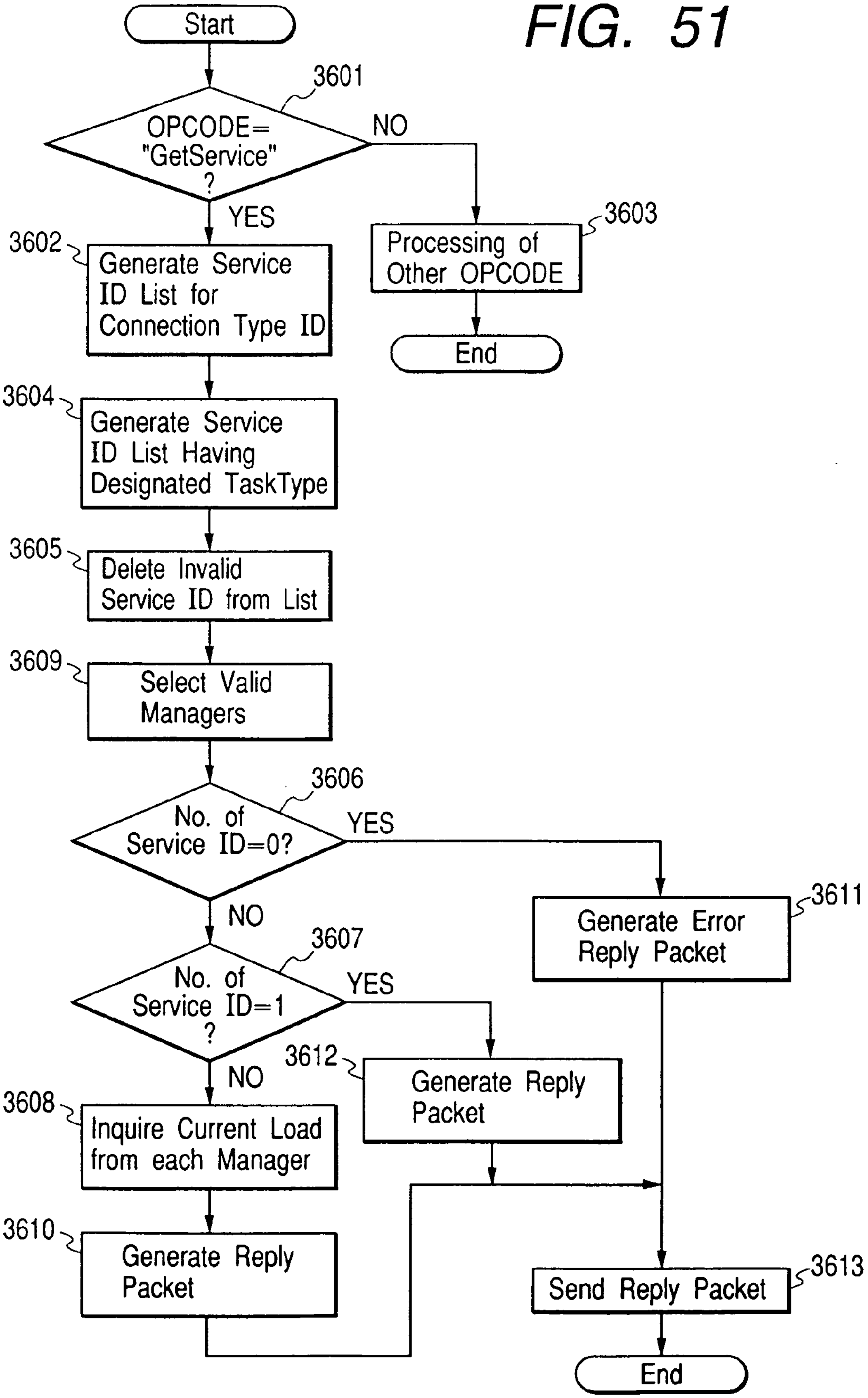
FIG. 51 is a flowchart of an inquiry processing of service ID with a designated task type.

FIG. 51 shows a processing flow for designating a service type and inquiring an optimum service ID to process the designated type of service, among the services provided by the multi-function peripheral 201. The inquiry of the service ID with the designated service type is performed by transmitting an appropriate command packet to the subaddress of Supervisor, and reading and processing the subaddress to service ID table shown in FIG. 9 and the service ID to task type table shown in FIG. 11. The subaddress ID inquiry command packet includes the task type for designating the service type, and a combination (condition information) for limiting the service as parameters. The condition information is shown as a list of a pair of attribute ID and value. The flow shown in FIG. 51 shows details of the step 3503 (processing of other Operation Code) of the flow shown in FIG. 50. In step 3601, it is checked whether or not the operation code is a subaddress obtaining code ("Get Service"). When the operation code is not "Get Service", other processing step 3603 described later in accordance with the operation code is performed to end the flow. In the step 3601 when the operation code is "Get Service", in step 3602 from the connection type ID used in the inquiry and the subaddress to service ID table, a service ID list having the connection type ID used in the inquiry is generated. In step 3604, the service ID to task type table is referred to, and a list of service IDs having the designated task type is generated from the above-described list. In step 3605, each record of the list generated in the step 3604 is examined. When the valid flag 804 is valid, and there is a value in the valid user list 805, the record not corresponding to the value for the user ID used in the inquiry is deleted. When there is a value in the invalid user list 806, the record corresponding to the value for the user ID used in the inquiry is deleted from the list. In step 3609, the condition information included in the parameter and the attribute table of each manager for the service ID in the list are compared, and values other than values satisfying the conditions are deleted from the list. In step 3606, the number of records of the list changed in the step 3605 is checked. When the number of records is 0, it is judged that there is no requested service. In step 3611 the error reply packet is generated, and in step 3613 the reply packet is sent, thereby ending the flow. In the step 3606 when the number of records is other than 0, in step 3607 it is checked whether or not the number of records is 1. When the number of records is 1, in step 3612 the reply packet including the obtained service ID is generated, and in step 3613 the reply packet is sent, thereby ending the flow. In the step 3607, when the number of records is other than 1, in step 3608, the current load state is inquired of each manager for the service ID in the list. The managers return the number of jobs being processed as the load state, and from these the manager having a lowest load is selected. In step 3610, the reply packet including the service ID of the selected manager is generated, and in the step 3613 the reply packet is sent, thereby ending the flow.

(Job Structure)

FIG. 52 shows an inner structure of a file (job file) which retains the job entity managed by each manager. The file name of the job file is retained in the file name 1502 of the job table (FIG. 20). The file structure also shows an inner structure of a file retaining the job entity managed by each controller. The file name is retained in the file name 2903 of the job queue table (FIG. 42). The job entity is constituted of a plurality of continuous sets of attribute ID 3701, attribute value size 3702 and attribute value 3703. When the job includes data, as shown in 3707, 3708, 3709, a value indicating data as the attribute ID, file name size as the attribute value size, and file name of the file retaining the document data as the attribute value are retained. The attribute includes data transmission method, data format (used PDL, and the like), event type and information such as addressee to which event notification is sent when the event occurs, and information dependent on the job type such as, for the print job, the number of copy sheets, finishing processing designation, designation of font for use, designation of form overlay for use, and the like.

(Job Script Processing in Each Manager)

Figure 53:
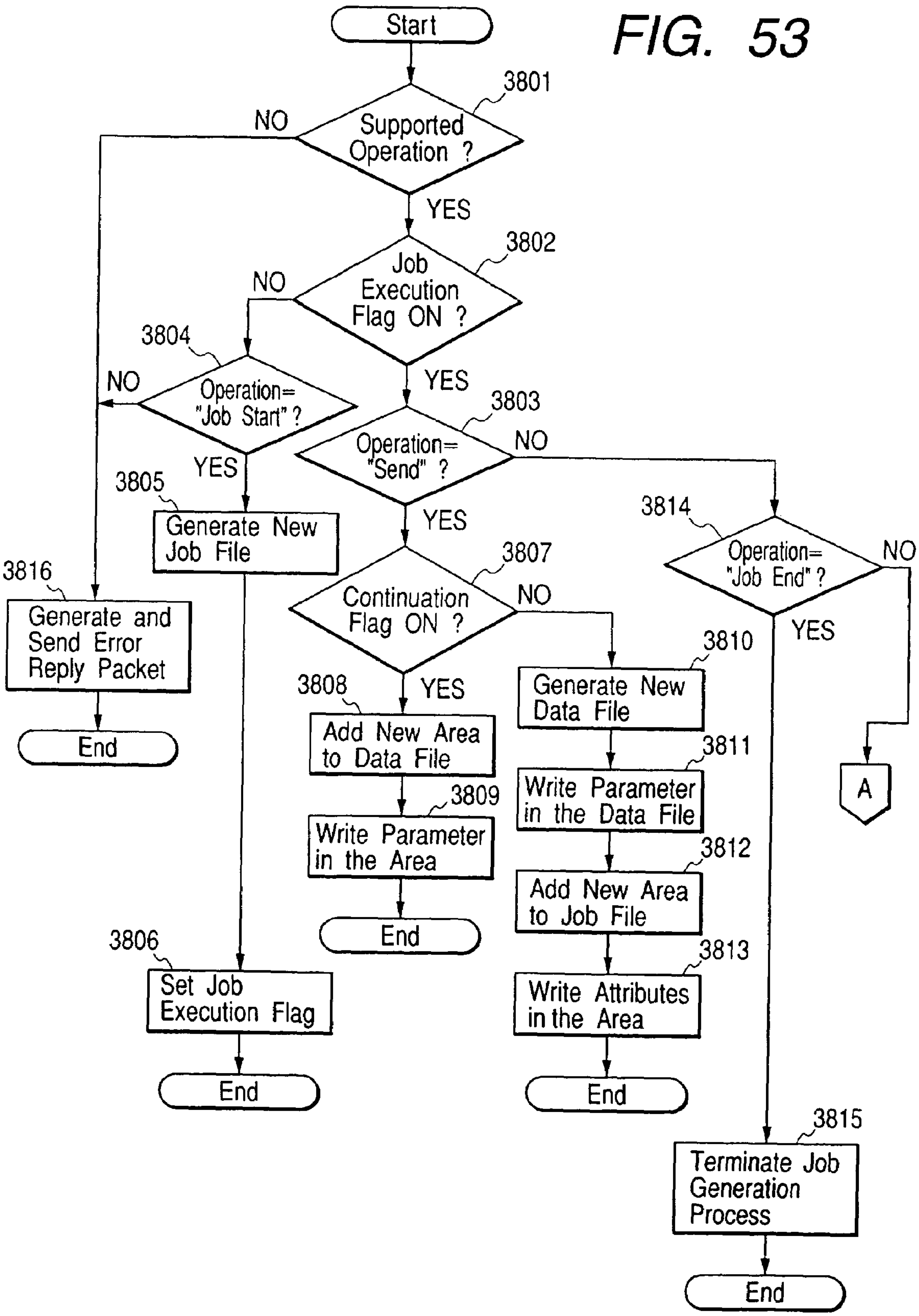
FIG. 53 is a flowchart of a job script processing in each manager.
Figure 54:
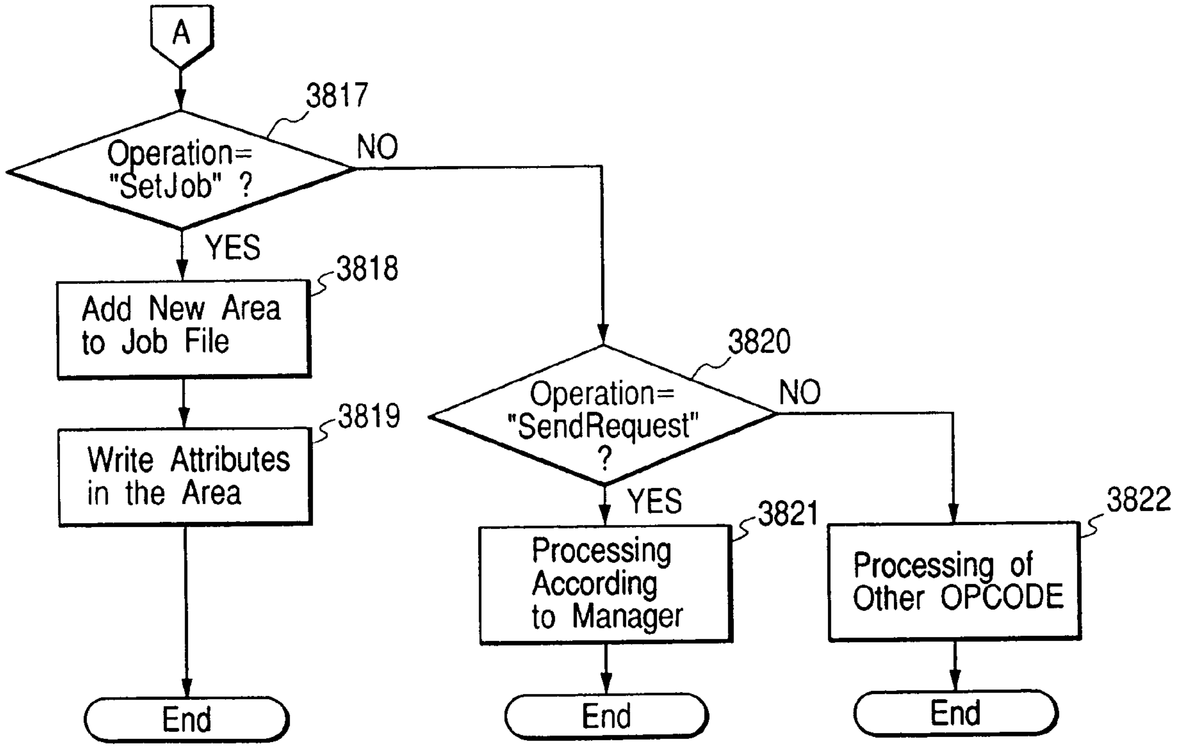
FIG. 54 is a flowchart of the job script processing in each manager.

FIGS. 53 and 54 show a processing flow of the job script in each manager. The job script is constituted of a series of command packets shown in FIG. 46, and prescribed to start with operation code "Job Start" and end with operation code "Job End". Each packet constituting the job script is placed in the subaddress shown by the subaddress to service ID table shown in FIG. 9, and distributed to each manager by the command packet processing flow shown in FIG. 47. The processing flow shown in FIG. 53 is a processing flow for processing the command packet distributed to each manager to generate the job file and data file shown in FIG. 52. For the operation distributed to each manager, in step 3801 it is checked whether or not the operation code is a supported operation code. The check is performed by comparing with the value of attribute "supported operation" (attribute ID 101) retained in the attribute table by each manager. As a result of the check, when the operation is not supported, in step 3816 the error reply packet is generated and sent, thereby ending the flow. In the step 3801 when the operation code is supported, in step 3802 it is checked whether or not the job is being executed. The check is performed by examining whether or not a job execution flag (flag set in step 3806) is true. As a result of the examination, when the job execution flag is false, and the job is not executed, in step 3804 it is checked whether or not the operation code is "Job Start". As a result of the check, when the operation code is not "Job Start", in step 3816 the error reply packet is generated and sent, thereby ending the flow.

When the answer to the step 3804 is OK, in step 3805 the job ID is allocated to add an item to the job table (FIG. 20), and a new job file is generated. Thereafter, in step 3806 the job execution flag is set to be true, thereby ending the command packet processing. In the check of step 3802, when the job execution flag is true, in step 3803 it is checked whether the operation code is "Send". The operation code "Send" informs the manager that the parameter includes data constituting the job. In the step 3803 when the operation code is "Send", in step 3807 a continuation flag entered with the command is checked. When the continuation flag is true, in step 3808 a new area is added to already present data file 3713, and in 3809 the parameter is written in the area, thereby ending the flow. In the step 3807 when the continuation flag is false, in step 3810 new data file 3713 is generated, and in step 3811 the parameter is written in the data file. Thereafter, in step 3812 a new area is added to the job file, and in step 3813 the attribute ID 3707 indicating data, the file name size 3708 and the file name 3709 of the new generated file are written in the area, thereby ending the flow. In the step 3803 when the operation code is not "Send", in step 3814 it is checked whether the operation code is "Job End". When the operation code is "Job End", in step 3815 job generation processing is terminated, thereby ending the flow. The job generation terminating processing includes processings such as closing of the job file, and the like, and differs with manager types (print job, scan job, copy job, font, form overlay, log, color profile).

In the step 3814, when the operation code is not "Job End", in step 3817 it is checked whether the operation code is "Set Job". The operation code "Set Job" informs the manager that the parameter includes the attribute (attribute ID and attribute value) constituting the job. When the job operation code is "Set Job", in step 3818 a new area is added to the job file, and in step 3819 the attribute ID, attribute value size and attribute value are written in the added area, thereby ending the flow.

In the step 3817, when the operation code is not "Set Job", in step 3820 it is checked whether the operation code is "Send Request". The operation code "Send Request" instructs the manager to transmit the data, and the data transmission method is included as the parameter. When the operation code is "Send Request", in step 3821 a processing according to each manager is performed to end the flow. In the processing of the step 3821 for the scan job manager, the scanner controller is instructed to scan the original in accordance with the attribute value retained in the job file, and to transmit obtained data in a designated method. For the font manager, the processing includes transmission of the font data designated as the attribute value in the job file immediately in a designated transmission method. In the step 3820 when the operation code is not "Send Request", in step 3822 other operation codes are processed to end the flow.

(Job Processing in Print Job Manager)

Figure 55:
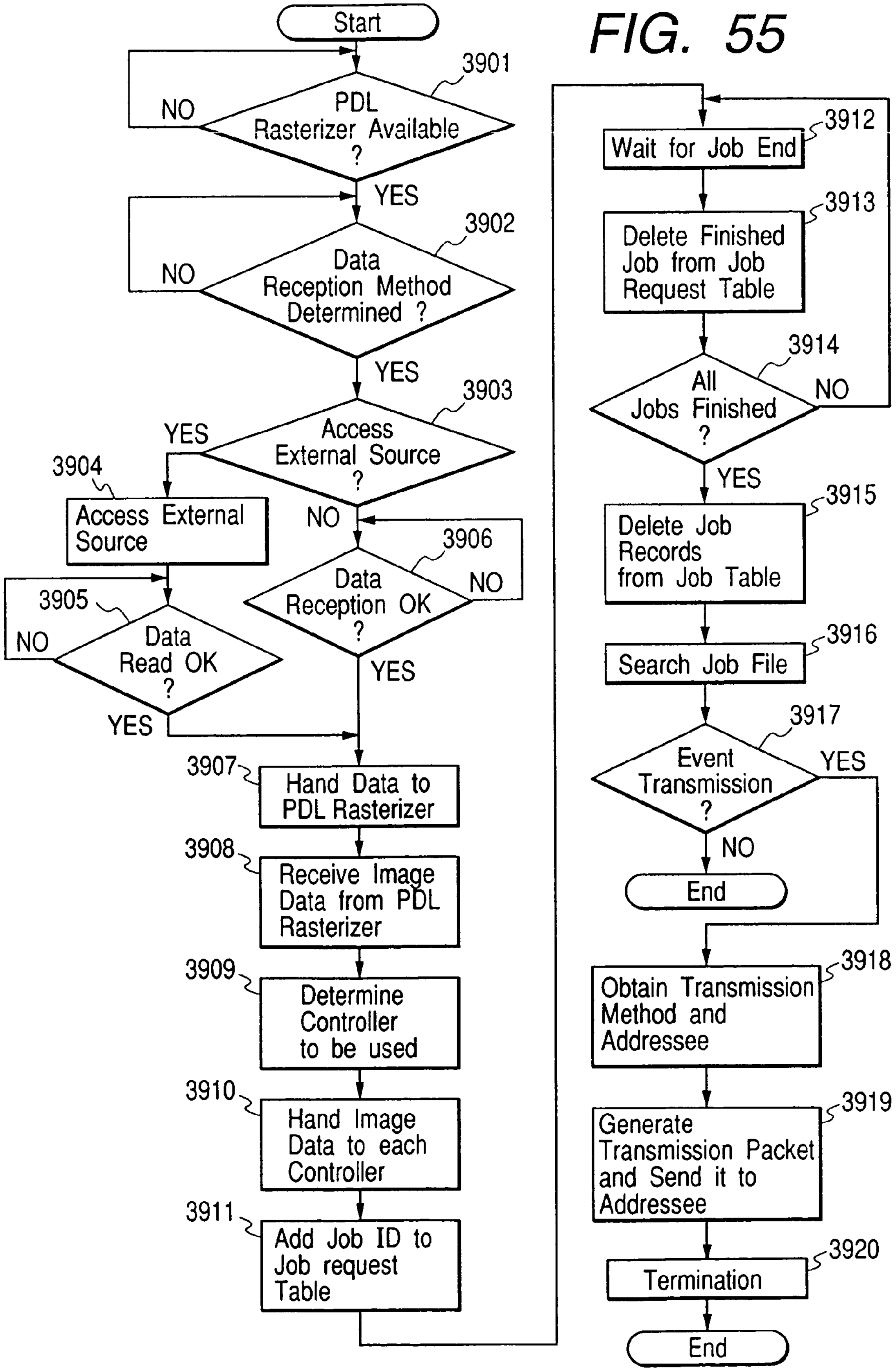
FIG. 55 is a flowchart of a job processing in the print job manager.

FIG. 55 shows a job processing flow in the print job managers 501 to 509 shown in FIG. 5. The print job manager operates a task of constantly monitoring the job table. The print job manager performs the job script processing flow shown in FIG. 54. Subsequently, when it is detected that a new item is added to the job table by input of operation code "Job Start", the monitor task operates a task having the processing flow shown in FIG. 55 to process the input job. In step 3901 the manager waits until an attribute indicating a PDL (Page Description Language) type used in representation of data (document data) is added to the job file. When the PDL type is determined, the manager waits until PDL Rasterizer for use (PDL Rasterizer 417 or 418) can be used. In the step 3901 when the PDL Rasterizer becomes ready for use, in step 3902 the manager waits until the attribute indicating data reception method is added to the job file. When the attribute indicating the data reception method is added to the job file, in step 3903 the data reception method is checked. When the data reception method comprises accessing an external source (e.g., Client PC on the network, and the like) of the multi-function peripheral 201, in step 3904 a task for reading the designated data is generated to access the external source. Subsequently, in the step 3905 the manager waits for start of the data reading. When in the step 3903 data is included in the job (in FIG. 54 in data reception by operation code "Send"), in step 3906 the manager waits for start of data reception.

Figure 61:
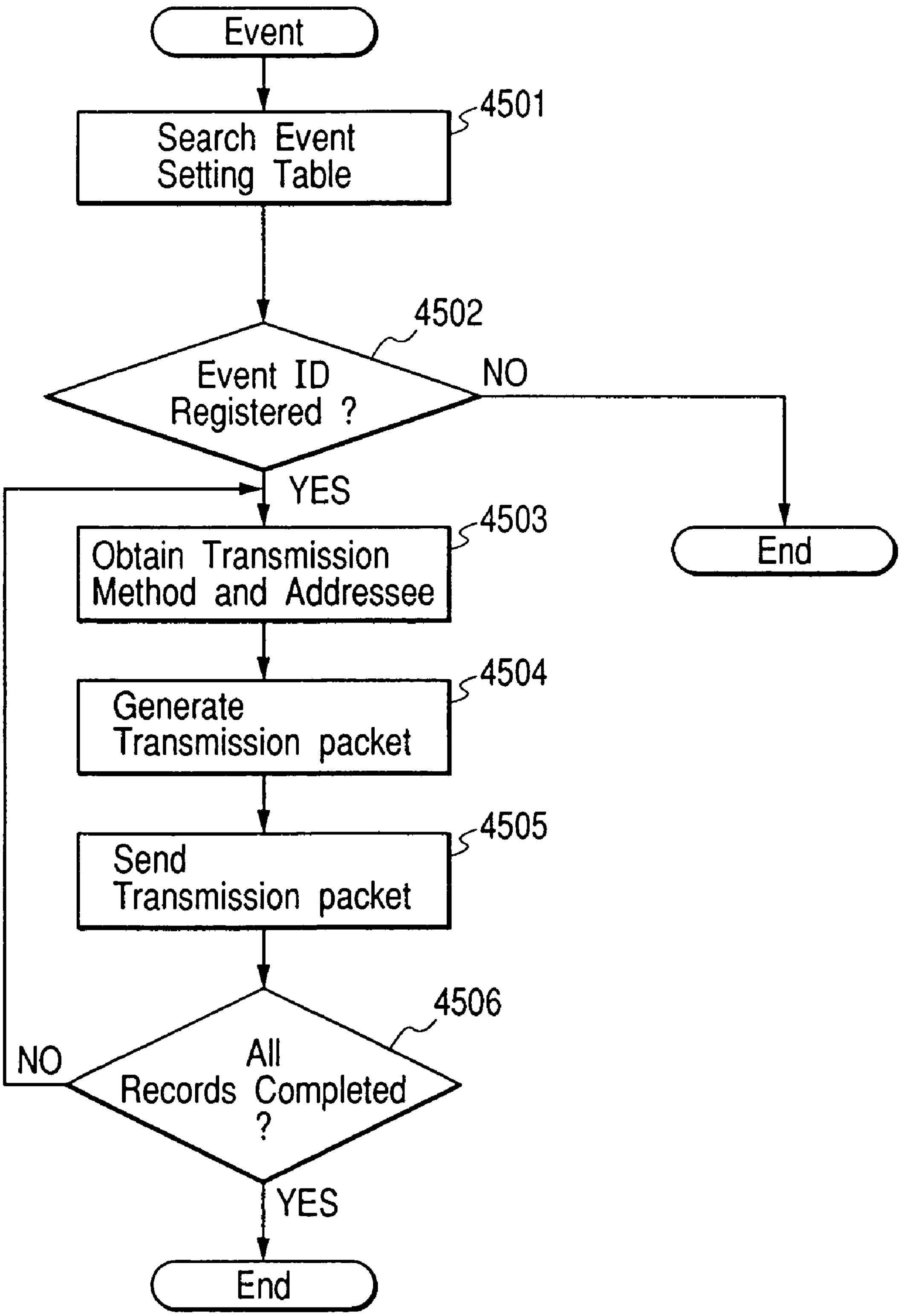
FIG. 61 is a flowchart of event transmission.

When in the step 3905 or 3906 the data reading or reception is started, in step 3907 data starts to be handed to PDL Rasterizer. Subsequently, in step 3908 image data is received from PDL Rasterizer. In step 3909 the printer controller to be used is determined. The determination includes a case where the controller is predetermined by the attribute ID 2001 (list of Controller ID executing Job) of the attribute table of the print job managers 501 to 507 and 509, and a case where attribute ID 2002 (Controller automatic selection is possible or not) of the print job manager 508 is designated to be possible and the printer controller necessary for print is dynamically determined by reading the print job file content (attribute ID and attribute value of the job file shown in FIG. 52). In this case, for example, if color printing is designated by the attribute ID and attribute value in the job file, Ink Jet Controller 512 (CID 23) is determined. When the use of Finisher is designated by the attribute ID and attribute value, LBP Controller 510 (CID 21) is determined. When the printer controller is determined, in step 3910 image data is handed to each printer controller and job ID is received from the printer controller. In step 3911 in the job request table (FIG. 21), the job ID, printer controller ID, and job ID received from the printer controller are recorded as separate record for each printer controller. Subsequently, in step 3912 the print job manager waits for job end in each printer controller. When the job end is notified from the printer controller, in step 3913 the corresponding record is deleted from the job request table. In step 3914 it is checked whether all the requested jobs of the printer controllers are finished. When the job still remains in the printer controller, the flow returns to the step 3912 to wait for the job end in the printer controller. When in the step 3914 the requested jobs in all the printer controllers are finished, in step 3915 the job record is deleted from the job table (FIG. 20). In this case, the event transmission processing shown in FIG. 61 is performed. In step 3916, the job file is searched, and in step 3917 it is checked whether there is an attribute value instructing the event transmission concerning the job end. If not, the processing ends. When the attribute value is present, in step 3918 the attribute value is read to obtain the transmission method and addressee. In step 3919 the event transmission packet is generated, and the event is sent to the designated transmission method and addressee. In step 3920, termination processings such as deletion of the job and data files, and the like are performed, thereby ending the job processing.

(Job Processing in Scan Job Manager)

Figure 56:
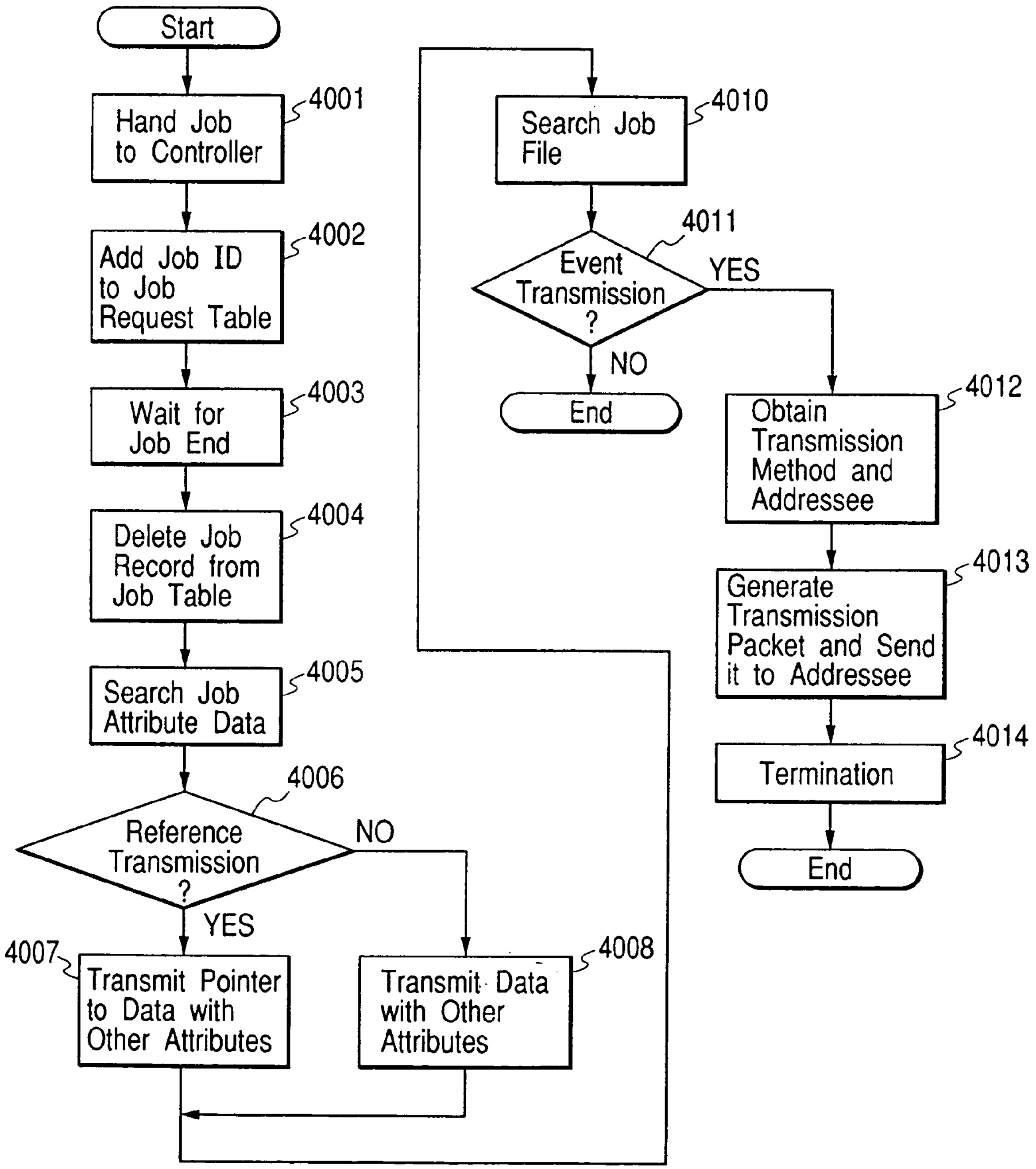
FIG. 56 is a flowchart of the job processing in the scan job manager.

FIG. 56 shows a job processing flow in the scan job manager 419. After the handing of the job is finished, the scan job manager starts a job processing. Therefore, the scan job manager starts the job processing of FIG. 56 as the job termination processing of the step 3815 in FIG. 54. In step 4001, the job is handed to the scanner controller 420 and job ID is received. In step 4002, to the job request table (FIG.

Figure 62:
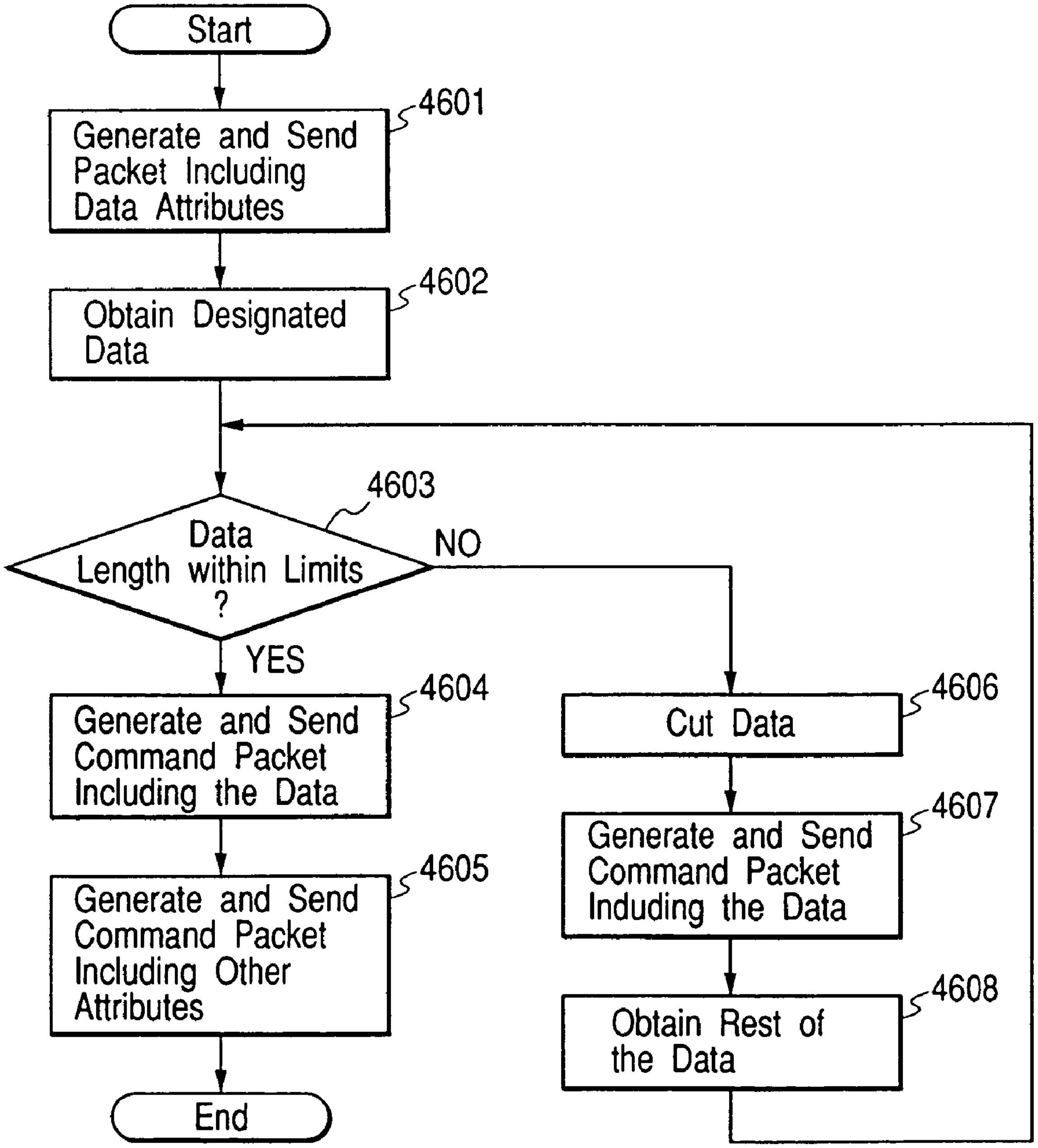
FIG. 62 is a flowchart of data (script) transmission from an apparatus.

21), the job ID, scanner controller ID, and job ID received from the scanner controller 420 are recorded. In step 4003 the scan job manager waits for job end from the scanner controller 420. When the job end is notified from the scanner controller 420, scanned image data is received from the scanner controller 420, and in step 4004 the job record is deleted from the job table (FIG. 20). In this case, the event transmission processing shown in FIG. 61 is performed. In step 4005 the job attribute data is searched for the attribute instructing the data transmission method. When in step 4006 for the data transmission method the data is instructed to be sent as a script, in step 4008 the data is transmitted with other attribute information as the script. Details of processing for data transmission from the apparatus are shown in FIG. 62. When in the step 4006 reference transmission of data is instructed, in step 4007 the data is stored in the apparatus, and reference information for the data is transmitted with the other attribute information as the script. In step 4010 the job file is searched, and in step 4011 it is checked whether there is an attribute value instructing the event transmission concerning the job end. If not, the processing ends. When the attribute value is present, in step 4012 the attribute value is read to obtain the transmission method and addressee. In step 4013 the event transmission packet is generated, and the event is sent to the designated transmission method and addressee. In step 4014, termination processings such as deletion of the job and data files, and the like are performed, thereby ending the job processing.

(Job Processing in Copy Job Manager)

Figure 57:
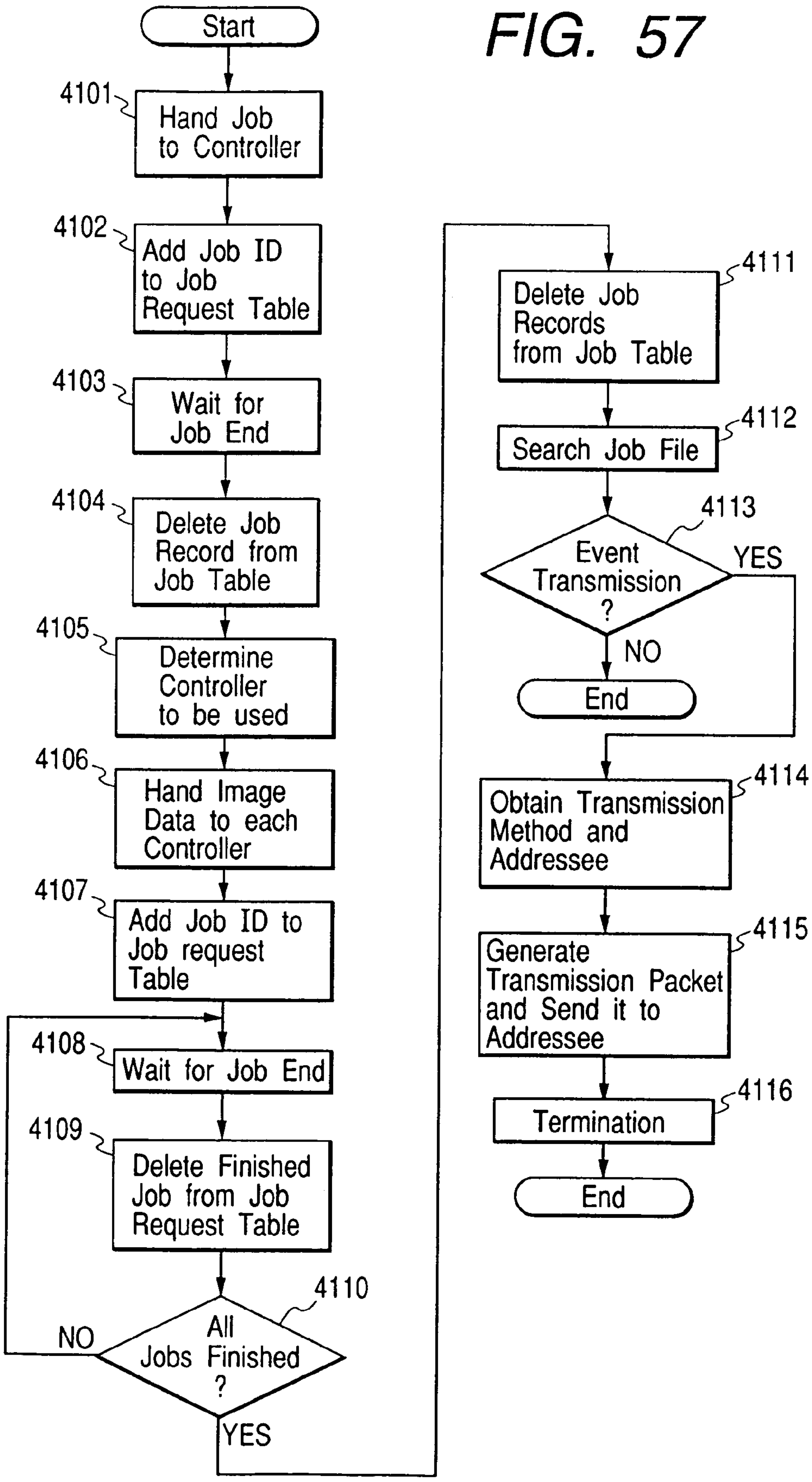
FIG. 57 is a flowchart of the job processing in the copy job manager.

FIG. 57 shows a job processing flow in the copy job managers 601 to 608. After the handing of the job is finished, the copy job manager starts a job processing. Therefore, the copy job manager starts the job processing of FIG. 57 as the job termination processing of the step 3815 in FIG. 53. In step 4101, the job is handed to the scanner controller 420 and job ID is received. In step 4102, to the job request table (FIG. 21), the job ID, scanner controller ID, and job ID received from the scanner controller 420 are recorded. In step 4103 the manager waits for job end from the scanner controller 420. When the job end is notified from the scanner controller 420, scanned image data is received from the scanner controller 420, and in step 4104 the job record is deleted from the job table (FIG. 20). Subsequently, in step 4105 the printer controller to be used is determined. The determination includes a case where the controller is predetermined by the attribute ID 2001 (list of Controller ID executing Job) of the attribute table of the copy job managers 601 to 607 and 609, and a case where attribute ID 2002 (Controller automatic selection is possible or not) of the copy job manager 608 is designated to be possible and the printer controller necessary for print is dynamically determined by reading the job file content (attribute ID and attribute value of the job file shown in FIG. 52). In this case, for example, if color printing is designated by the attribute ID and attribute value in the job file, Ink Jet Controller 512 (CID 23) is determined. When the use of Finisher is designated by the attribute ID and attribute value, LBP Controller 510 (CID 21) is determined. When the printer controller is determined, in step 4106 the image data received from the scanner controller 420 is handed to each printer controller and job ID is received from the printer controller. In step 4107, to the job request table (FIG. 21), the job ID, printer controller ID, and job ID received from the printer controller are recorded as separate record for each printer controller.

Subsequently, in step 4108 the print job manager waits for job end in each printer controller. When the job end is notified from the printer controller, in step 4109 the corresponding record of the finished job is deleted from the job request table. In step 4110 it is checked whether all the requested jobs of the printer controllers are finished. When the job still remains in the printer controller, the flow returns to the step 4108 to wait for the job end in the printer controller. When in the step 4110 the requested jobs in all the printer controllers are finished, in step 4111 the job record is deleted from the job table (FIG. 20). In this case, the event transmission processing shown in FIG. 61 is performed. In step 4112, the job file is searched, and in step 4113 it is checked whether there is an attribute value instructing event transmission concerning the job end. If not, the processing ends. When the attribute value is present, in step 4114 the attribute value is read to obtain the transmission method and addressee. In step 4115 the event transmission packet is generated, and the event is sent to the designated transmission method and addressee. In step 4116, termination processings such as deletion of the job and data files, and the like are performed, thereby ending the job processing.

(Job Processing Download)

Figure 58:
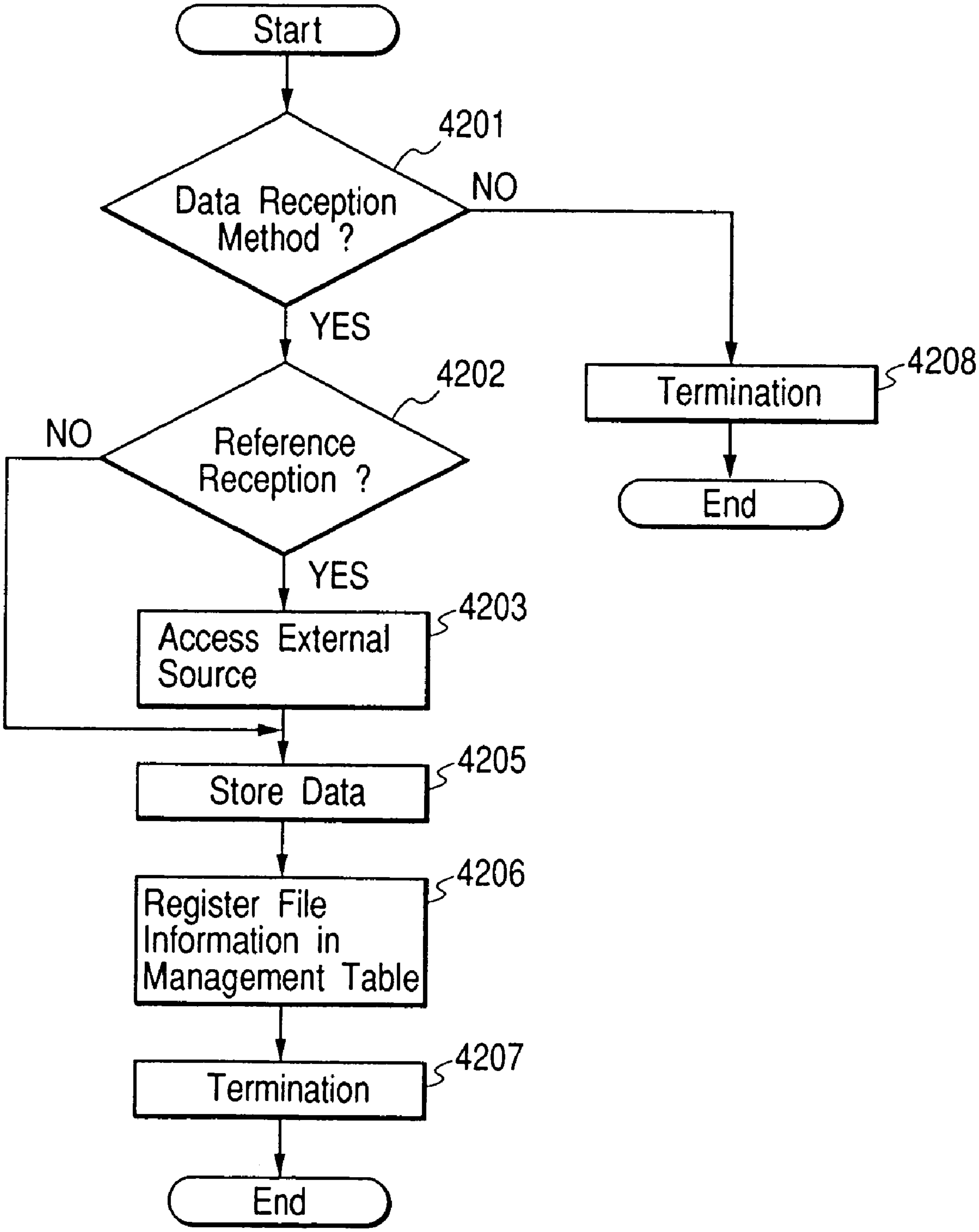
FIG. 58 is a flowchart of the job processing (download) in the font manager, form overlay manager, log manager, and color profile manager.
Figure 59:
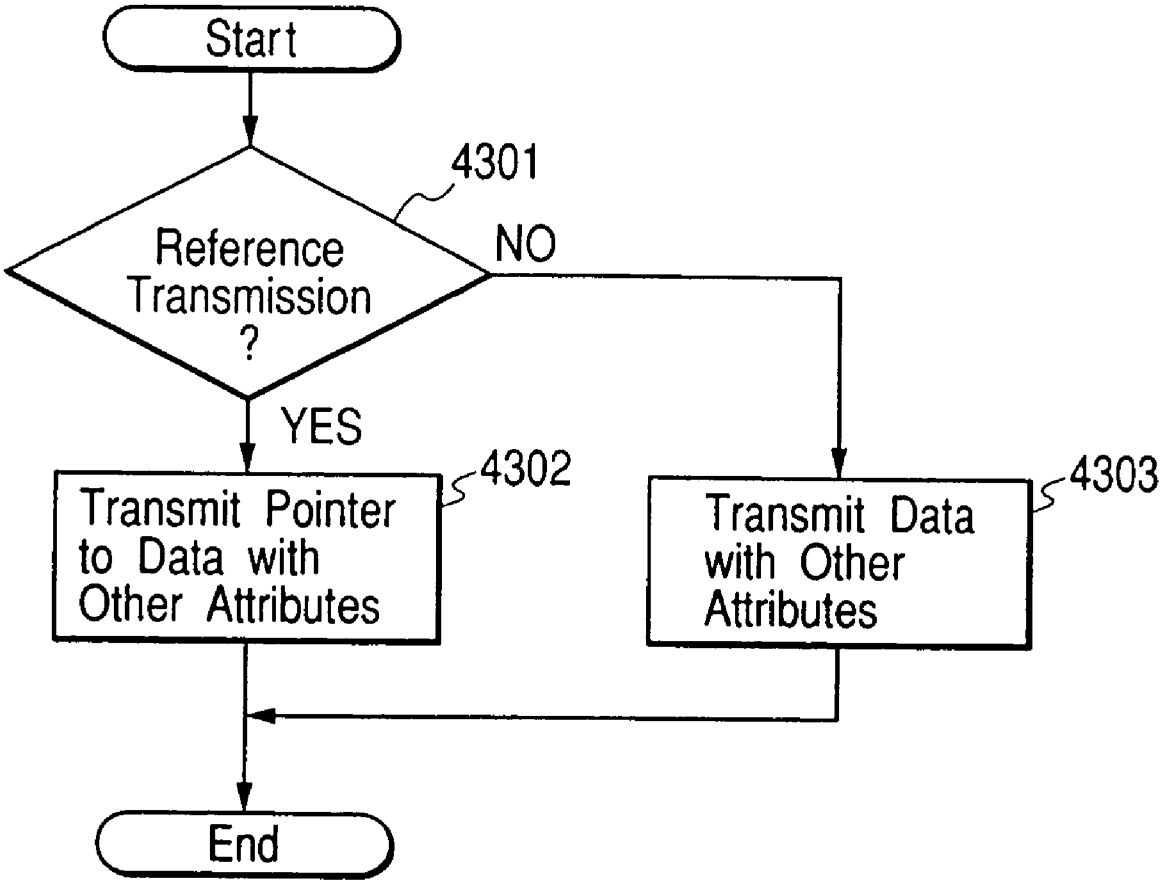
FIG. 59 is a flowchart of the job processing (upload) in the font manager, form overlay manager, log manager, and color profile manager.

FIG. 58 shows a flow concerning a data download function in the job processing flows in the font manager 413, form overlay manager 414, log manager 415 and color profile manager 416. In the job for the managers, the data managed by each manager is downloaded and uploaded. For management such as reference and deletion of the data managed by each manager, the command packet is handed to the subaddress managed by Supervisor 410 and the attribute table of each manager is accessed as shown in FIG. 48. After the handing of the job is finished, each manager starts a job processing concerning data download. Therefore, each manager starts the job processing concerning the data download of FIG. 58 as the job termination processing of the step 3815 in FIG. 53. In step 4201, the job file (FIG. 52) is scanned, and it is checked whether there is an attribute concerning data reception method. As a result of the check, when the attribute concerning the data reception method is not present, it is judged that the job file is for upload and the processing flow shown in FIG. 59 is already performed. In step 4208 a termination processing is performed. In the termination processing of the step 4208 the job file is deleted. When in the step 4201 the attribute concerning the data reception method is present, in step 4202 the data reception method is checked. When the data reception method is included in the job (in the data reception by operation code "Send" in FIG. 53), data is already received. Therefore, in step 4205 the received data is stored as a file. When in the data reception method the data is present outside the apparatus, in step 4203 the designated external source is accessed to obtain the data, and in step 4205 the obtained data is stored as the file. In step 4206 the file information stored in the step 4205 is registered in the management table managed by each manager (the font table (FIG. 28) by the font manager 413, form overlay table (FIG. 31) by the form overlay manager 414, log table (FIG. 34) by the log manager 415, or color profile table (FIG. 39) by the color profile manager 416) by writing a new record thereto. In step 4207, termination processings such as deletion of the job and data files, and the like are performed, thereby ending the job processing.

(Job Processing Upload)

FIG. 59 shows a flow concerning a data upload function in the job processing flows in the font manager 413, form overlay manager 414, log manager 415 and color profile manager 416. When operation code "Send Request" constituting the job script is handed, each manager starts a job processing concerning data upload. Therefore, as a processing dependent on each manager of the step 3821 in FIG. 54, each manager starts the job processing concerning the data upload of FIG. 59. In step 4301, the attributes in the job file (FIG. 52) are checked for the attribute instructing the data transmission method. When in step 4301 the data transmission method instructs transmission of data as the script (NO), in step 4303 the data designated in the job is transmitted as the script with other attribute information. The data transmission processing from the apparatus is shown in detail in FIG. 62. When in the step 4301 reference transmission of the data is instructed, reference information concerning the data designated in the job is transmitted as the script with the other attribute information.

(Job Management in Manager)

Figure 60:
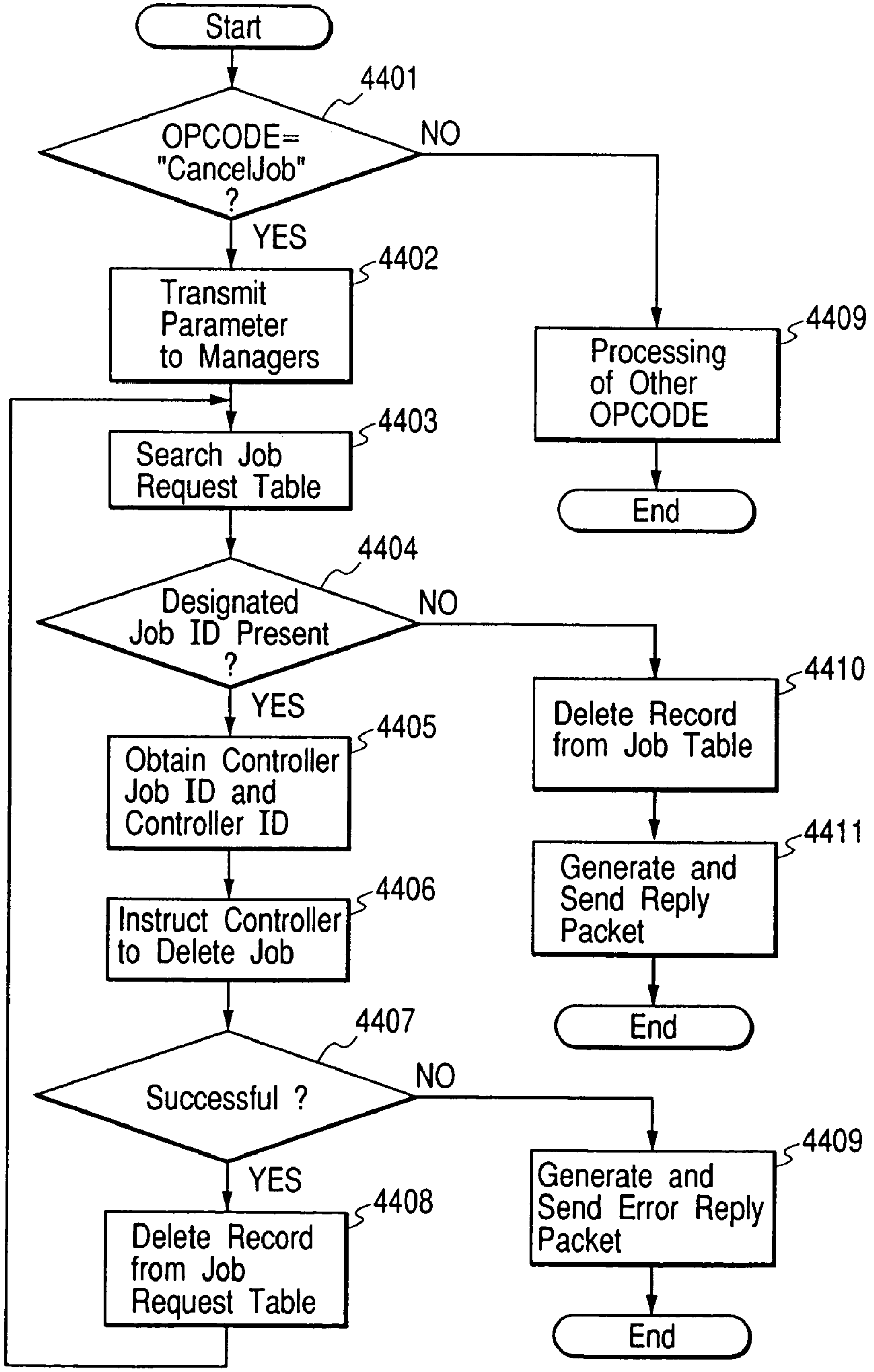
FIG. 60 is a flowchart of job management in each manager.

FIG. 60 shows a processing flow performed when Client gives an operation instruction (job deletion) for the jobs managed by the print job managers 501 to 509, scan job manager 419 and copy job managers 601 to 608 in the multi-function peripheral 201. The operation for the job managed by each manager is performed by transmitting an appropriate command packet to the subaddress of Supervisor. The job managing command packet includes a service ID for specifying a target job manager, and a target job ID as parameters. The command packet transmitted to the multi-function peripheral 201 from Client is processed by the flow shown in FIG. 47, and distributed to Supervisor 410. The processing flow shown in FIG. 60 shows details of the step 3603 (processing of other Operation Code) in the flow shown in FIG. 51. In step 4401, Supervisor 410 checks whether the operation code is for deleting the job ("Cancel Job"). When the operation code is not "Cancel Job", other processing step 4409 described later in accordance with the operation code is performed to end the flow. When in the step 4401 the operation code is "Cancel Job", in step 4402, in accordance with the service ID designated in the parameter, the parameter is transmitted to each manager corresponding to the service ID. In step 4403, each manager searches the job request table managed by each manager for a designated job ID. When in step 4404 the job request table has no designated job ID, it is judged that the job in the controller is already finished. In step 4410 the corresponding record is deleted from the job table, and in step 4411 the reply packet is generated and sent, thereby ending the flow. When in the step 4404 the designated job ID is present in the job request table, in step 4405 a controller job ID corresponding to the designated job ID and controller ID of the controller executing the job are obtained. In step 4406 the job ID of the controller corresponding to the controller ID is designated to instruct the controller to delete the job. In step 4407, the manager waits for an execution result from the controller. When the execution result is unsuccessful, in step 4409 the error reply packet is generated and sent, thereby ending the flow. When in the step 4407, the execution result from the controller is successful, in step 4408 the corresponding record is deleted from the job request table, and in step 4403 the job request table is searched to again check whether a request for another controller is made.

(Event Transmission)

FIG. 61 shows a processing flow of event transmission in each manager. Each manager has the event setting table as shown in FIG. 16 as the value of the attribute table retained by itself. As shown in the description of FIG. 16, in the table listed are the connection type and addressee to which the event is transmitted when the event occurs are written. When a certain event occurs, each manager recognizes the event ID for the event. Subsequently, in step 4501, the event setting table is searched to confirm whether the event ID is registered. When in the step 4502 no event ID is registered, the processing is ended. When in the step 4502 even one event ID is registered, in step 4503 the connection type for use in the event transmission and the addressee to which the event is transmitted are obtained from the first record, and in step 4504 the event transmission packet is generated. Added to the packet are the parameter prescribed for each event ID and the parameter according to the format of each event ID registered in the event format table (FIG. 17) retained by Supervisor 410. In step 4505, the event transmission packet is transmitted to the transmission addressee of the connection type obtained in the step 4503. Subsequently, in step 4506 it is judged whether or not all records having event IDs are completed by repeating the steps 4503 to 4505. If not, the flow returns to the step 4503. When all the records are processed, the processing is ended.

(Data Script Transmission from Multi-Function Peripheral)

FIG. 62 shows a processing flow when data is transmitted as a script of continuous command packet from the multi-function peripheral 201. The processing flow is used in the step 4008 of transmitting the image data obtained as the result of the scan job, the step 4303 of transmitting the font data, and the like. In step 4601, a packet including a data attribute is generated and sent. If necessary, the step 4501 is repeated to send a plurality of attributes. In step 4602, designated data for transmission is obtained. Since the command packet has a structure shown in FIG. 46 and the size which can be transmitted as the parameter is limited, in 4603 a data length is examined. As a result of examination, when the data length exceeds a limit length (64 Kbyte), in step 4606 the data is cut to the limit value of length, and in step 4607 the command packet with the obtained data added thereto as the parameter is generated and sent. In the command packet, operation code "Send" is set, and the continuation flag is set to be true. In step 4608 a rest of the cut data is obtained, and in the step 4603 the data length is again examined. As a result of the examination of the step 4603, when the data length is within limits of the command packet, in step 4604 the command packet with the data added thereto as the parameter is generated and sent. In the command packet, operation code "Send" is set, and the continuation flag is set to be false. In step 4605 a command packet including remaining attributes is generated and sent. If necessary, the step 4501 is repeated, and a plurality of attributes are sent, thereby ending the flow.

(Hard Configuration of Client PC)

Figure 63:
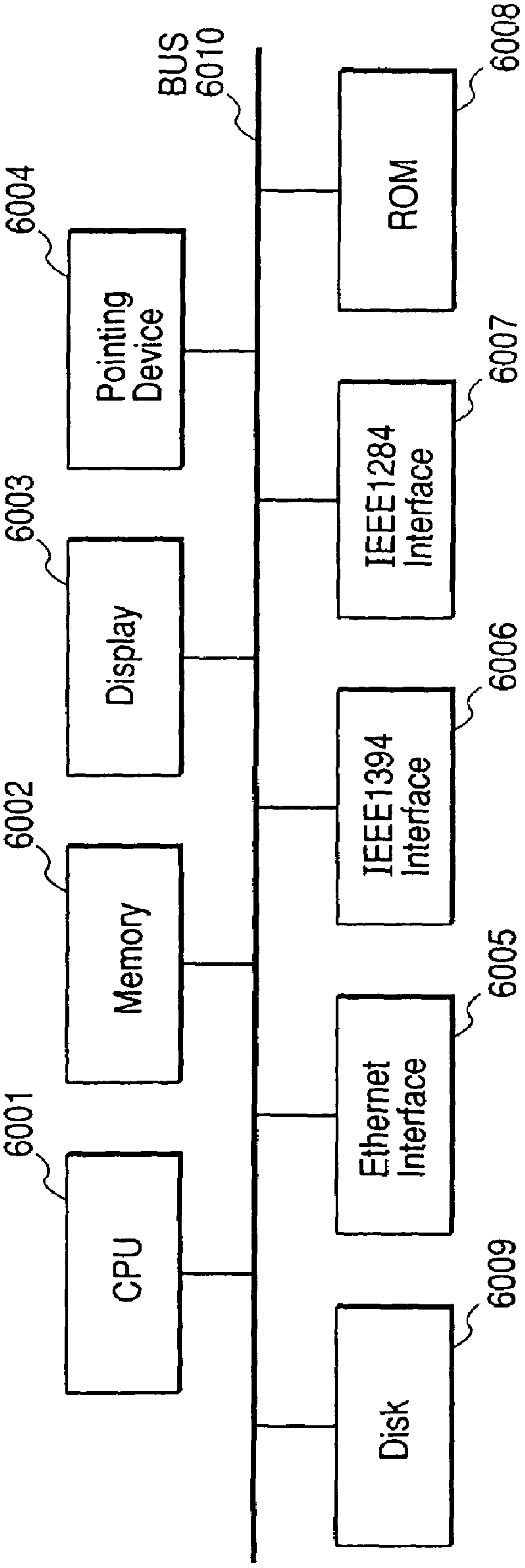
FIG. 63 is a diagram showing a hard configuration of Client PC.

FIG. 63 is a diagram showing a common hardware configuration (controller) of Client PC 202 to 205 of the embodiment shown in FIG. 2. Inside the controller, CPU 6001 is connected via a bus 6010 to Memory (RAM) 6002, a display 6003 such as CRT, a pointing device 6004 such as a keyboard, a mouse, and the like, ROM 6008, and DISK 6009. Various programs and data shown in FIG. 77 are stored in DISK 6009 (storage medium) such as a hard disk, a floppy disk, and the like, are sequentially read into Memory (RAM) 6002 if necessary, and executed by CPU 6001. The DISK 6002 may be detachably attached to Client PC or incorporated in Client PC. Furthermore, the program shown in FIG. 77 may be configured to be downloaded from other Client PC or MFP 201 via the network interface cable 208 (10 BASE-T), IEEE 1394 interface cable 206, and IEEE 1284 interface cable 207 and stored in DISK 6009. The hardware shown in FIG. 63 constitutes general Client PC shown in FIG. 78. When CPU 6001 writes data to the display 6003, display is performed. When CPU 6001 reads data from the pointing device 6004, the instruction from the user is entered.

Moreover, to the bus 6010 a network interface connector 6005, IEEE 1394 interface connector 6006, and IEEE 1284 interface connector 6007 are connected. Then, Ethernet (10 BASE-T) cable 208, IEEE 1394 cable 206, and IEEE 1284 cable 207 shown in FIG. 2 are connected. When CPU 6001 reads or writes data via these interfaces, communication is performed using the interfaces.

(Software Configuration of Client PC)

Figure 64:
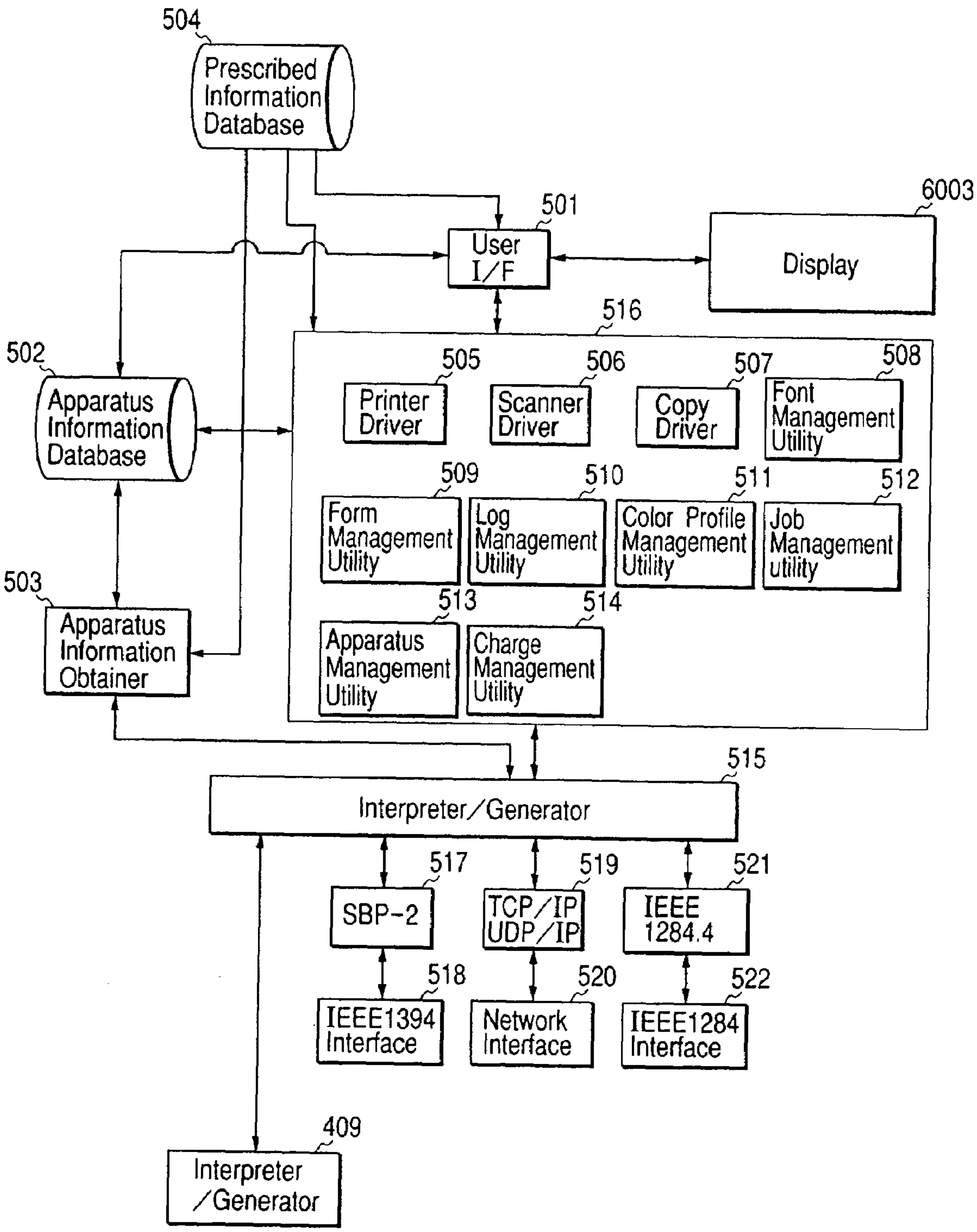
FIG. 64 is a diagram showing a software (control program) configuration of Client PC.

FIG. 64 shows a part of a block diagram of software (control program) of Client PCs 202 to 205 using the multi-function peripheral 201. The software (control program) and data used by Client PC are stored in DISK 6009 as shown in FIG. 77. Via a user interface 501, drivers and utilities 505 to 514 display information of the multi-function peripheral 201 on the display 6003. A database 502 (DISK 6009) retains information (data) of the currently operated multi-function peripheral 201. When Client connects to the multi-function peripheral 201, an apparatus information obtainer 503 obtains all information of the apparatus and retains the information in the database 502. A prescribed information database 504 (DISK 6009) retains meanings of attributes, data pattern for each attribute ID, parameter format prescribed for each event ID, meanings of task types, Supervisor subaddress, and other prescribed information which are used in each attribute table retained by the multi-function peripheral 201. The drivers and utilities 505 to 514 are operated based on the prescribed information database 504 and the apparatus information database 502. A printer driver 505 generates a print job script by an instruction from application program operating on Client PC. A scanner driver 506 generates a scan job script by an instruction from the application program operating on Client PC. A copy driver 507 generates a copy job script by an instruction from the application program operating on Client PC. A font management utility 508 generates a job for downloading and uploading font data, and generates a command for managing the font data. A form overlay management utility 509 generates a job for downloading and uploading form overlay data, and generates a command for managing the form overlay data. A log management utility 510 generates a job for downloading and uploading log data, and generates a command for managing the log data. A color profile management utility 511 generates a job for downloading and uploading color profile data, and generates a command for managing the color profile data. A job management utility 512 generates a command for performing management such as deleting, temporary stopping, and re-executing of the print job, scan job and copy job. An apparatus management utility 513 generate a command for obtaining states of the printer controller and scanner controller. A charge management utility 514 generates a command for obtaining charge data.

A generator 515 generates a command packet based on commands generated by the drivers and utilities 505 to 514. The generated command packet is transmitted to the multi-function peripheral 201 using transport processing modules 517, 519, 521. The generator 515 interprets reply packets and event packets transmitted from the transport processing modules 517, 519, 521, and distributes the packets to appropriate drivers or utilities. An SBP-2 processing module 517 is a transport layer of IEEE 1394. Numeral 519 denotes a TCP/IP, UDP/IP processing module. An IEEE 1284.4 processing module 521 is a transport layer of IEEE 1284. An interface 518 processes an IEEE 1394 physical layer. Numeral 520 denotes a network interface. An interface 522 processes an IEEE 1284 physical layer. FIG. 64 also shows an inner configuration of the user interface manager 405 in the software (control program) block diagram (FIG. 4) of the multi-function peripheral 201. In the user interface manger 405, the SBP-2 processing module 517, TCP/IP, UDP/IP processing module 519, IEEE 1284.4 processing module 521, network interface 518, network interface 520, and IEEE 1284 interface 522 in FIG. 64 are not disposed, and the generator 515 is directly connected to the interpreter 409 in FIG. 4, whereby the command packet, reply packet and event packet are exchanged. The direct connection is not present in the software (control program) configurations of other Client PCs 202 to 205.

(Packet Generation/Transmission Processing)

Figure 65:
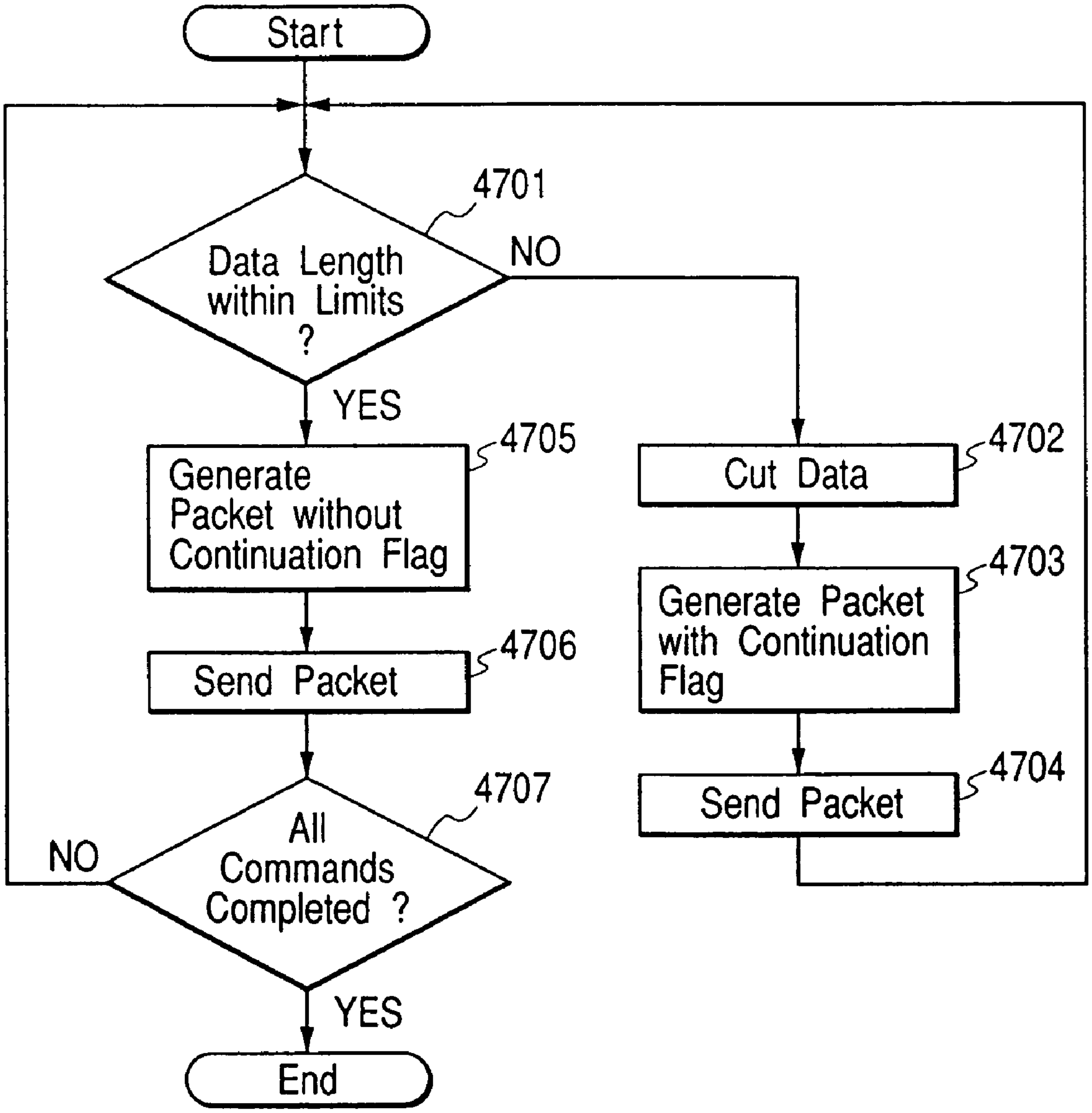
FIG. 65 is a flowchart of a packet generation/transmission processing.

FIG. 65 shows a processing flow in which the generator 515 receives the commands or the job scripts from the drivers and utilities 505 to 514, generates the command packet shown in FIG. 46 and transmits the packet to the multi-function peripheral 201. Before the processing flow, an appropriate subaddress of a multi-function peripheral of a transmission addressee is connected beforehand. Information concerning the subaddress to be connected is obtained by a flow for obtaining apparatus information shown in FIG. 66. The job script is defined by a continuous command. When a processing target is a job script, steps 4701 to 4706 are repeated until all commands are processed. In the following description, the issuance of the job script means that the steps 4701 to 4707 are processed for each command. In step 4701, a length of data to be transmitted with the command is examined. As a result of examination, when a parameter limit value of length (64 Kbyte) is exceeded, in step 4702 the data is cut to the limit value of length. For the cut data, in step 4703 a continuation flag is set to be true and a packet including an operation code corresponding to the command is generated, and in step 4704 the packet is sent. When in the step 4701 the data length is within parameter limits of the length, in step 4705 the continuation flag is set to be false and a packet including the operation code corresponding to the command is generated, and in step 4706 the packet is sent.

(Information Obtaining in Client and Software Automatic Configuration)

Figure 66:
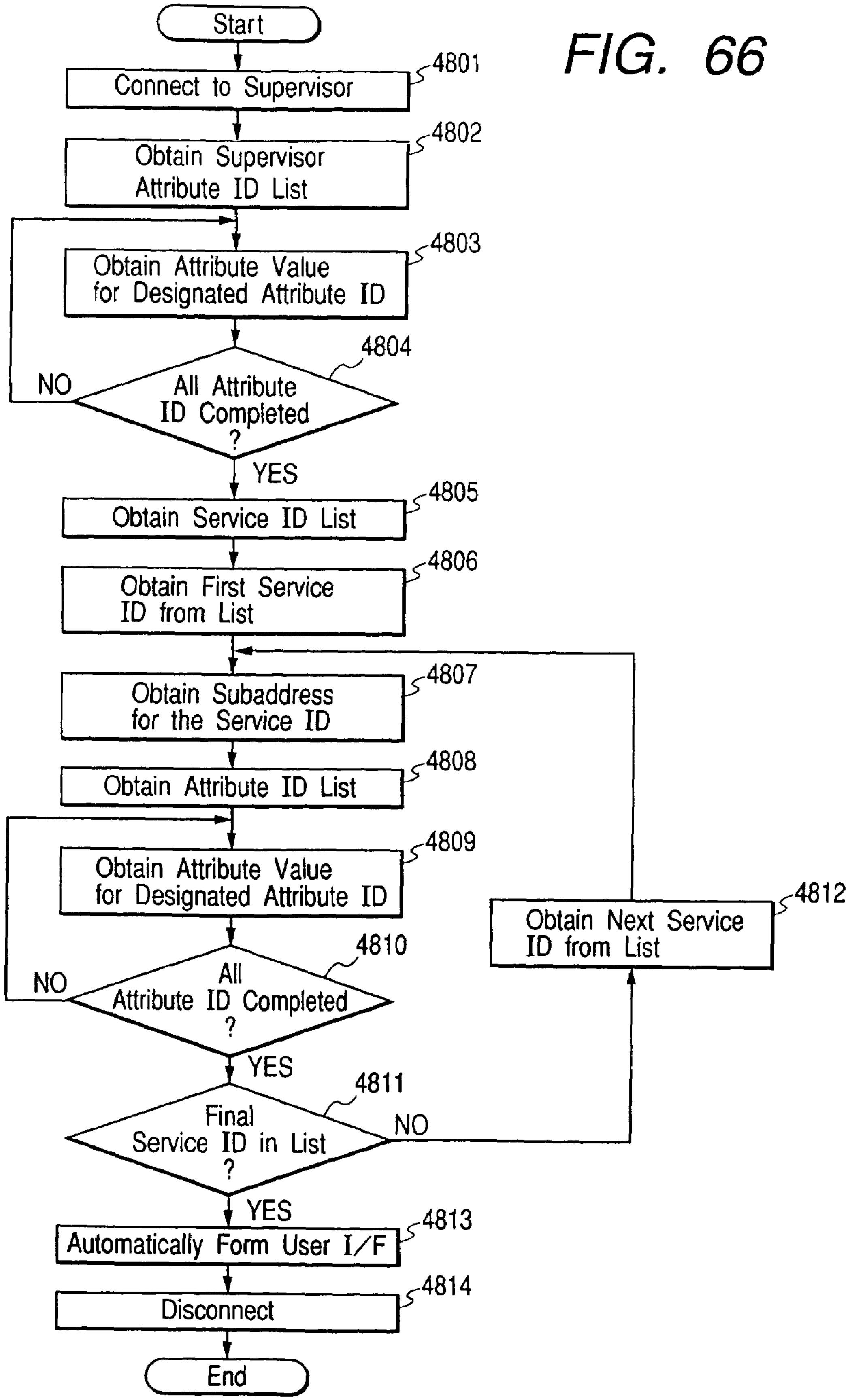
FIG. 66 is a flowchart of information obtaining and automatic software (control program) forming on the side of Client.

FIG. 66 shows a processing flowchart of the apparatus information obtainer 503 of FIG. 64. Immediately after Client connects to the multi-function peripheral 201, the apparatus information obtainer 503 performs a processing shown in FIG. 66 to obtain the apparatus information and retain the information in the apparatus information database 502 (DISK 6009). This processing is also performed again when an event for changing the configuration is transmitted from the apparatus. In step 4801, Client PC connects to the multi-function peripheral 201. Specifically, Client PCs 202 and 203 connected to Ethernet 208 designate IP address and port number to connect to the multi-function peripheral 201 and output IP packet data. Client PC 204 connected to IEEE 1394 interface 206 designates node ID and LUN (logical unit number) to connect to the multi-function peripheral 201 and outputs SBP-2 packet data. Client PC 205 connected to IEEE 1284 interface 207 designates the socket number to connect to the multi-function peripheral 201 and outputs IEEE 1284.4 packet data. For the subaddress of the connection addressee, the subaddress for Supervisor prescribed beforehand for each connection type used in connection is used. The prescribed value is obtained from the prescribed information database 504 (DISK 6009). In step 4802, a value of attribute ID 100 (list of attribute ID) of Supervisor attribute table shown in FIG. 7 is obtained. The attribute value is obtained by generating an attribute value obtaining command (Get) by the use of Supervisor service ID and attribute ID as parameters, and transmitting the command to the generator 515. The generator 515 performs the processing flow of FIG. 65, and transmits the command packet for obtaining the attribute value to the multi-function peripheral 201. The multi-function peripheral 201 receives the command packet, and returns to Client the attribute value of the attribute ID designated by performing the processing flow of FIGS. 47 and 48. Client analyzes the reply packet by the generator, and transmits the packet to the apparatus information obtainer. Additionally, the attribute of attribute ID 100 is a list of all attribute IDs in the Supervisor attribute table. In step 4803 the attribute ID is designated to obtain the attribute value, the processing is repeated until the attribute values of all the attribute IDs are obtained in step 4804, and the attribute values are stored together with the attribute IDs in the apparatus information database 502. In the above steps the attribute tables (FIG. 7) of Supervisor are all stored in the apparatus information database 502.

Subsequently, in step 4805 a service ID list (the SID to TASK TYPE table shown in FIG. 11) is obtained from the attribute table stored in the apparatus information database 502 (DISK 6009). Additionally, the service ID may also be obtained by generating a service ID list inquiry command (LIST SERVICE), and transmitting the command to the generator 515. In this case, the multi-function peripheral 201 executes the processing flow shown in FIGS. 47 to 49. In steps 4806 to 4811, each manager information is obtained for each service ID obtained in the step 4805. In step 4806 from the list shown in FIG. 11, a service ID 1 (print job manager 501) as a first service ID of service IDs except Supervisor (service ID 0) is obtained. In step 4807 the subaddress corresponding to the service ID is obtained. The subaddress is obtained by generating a command (Reserve) for obtaining the subaddress using the service ID as the parameter, and handing the command to the generator 515. In this case, in the multi-function peripheral 201, the processing flow shown in FIGS. 47 to 50 is executed. The obtained subaddress is stored in the apparatus information database 502. In step 4808, the value of attribute ID 100 (list of attribute ID) of each manager attribute table is obtained. The attribute value is obtained by designating service ID and attribute ID for each manager as the parameters, generating a command (Get) for obtaining the attribute value, and transmitting the command to the generator 515. In step 4809 the attribute ID is designated to obtain the attribute value, in step 4810 processing is repeatedly performed until the attribute values of all attribute IDs are obtained, and the attribute values are stored with the attribute IDs in the apparatus information database 502. In step 4811 it is judged whether or not the service ID is a final service ID in the list. When the service ID is not final, in step 4812 the next service ID is obtained from the list and the processing is repeated from the step 4807. In step 4811 the attribute values of all the service IDs (print job managers 501 to 509, scan job manager 419, copy managers 601 to 608, font manager 413, form overlay manager 414, log manager 415, color profile manager 416, printer controllers 510 to 512, scanner controller 420) of the service ID list are stored with the attribute IDs in the apparatus information database 502. Subsequently, in step 4813, based on the apparatus information (data) stored in the apparatus information database 502 (DISK 6009), user interfaces are automatically formed for managers corresponding to the drivers and utilities (control program) 505 to 514. The processing of the automatic forming step 4813 includes updating of the user interface, and display of set screen (user interface) is changed in accordance with the drivers and utilities. For example, as shown in FIGS. 81 and 82 showing display screens on the display 6003, the printer driver user interface changes displays of supported PDL list based on the attribute value of attribute ID 1101 of each print job manager (501 to 509), availability of color printing based on attribute ID 1102, supported Finishing type based on the attribute value of attribute ID 1103, settable highest resolution based on the attribute value of attribute ID 1104, and settable lowest resolution based on attribute ID 1105. Likewise, displays of the user interface for the other drivers 506, 507, utilities 508 to 514 are changed in accordance with the attributes. Furthermore, icons of the drivers and utilities (print manager, copy job manager, and the like) are displayed in such a manner that they can be distinguished.

Figure 83:
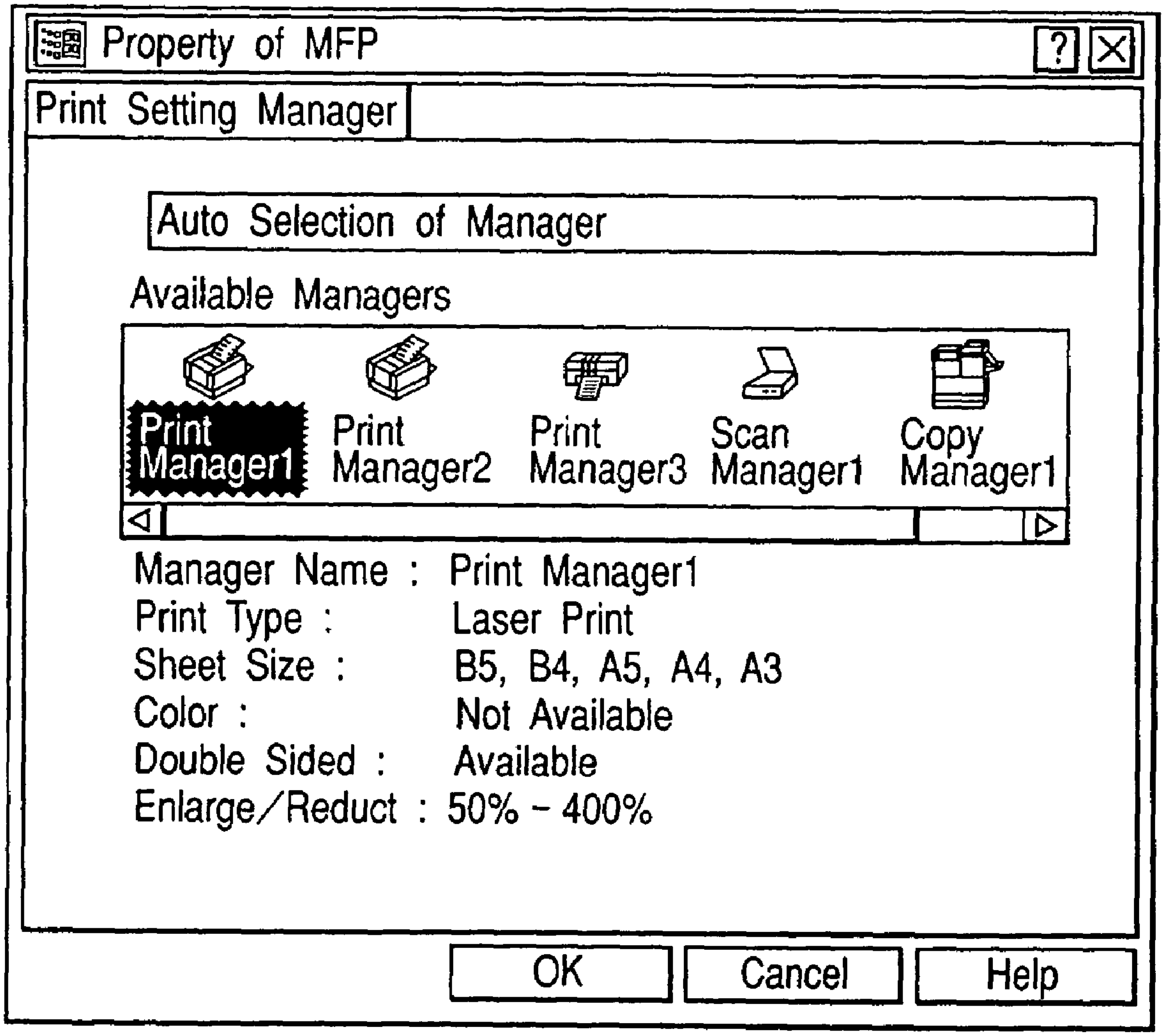
FIG. 83 is a diagram showing a display of manager list.

Moreover, the user interface may be graphical as shown in FIG. 83. In a screen of FIG. 83, a list of the print job managers, scan job manager, and copy manager included in the service ID list (service ID list obtained in the step 4806) is displayed. Additionally, the print job managers, scan job manager, and copy job manager are provided with manager titles, and a list of the manger titles are displayed.

When the user wants to perform printing, copying or scanning of printed matters, the user opens the screen of FIG. 83 via a device control application or a device control driver. Then, from a plurality of managers present in the device, the user selects the print manager to perform the printing, or selects the scan manager to perform the scanning.

Additionally, for example, the print type, sheet size, availability of color printing, availability of double sided printing, possible enlarged/reduced range, and the like of the print manager are displayed based on the attribute values obtained in the step 4809. Here, for the print type, the print controller to be used is determined from the attribute value of attribute ID 2001 (list of Controller ID executing job) of the print job manager. Moreover, the availability of color printing is determined from the attribute value of attribute ID 1102 of the print job manager. Other conditions are also obtained from attribute values of attribute IDs not shown in FIG. 19. Therefore, further detailed information can also be displayed based on the attribute values. The same is applied to the scan job manager and the copy manager.

During the job issuance, the user uses the pointing device 6004 to select a desired manager from the manager list. Alternatively, when a check is put in a check box of "Auto Selection of Manager" of the screen of FIG. 83, an optimum manager is automatically selected from manager functions and situations.

Figure 84:
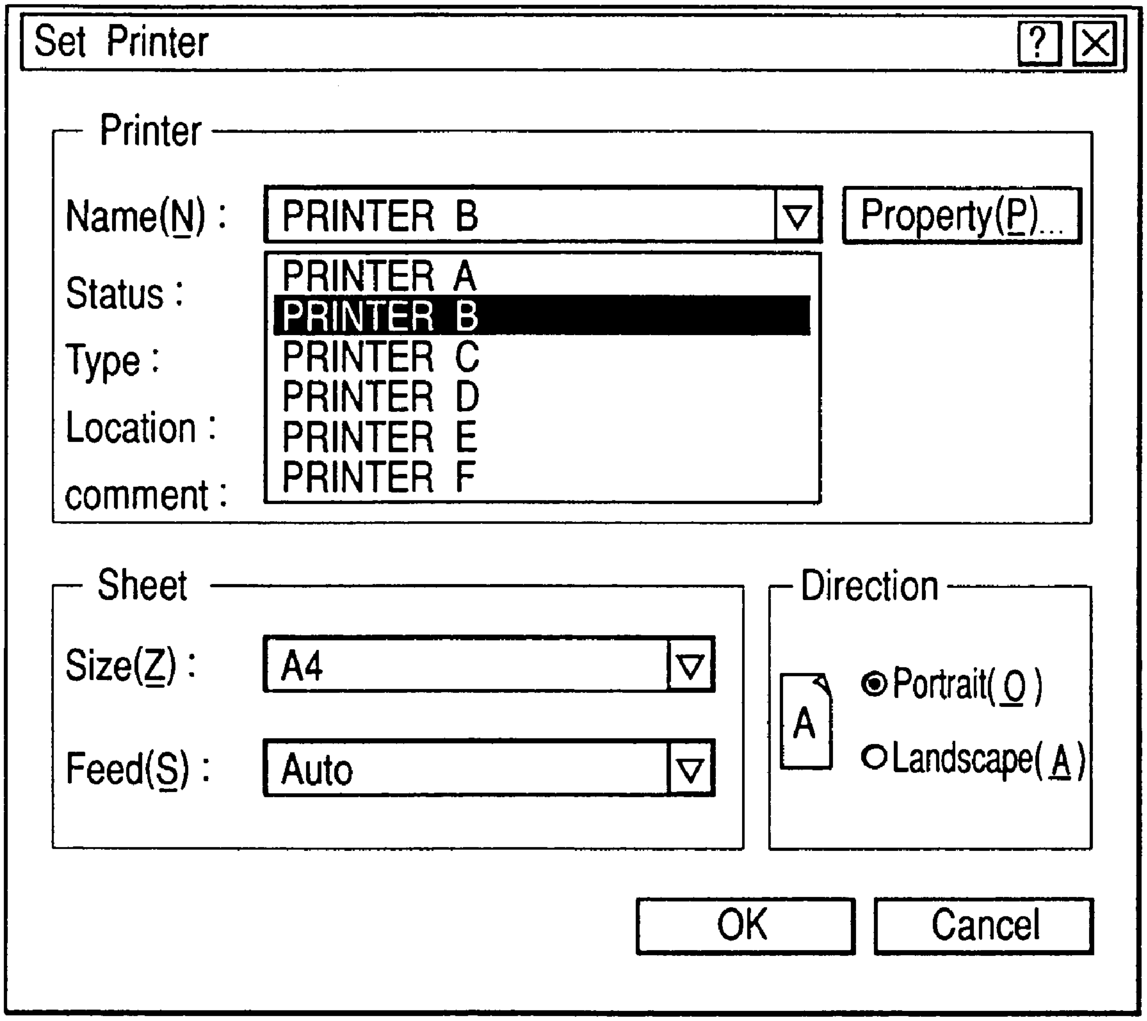
FIG. 84 is a diagram showing a display of printer name list.

Moreover, as shown in FIG. 84, in the print screen of the application program, printer names for the print job managers may be displayed. The print screen is displayed when the user gives a print instruction with the application program. Client generates virtual printers for the print job managers based on the apparatus information of the apparatus information database 502 to display the printers in such a manner that the user can make a selection from them. For example, in the screen, "PRINTER A" indicates the print job manager 501, and "PRINTER B" indicates the print job manager 502.

Figure 85:
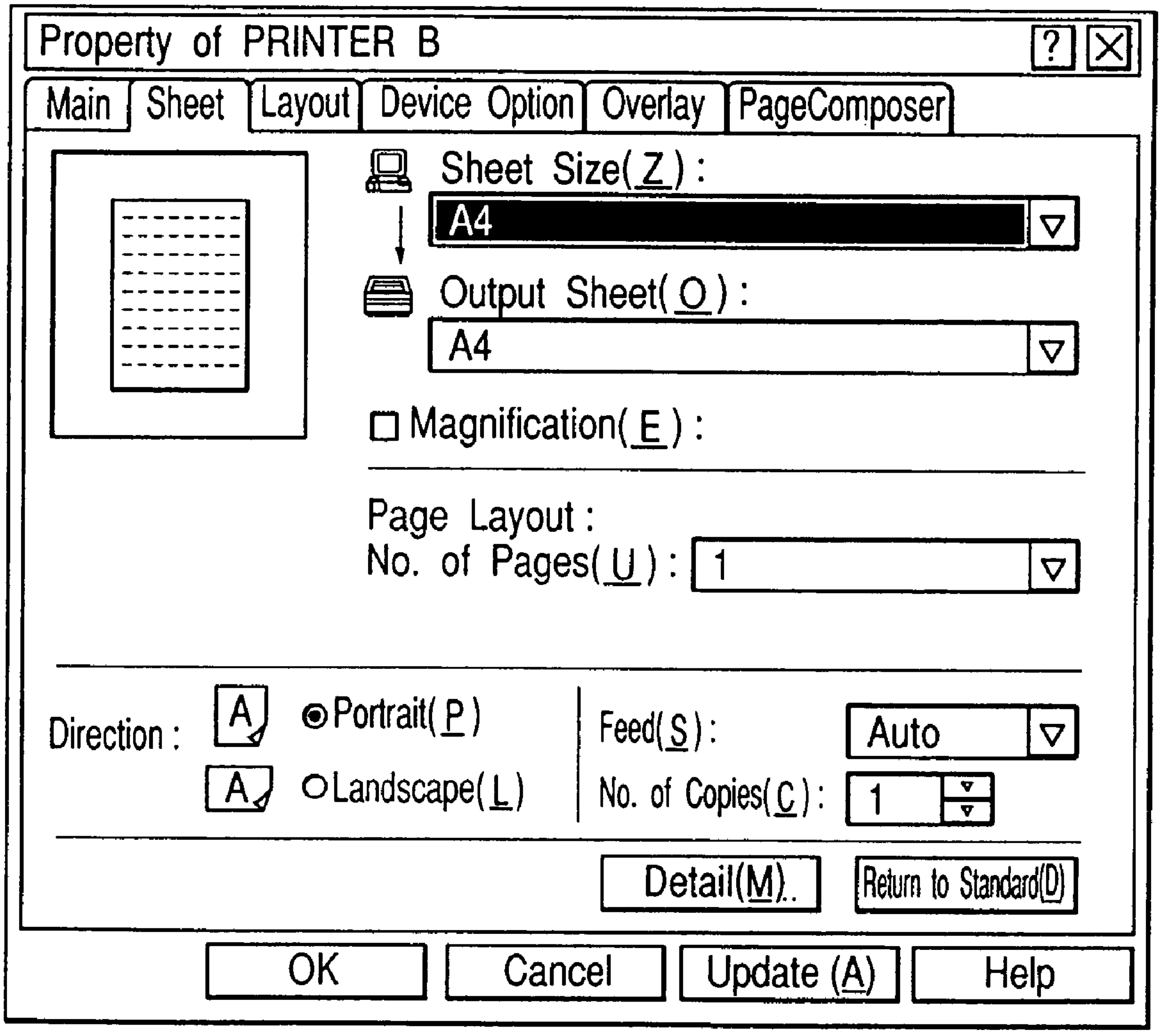
FIG. 85 is a diagram showing a printer property screen.

Furthermore, when the user selects a certain printer name from the screen of FIG. 83 or 84, and opens "property" screen, a screen is displayed as shown in FIG. 85. The user gives a further detailed printing instruction in this screen. In this case, a sheet size, magnification, sheet feed method, and other conditions which can be selected by the user with the printer are determined based on the attribute values obtained in the step 4809 of FIG. 66.

Finally, in step 4814, Supervisor 410 is disconnected, and the processing is ended.

(Job Issuance with Designated Task Type)

Figure 67:
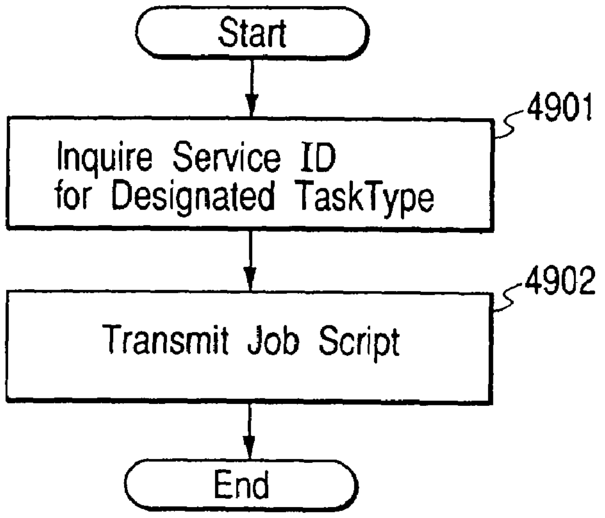
FIG. 67 is a flowchart of job issuance with the designated task type.

FIG. 67 shows a processing when each application or utility issues a job script with a designated task type. The job with a designated service ID is issued by searching the apparatus information database 502 using the service ID as a key, and transmitting an appropriate job script to the obtained subaddress. When only the task type is designated by an instruction from the user, however, a request for introduction of service ID to be used needs to be made for the multi-function peripheral 201. FIG. 67 shows a processing for this case. In step 4901, the task type is designated, an attribute value obtaining command is generated to obtain the service ID, and the command is transmitted to the generator 515. In the multi-function peripheral 201 the processing flow shown in FIGS. 47 to 51 is executed. In step 4902, based on the service ID obtained in the step 4901 the apparatus information database 502 is searched, and the job script is transmitted to the obtained subaddress.

(Event Structure)

Figure 68:
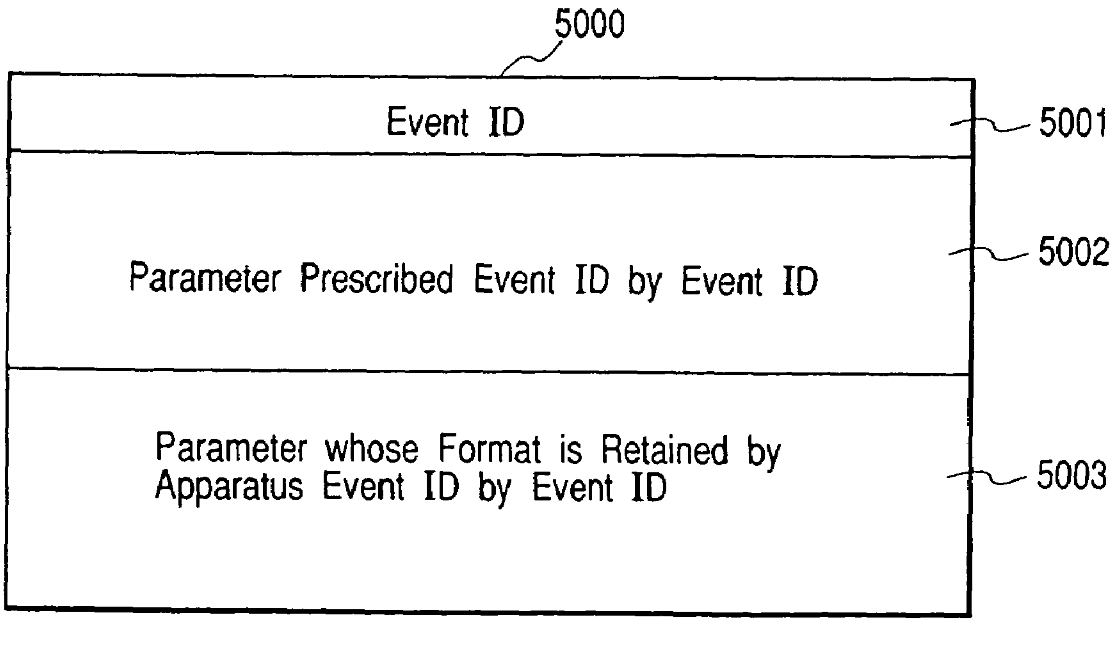
FIG. 68 is a diagram showing an event structure.

FIG. 68 shows a structure of the event transmitted to Client from the multi-function peripheral 201. The event packet has the same structure as that of the command packet shown in FIG. 46. FIG. 68 shows a structure of the packet parameter 3110. Numeral 5001 denotes an event ID indicating an event type, and 5002 denotes parameter data prescribed for each event ID. A format of the data is retained beforehand in the prescribed information database 504. Numeral 5003 denotes parameter data whose format is determined for each event ID in the apparatus. The data format is retained as the event format table (FIG. 17) in the apparatus information database 502 by executing the processing flow of FIG. 66.

(Event Processing)

Figure 69:
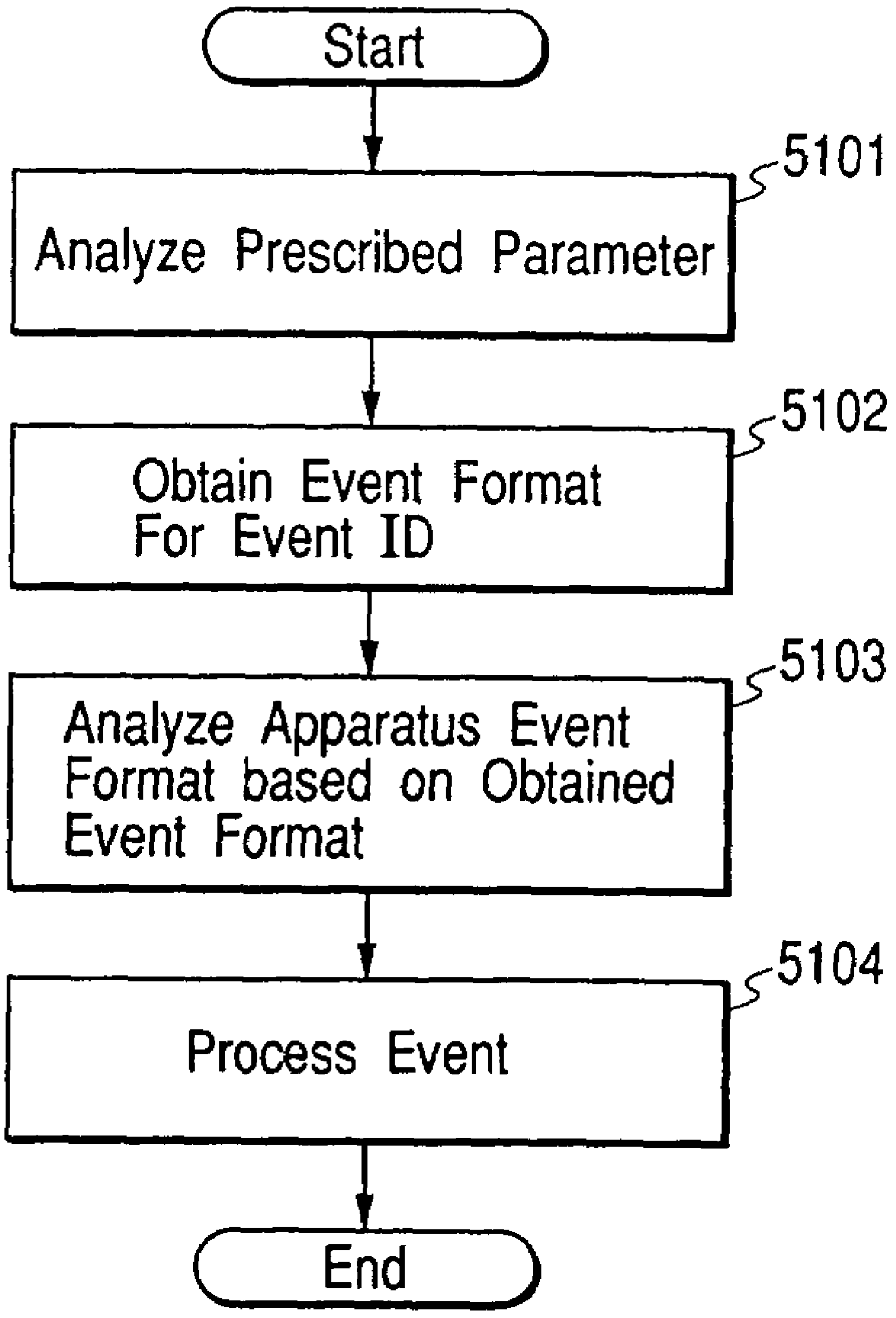
FIG. 69 is a flowchart of event transmission.

FIG. 69 shows a processing flow when each driver or utility of Client receives the event from the multi-function peripheral 201. Each driver or utility registers a desired event beforehand in the generator 515 using the event ID as a key. When the event is transmitted to Client from the multi-function peripheral 201, the generator 515 distributes the event to each registered driver or utility. FIG. 69 shows the processing after the event is distributed to each driver or utility. In step 5101, based on the format information obtained from the prescribed information database 504 the prescribed parameter data 5002 is analyzed. In step 5102, using the event ID (5001) as the key, the event format 1302 for the event ID is obtained from the event format table (FIG. 17) retained in the apparatus information database 502. In step 5103, based on the obtained event format, the event format dependent on the apparatus (event format attribute ID 676: sheet size, ID 756: paper type, ID 666: toner type, ID 698: ink type, ID 600: cover position) is analyzed. Subsequently, in step 5104 the analyzed parameter and event ID (event ID 200: no paper, ID 399: no toner, ID 432: no ink, ID 234: multi-function peripheral cover opened) are processed and displayed for the event (e.g., no paper, cover open, no toner, and other user interfaces are displayed on the display 6003).

(Log Processing)

Figure 70:
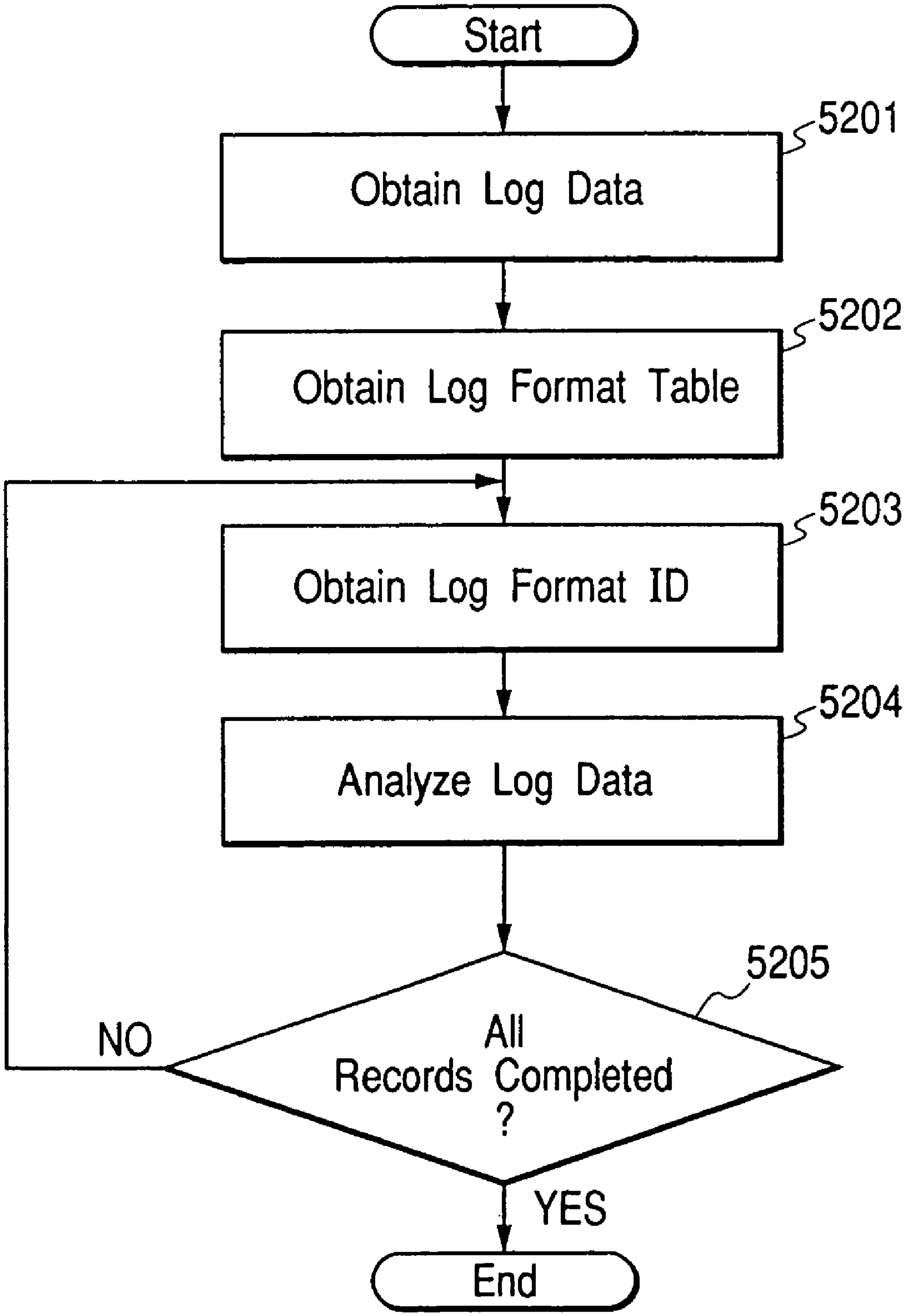
FIG. 70 is a flowchart of a log processing.

FIG. 70 shows a flow in which the log management utility 510 obtains and processes the log retained by the multi-function peripheral 201. In step 5201, log data is obtained. The log data is obtained by generating a job script for obtaining the log data, and sending the script to the multi-function peripheral 201. In the multi-function peripheral 201, the processing flow shown in FIGS. 47, 53, 59 is executed, and the log data is sent to Client. For example, log data "12345, 4, 1.23, "OK"" of Log Format ID 1, 98/1/31:23 shown in FIG. 35 means that the user ID from which the job is issued to the print job manager of service ID 1 is 12345, the number of outputted sheets is 4, the amount of used toner is 1.23, and the job completion state is OK. In step 5202, the log format table (FIG. 36) is obtained from the apparatus information database 502. In step 5203, log format ID 2401 on the top of each record of the log data is obtained, and from the value the log format 2502 is obtained from the log format table (FIG. 36). For example, format "1:701, 1:565, 1:765, 1:777" of Log Format ID 1 indicates the user ID from which the job is issued to the print job manager of service ID 1, the number of outputted sheets, the amount of used toner, and the job completion state. Moreover, format "11: 701, 11:565, 11:765, 11:777" of Log Format ID 2 indicates the user ID from which the job is issued to the print job manager of service ID 11, the number of outputted sheets, the amount of used toner, and the job completion state. In step 5204, the log data 2403 is analyzed in accordance with the log format 2502, and the analyzed data is processed (log sorting, and the like) with log occurrence time 2402. Subsequently, in step 5205 it is judged whether or not each record log data is analyzed. When the data is not analyzed, the processing from the step 5203 is repeatedly executed. When all the data is analyzed, the processing is ended.

(Obtaining and Processing of Charge Information)

Figure 71:
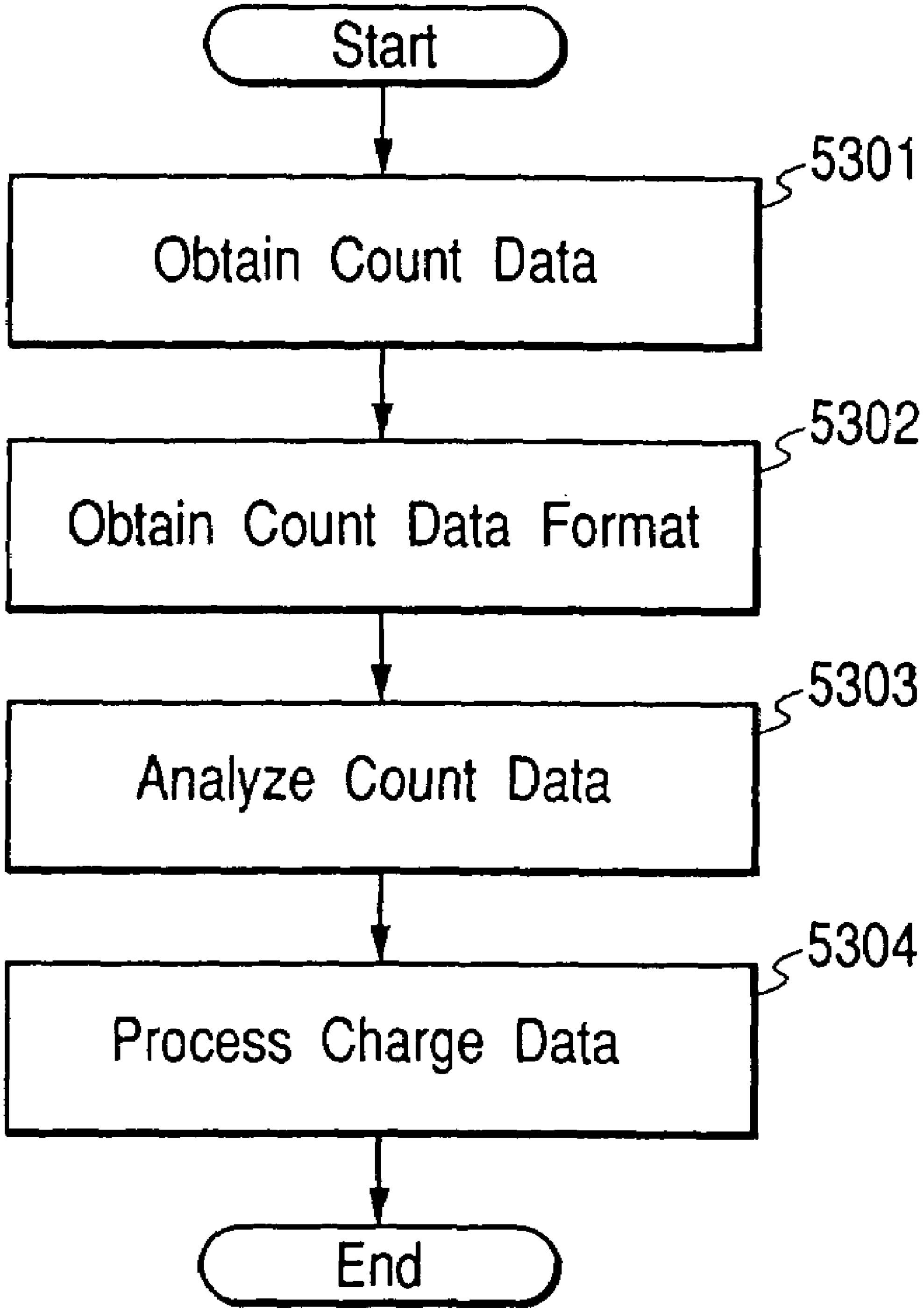
FIG. 71 is a flowchart for obtaining/processing charge information.

FIG. 71 shows a flow in which the charge management utility 514 obtains and processes charge data retained in the multi-function peripheral 201. The charge data is shown as count data retained by each manager. The count data is retained as values of attribute ID 401 in the attribute table (FIGS. 7, 18, 22, 24, 26, 29, 32, 27, 40, 44), and the values constitute a list of integer values. Integer value meanings are shown as values of the attribute (attribute ID 402) of the count data format in the attribute table of each manager, and the values constitute a list of attribute ID. The count data list and the count data format list correspond to each other by sequence in each list. For example, the third value of the count data means the information of the third attribute ID of the count data format. FIG. 71 shows the flow for obtaining and processing the count data retained by each manager. In step 5301, a target manager service ID is designated, and the values of attribute ID 401 (count data values) are obtained. For example, the value of attribute ID 401 (45, 78, 34, 13) shows the number of print sheets with a sheet size represented by the count data format of the attribute ID 402. The value of the attribute ID 401 is obtained by using the service ID and attribute ID as parameters, generating the command for obtaining the attribute value, and transmitting the command to the generator 515. In step 5302, the same service ID is designated, and the value of the attribute ID 402 (count data format value) is obtained. For example, attribute value 565 of the attribute ID 402 means the number of printed sheets with a sheet size A2, attribute value 537 means the number of printed sheets with a sheet size A3, attribute value

545 means the number of printed sheets with a sheet size A4, and attribute value 523 means the number of printed sheets with a sheet size A5. The value may be obtained from the apparatus information database 502. In step 5303, the obtained count data format is used to analyze the count data. In step 5304, the analyzed count data is used to process and generate charge data, for example, for each service ID, each user ID, and each division, thereby ending the flow.

(Issuance of Print Job, Data Download Job)

Figure 72:
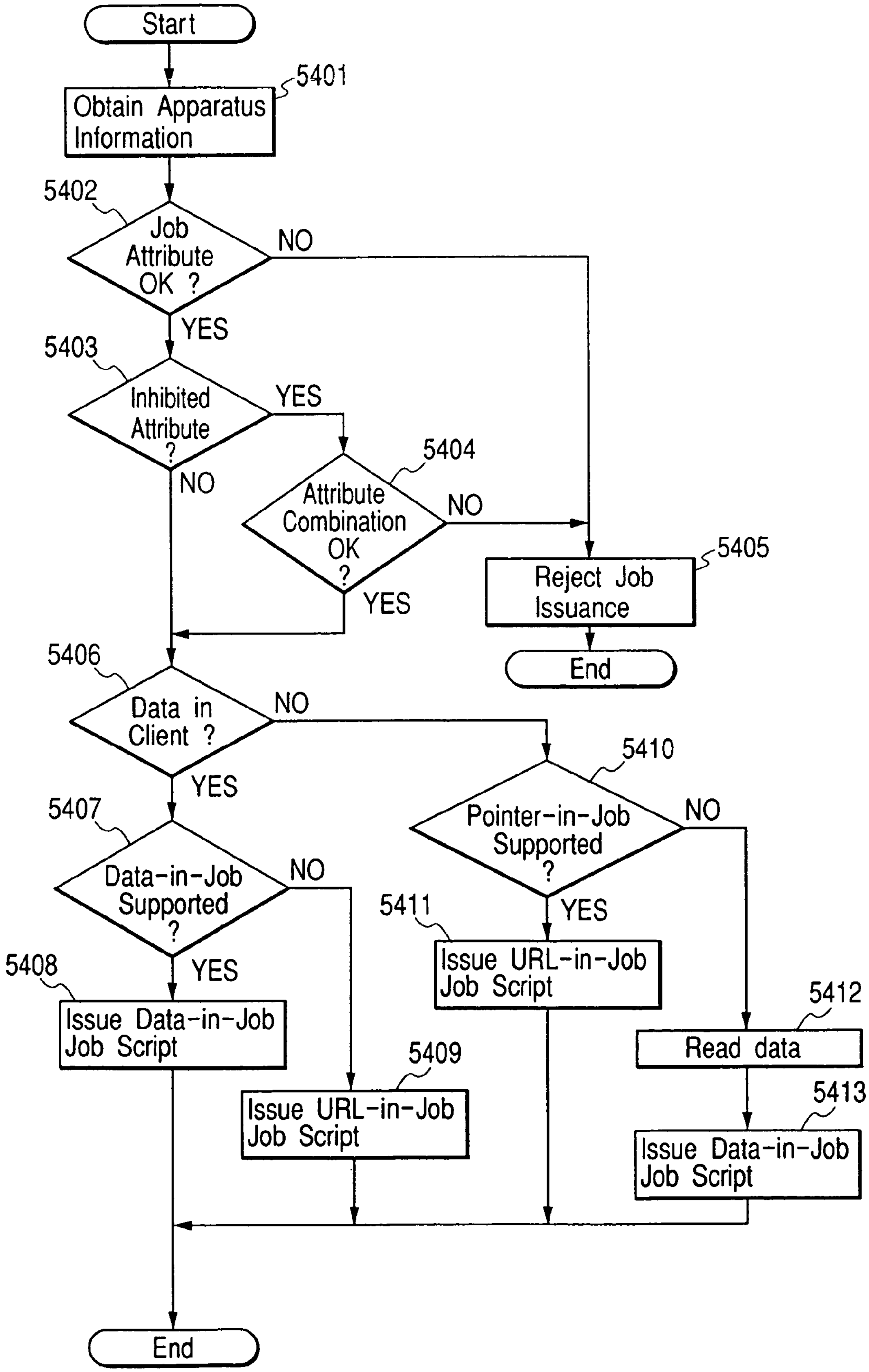
FIG. 72 is a flowchart of job issuance (print job, data download).

FIG. 72 shows processings for issuing a print job by the printer driver 505, a font data download job script by the font management utility 508, a form overlay data download job script by the form overlay utility 509, a log data download job script by the log management utility 510, and a color profile data download job script by the color profile management utility 511. The processing flow by each software (control program) as described above is common. Print target document data and the above-described types of download target data (font data, form data, color profile data, log data) are referred to as "data" in FIG. 72 and the following description. During the job issuance, the data to be printed or to be downloaded are designated with a plurality of attribute values set in the job script. In step 5401, the apparatus information database 502 is accessed to obtain apparatus information.

Subsequently, based on the obtained apparatus information, the user interface of FIG. 83 or 84 is displayed. The user uses the pointing device 6004 to select the manager as a data transmission target from the manager titles listed/displayed in FIG. 83, or from the printer names displayed in FIG. 84.

In step 5402, referring to the attribute table of each manager (e.g., the print manager to designate printing for the print target document data) as the data transmission target, it is checked whether the designated attribute value is within a range of the attribute values set in the attribute table. As a result of the check, when even one value is not in the range, in step 5405 a processing to reject the job issuance is performed such as displaying of an error dialog on the user interface, thereby ending the flow.

As a result of the check of step 5402, when all the attributes are within the range of the attribute values in the attribute table of the manager, in step 5403 it is checked whether there is an inhibited attribute (attribute ID 801 to 805) in the manager attribute table. When the manager attribute table has the inhibited attribute, in step 5404 it is checked whether the job attribute designated for each inhibited attribute of the manager attribute table is a combination of inhibited values. As a check result, when there is a combination of inhibited attribute values, in step 5405 the processing to reject the job issuance is performed to end the flow. When as a result of the check of step 5403 the manager has no inhibited attribute, and when as a result of the check of step 5404 the job attribute is not a combination of inhibited values, in step 5406 a data location is checked. The data location is designated by designating an address by the user or by generating the address by the application. When the data is inside Client issuing the job, in step 5407, attribute value 601 (supported data download method) of the relevant manager attribute table in the apparatus information database 502 is checked. When in the check of step 5407 the method of including data in the job is supported, in step 5408 a job script including the data in the job is generated, the packet generating processing shown in FIG. 65 is performed, and the packet is transmitted to the multi-function peripheral 201. When in the check of step 5407, the method of including the data in the job is not supported, in step 5409 a job script including the reference pointer (URL: Unified Resource Locator) of the data in the apparatus into the job is generated and transmitted. When in the check of step 5406 the data is present outside Client issuing the job, in step 5410 attribute value 601 (supported data download method) of each relevant manager attribute table in the apparatus information data is checked. When in the check of step 5410 a method of including the reference pointer in the job and reading data by the apparatus itself is supported, a job script including the reference pointer to the data into the job is generated and transmitted. When in the check of step 5410 the method of including the reference pointer in the job and reading the data by the apparatus itself is not supported, in step 5412 the data is once read into the apparatus from the outside. Subsequently, in step 5413 a job script including the read data in the job is generated and transmitted. Each manager of the multi-function peripheral 201, which has received the job script, performs the processing shown in FIGS. 53, 54, 55 (print job manager) or in FIGS. 53, 54, 58 (font manager, form overlay manager, log manager, color profile manager), and processes the instructed job.

(Issuance of Scan Job, Data Upload Job).

Figure 73:
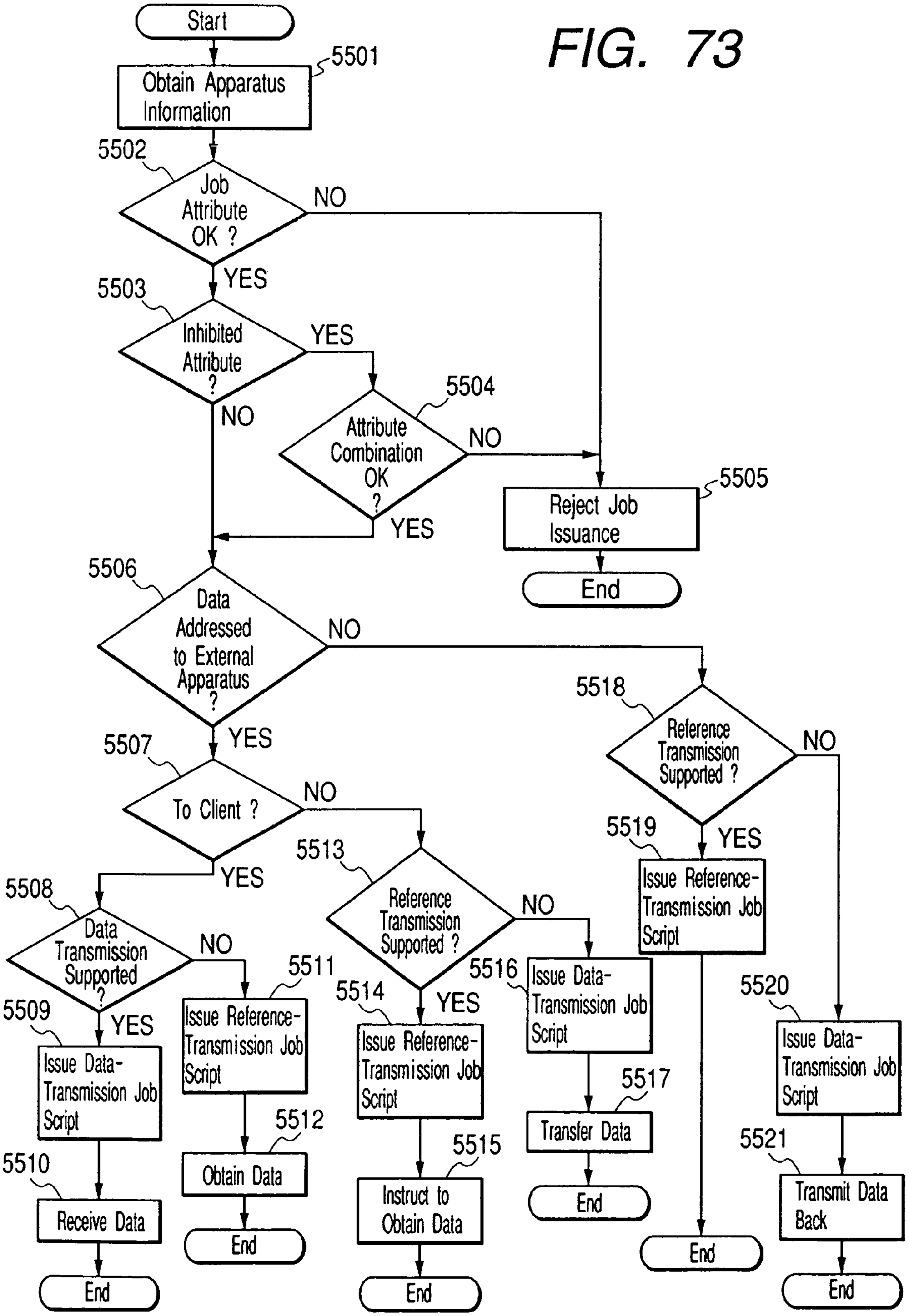
FIG. 73 is a flowchart of the job issuance (scan job, data upload).

FIG. 73 shows processings for issuing a scan job by the scanner driver 506, a font data upload job script by the font management utility 508, a form overlay data upload job script by the form overlay utility 509, a log data upload job script by the log management utility 510, and a color profile data upload job script by the color profile management utility 511. The processing flow of each software (control program) described above is common. Document data obtained as a scanning result and the above-described types of upload target data (font data, form data, color profile data, log data) are referred to as "data" in FIG. 73 and the following description. During the job issuance, an indicator to indicate the data is designated with a plurality of attribute values set in the job script. In step 5501, the apparatus information database 502 is accessed to obtain apparatus information. In step 5502, referring to the attribute table of each manager (e.g., for font data, the font manager to manage the font data) designating data as the upload target, it is checked whether the designated attribute value is within a range of the attribute values set in the attribute table. For the manager designating the data as the upload target, for example, for the scan job manager, the user selects the manager on the user interface as shown in FIG. 83.

As a result of the check, when even one value is not in the range, in step 5505 a processing to reject the job issuance is performed such as displaying of an error dialog on the user interface, thereby ending the flow. As a result of the check of step 5502, when all the attributes are within the range of the attribute values in the attribute table of the manager, in step 5503 it is checked whether there is an inhibited attribute (attribute IDs 801 to 805) in the manager attributes. When the manager attribute table has the inhibited attribute, in step 5504 it is checked whether the job attribute designated for each inhibited attribute of the manager attribute table is a combination of inhibited values. As a check result, when there is a combination of inhibited attribute values, in step 5505 the processing to reject the job issuance is performed to end the flow.

When as a result of the check of step 5503 the manager has no inhibited attribute, and when as a result of the check of step 5504 the job attribute is not a combination of inhibited values, in step 5506 data transmission addressee (storage position) is checked. When the data transmission addressee is outside the apparatus, in step 5507, the data transmission addressee is again checked. When the data transmission addressee is Client issuing the job, in step 5508 attribute value 602 (supported data upload method) of the relevant manager attribute table in the apparatus information data is checked. When as a result of the check of step 5508 data transmission is supported, in step 5509 a job script instructing data transmission is issued, and in step 5510 data reception is performed. When as a result of the check of step 5508, the data transmission is not supported (NO), in step 5511 issued is a job script instructing reference transmission which means that data is transmitted to the apparatus using a reference pointer to retained data as a reply. Using information of the returned reference pointer, in step 5512 data is obtained. When in the step 5507 the data transmission addressee is other than Client issuing the job, in step 5513 attribute value 602 (supported data upload method) of each relevant manager attribute table in the apparatus information data is checked. When as a result of the check of step 5513 the reference transmission is supported, in step 5514 a job script instructing the reference transmission by the use of the transmission addressee as the parameter is issued. In step 5515 by informing the data transmission addressee that data is transmitted from the multi-function peripheral 201, an instruction for obtaining the data is transmitted. When as a result of the check of step 5513 the reference transmission is not supported, in step 5516 a job script instructing the data transmission is issued. In step 5517 data is received, and the data is again transmitted to the transmission addressee. When as a result of the check of the step 5506 the transmission addressee is inside the apparatus, in step 5518 attribute value 602 (supported data upload method) of each relevant manager attribute table in the apparatus information data is checked. When as a result of the check of step 5518 the reference transmission is supported, in step 5519 a job script instructing the reference transmission by the use of the addressee inside the apparatus as the parameter is issued. When as a result of the check of step 5518 the reference transmission is not supported, in step 5520 a job script instructing the data transmission is issued. After in step 5521 Client receives the data, the data is again returned to the apparatus. Each manager of the multi-function peripheral 201, which has received the job script, performs the processing shown in FIGS. 53, 54, 56 (scan job manager) or in FIGS. 53, 54, 59 (font manager, form overlay manager, log manager, color profile manager), and processes the instructed job.

(Issuance of Copy Job)

Figure 74:
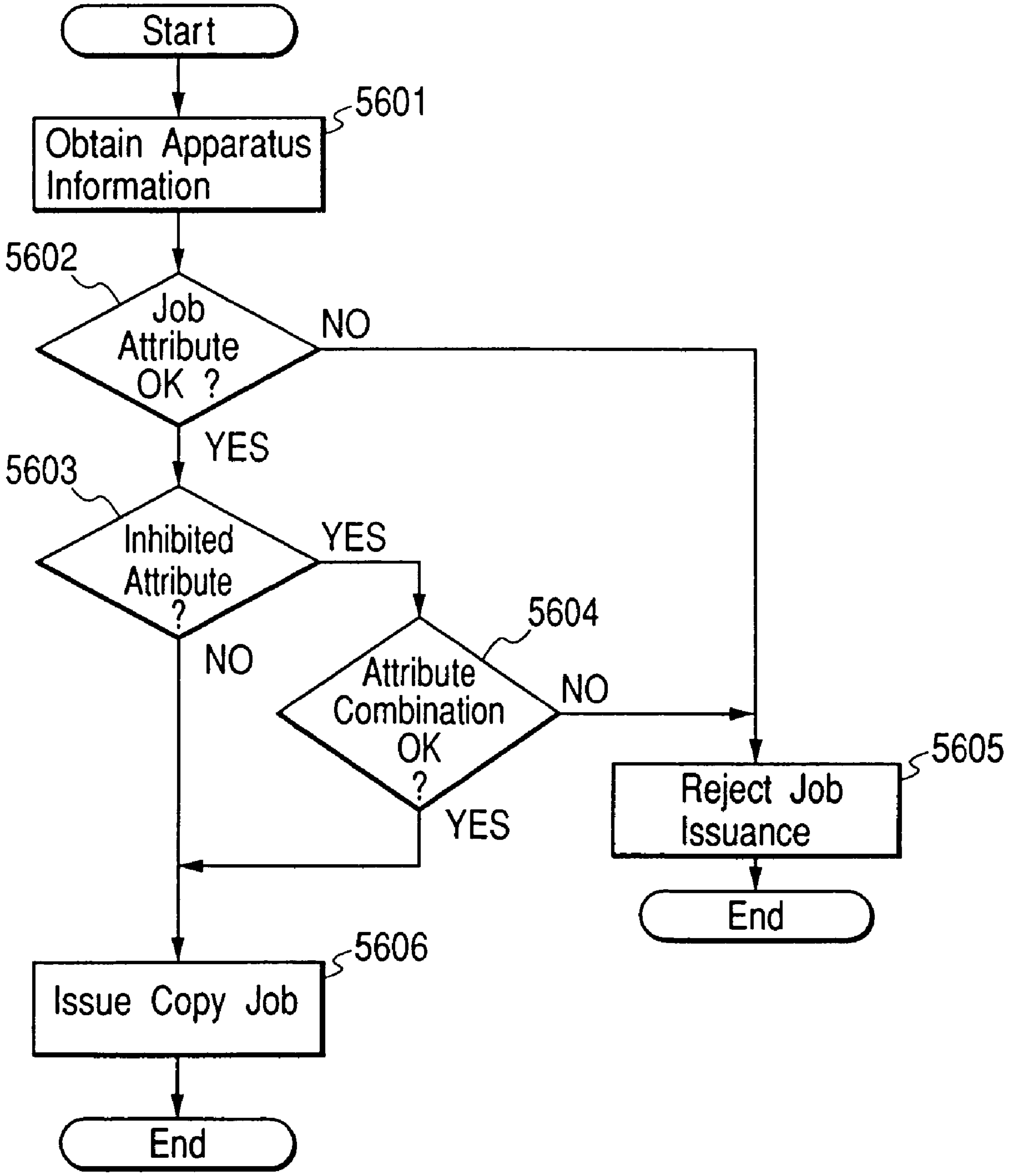
FIG. 74 is a flowchart of copy job issuance.
Figure 75:
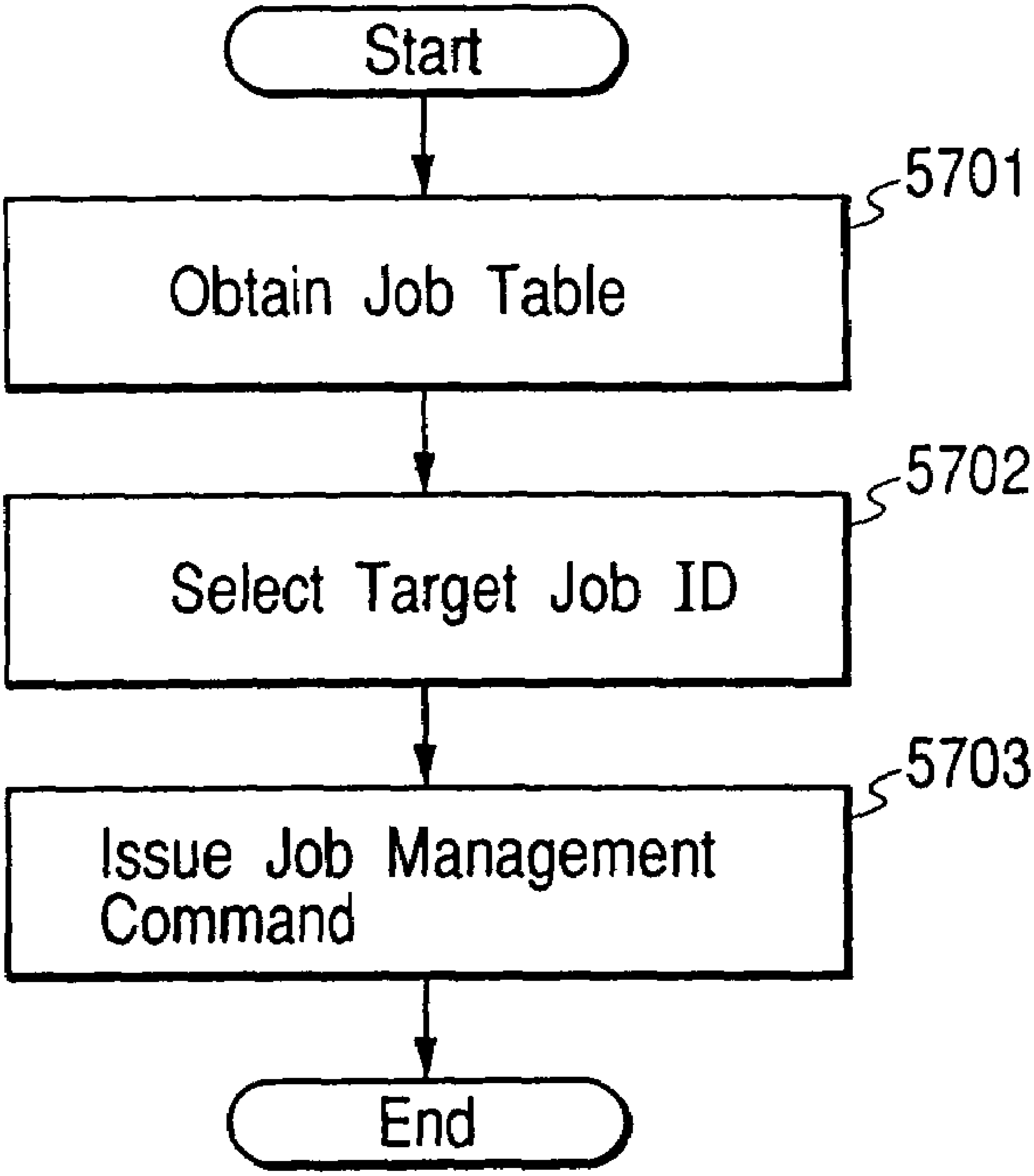
FIG. 75 is a flowchart of job management command issuance.

FIG. 74 shows a processing for issuing a copy job. As an instruction of the copy job issuance, a plurality of attribute values to be set in the job script are designated. In step 5601, the apparatus information database 502 is accessed to obtain apparatus information. In step 5602, the attribute table of the copy manager is referred to, and it is checked whether the designated attribute values are within a range of attribute values set in the attribute table. The copy manager is selected in the user interface as shown in FIG. 83 by the user.

As a result of the check, when even one value is not in the range, in step 5605 a processing to reject the job issuance is performed such as displaying of an error dialog on the user interface, thereby ending the flow. As a result of the check of step 5602, when all the attributes are within the range of the attribute values in the attribute table of the copy manager, in step 5603 it is checked whether there is an inhibited attribute (attribute IDs 801 to 805) in the copy manager attribute table. When the copy manager attribute table has the inhibited attribute, in step 5604 it is checked whether the job attribute designated for each inhibited attribute in the attribute table of the copy manager is a combination of inhibited values. As a check result, when there is a combination of inhibited attribute values, in step 5605 the processing to reject the job issuance is performed to end the flow. When as a result of the check of step 5603 the manager has no inhibited attribute, and when as a result of the check of step 5604 the job attribute is not a combination of inhibited values, in step 5606 the job script is generated and issued, thereby ending the flow. The copy job manager of the multi-function peripheral 201 which has received the job script performs the processing shown in FIGS. 53, 54, 57, and manages the instructed job.

(Issuance of Job Management Command)

FIG. 53 is a processing flow when the job management utility 512 issues a job management command. In step 5701 the service ID of the target manager is used as the parameter to obtain the job table (FIG. 20) retained by the manager from MFP 201. In step 5702, the job ID owned by the management target job is selected from the job list included in the obtained job table in an appropriate method. Selecting means includes a method which comprises displaying the job list on the display 6003 via the user interface 501 so that the user selects the job ID, and other methods. In step 5703 the designated job ID is used as the parameter to generate the command for managing the job, and the command is issued, thereby ending the flow. Supervisor of the multi-function peripheral 201 which has received the job management command performs the processing shown in FIGS. 47 to 51 and 60, and manages the instructed job.

Additionally, the present invention may be applied to a system constituted of a copying machine, a printer, a scanner, and other single units, or may be applied to a device constituted of one apparatus (e.g., a copying machine, a facsimile device, and the like). Moreover, the object of the present invention is attained by providing the system with the storage medium (FIGS. 76, 77) in which the program code of software (control program) for realizing the above-described embodiment function is recorded as shown in FIG. 2, and reading and executing the program code stored in the storage medium by the device of the system (CPU 301 or CPU 6001). As a method of providing Client PC with the program or data shown in FIG. 77, a method of providing PC body 7001 with floppy disc FD 7000 with the program stored therein as shown in FIG. 78 is also general. In this case, the program code itself read from the storage medium realizes the function of the above-described embodiment, and the storage medium in which the program code is stored constitutes the present invention.

As the storage medium for supplying the program code, for example, in addition to the floppy disc or the hard disc, an optical disc, an optical magnetic disc, CD-ROM, CD-R, a magnetic tape, a nonvolatile memory card, ROM, and the like can be used. Moreover, by executing the program code read by the computer, the function of the above-mentioned embodiment is realized, but additionally, based on the instruction of the program code, OS (operating system) operating on the computer, and the like perform a part or the whole of the actual processing. Needless to say, by the processing the function of the above-mentioned embodiment is also realized. Furthermore, after the program code read from the storage medium is written in a memory mounted on a function expansion board inserted into the computer or a function expansion unit connected to the computer, based on the instruction of the program code, the CPU, and the like mounted on the function expansion board or the function expansion unit perform a part or the whole of the actual processing. Needless to say, by the processing the function of the above-mentioned embodiment is also realized.

Figure 79:
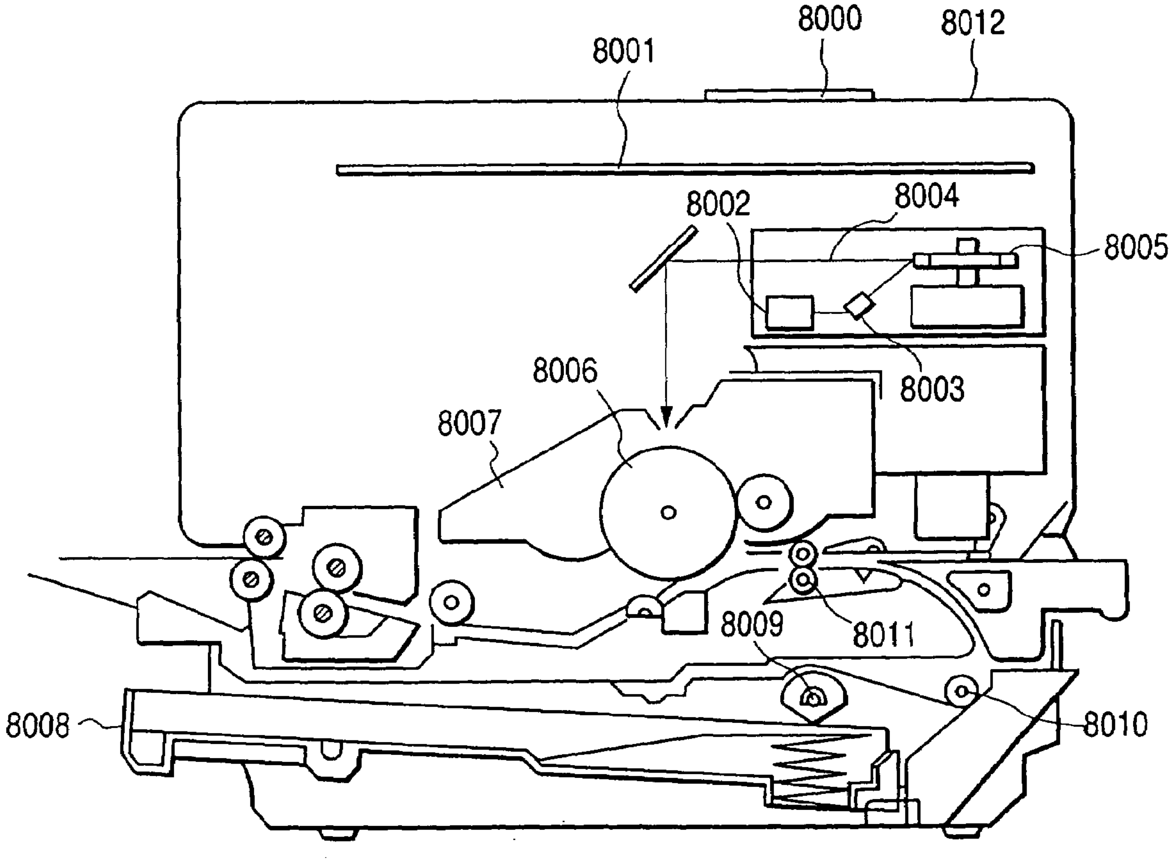
FIG. 79 is a diagram showing LBP applicable to a laser beam printer engine of MFP.

FIG. 79 is a sectional view showing an inner structure of a laser beam printer (hereinafter abbreviated as LBP) which can be applied to the laser beam printer engines 103 and 104 of FIG. 1, and the LBP can perform printing on a recording sheet by the input of character pattern data, and the like. In FIG. 79, LBP body 8012 forms an image on the recording sheet as recording medium based on the supplied character pattern, and the like. Numeral 8000 denotes an operation panel on which an operating switch, LED display, and the like are arranged, and 8001 denotes a printer control unit which entirely controls LBP 8012 and analyzes the character pattern information, and the like. The printer control unit 8001 mainly converts the character pattern information into a video signal and transmits an output to a laser driver 8002. The laser driver 8002 is a circuit for driving a semiconductor laser 8003, and switches on or off a laser beam 8004 emitted from the semiconductor laser 8003 in response to the entered video signal. The laser beam 8004 is swung horizontally by a rotating polygonal mirror 8005 to scan on an electrostatic drum 8006. Thereby, an electrostatic latent image of a character pattern is formed on the electrostatic drum 8006. After the latent image is developed by a developing unit 8007 around the electrostatic drum 8006, the image is transferred to the recording sheet. In the recording sheets, cut sheets are used, and the cut recording sheets are stored in a plurality of sheet cassettes 8008 attached to LBP 8012 for accommodating a plurality of types of sheets. The sheets are taken into the apparatus by a sheet feed roller 8009 and conveying rollers 8010 and 8011, and supplied to the electrostatic drum 8006.

Figure 80:
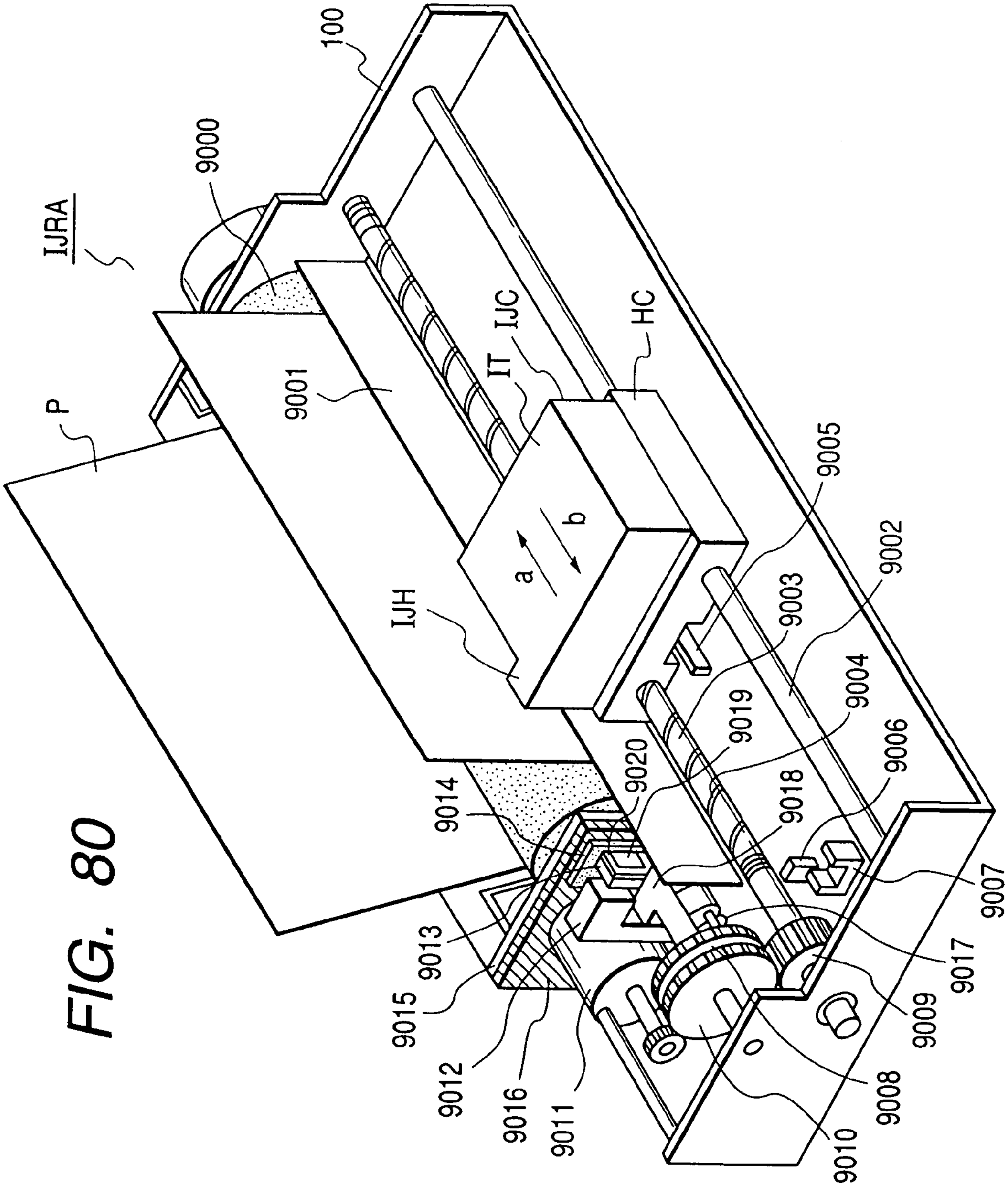
FIG. 80 is a diagram showing IJRA applicable to an ink jet printer engine of MFP.

FIG. 80 is a diagrammatic view of an ink jet recording apparatus IJRA which can be applied to the ink jet printer engine 105 of FIG. 1. In the drawing, a carriage HC is engaged in a spiral groove 9003 of a lead screw 9004 rotating via drive force transmission gears 9010, 9008 with forward/reverse rotation of a drive motor 9011, has a pin (not shown), and is reciprocated/moved in directions of arrows a, b. On the carriage HC, an ink jet cartridge IJC is mounted. A sheet press plate 9001 presses the sheet against a platen 9000 over a moving direction of the carriage. Photo-couplers 9006, 9007 are home position detecting means which confirm the presence of a carriage lever 9005 in this area and switch a rotating direction of the motor 9011. A member 9013 supports a cap member 9019 for capping a front surface of a recording head, and suction means 9012 for sucking the inside of the cap performs suction recovering of the recording head via an opening 9020 inside the cap. A cleaning blade 9014, and a member 9016 which can move the blade back and forth are supported by a body support plate 9015. The blade is not limited to this form, and needless to say, a known cleaning blade can be applied to the example. Moreover, a lever 9018 starts suction for the suction recovering, and moves as a cam 9017 engaged with the carriage moves. The movement is controlled by controlling a drive force from the drive motor by a known transmission means such as a clutch switchover, and the like. For the capping, cleaning, and suction recovering operations, when the carriage reaches an area on the side of the home position, a desired operation can be performed in the corresponding position by action of the lead screw 9004. By performing the desired operation at a known timing, the operations can be applied in the example.

As described above, according to the embodiment, by using the logical device control program (scan job manager 419, print job managers 501 to 509, copy job managers 601 to 608) retaining the function of the logical device to which the job is transmitted from the information processing apparatus and managing the job transmitted to the logical device, and the physical device control program (scanner controller 420, LBP controllers 510, 511, Ink Jet controller 512) retaining the function of the device engine of the peripheral and managing the job in the device engine, the job can be analyzed.

Here, the physical device control program is a scanner control program (scanner controller 420) which controls the scanner engine of the peripheral. The physical device control program is a laser beam printer control program (LBP controllers 510, 511) which controls the laser beam printer engine of the peripheral. The physical device control program is an ink jet printer control program (Ink Jet printer controller 512) which controls the ink jet printer engine of the peripheral. Moreover, the logical device control program is a print job control program (print job managers 501 to 509) which controls the laser beam printer control program, or the ink jet printer control program, or the laser beam printer control program and the ink jet printer control program of the peripheral. Furthermore, the logical device control program is a scanner job control program (scan job manager 419) which controls the scanner control program of the peripheral. Additionally, the logical device control program is a copy job control program (copy job managers 601 to 608) which controls the scanner control program and laser beam printer control program, or the ink jet printer control program, or the laser beam printer control program and ink jet printer control program of the peripheral.

By the configuration, the logical device control program can retain a relation with at least one device engine which is used by the logical device to execute the job. Moreover, based on the job transmitted to the logical device, the device engine to be used for actually executing the job can be determined. Moreover, the function retained by the logical device control program can be changed. The job transmitted to the logical device can be associated with the job managed by the physical device which actually executes the job, and managed. Additionally, there are a plurality of logical device control programs, and by comparing load states of a plurality of logical device control programs, an optimum logical device control program can be selected. Moreover, there are provided a plurality of logical device control programs and a general program (Supervisor 410) which administers the plurality of logical device control programs. In the general program, the subaddress and connection interface type used in transmitting the job to the logical device control program can be associated with the logical device control program and retained. Moreover, the general program retains a list of information indicating whether the subaddress is valid or invalid. When the job is transmitted to the invalid subaddress, the job can be canceled. Furthermore, the general program retains a list of usable user authentication information, and can notify a job error when the user information included in the entered job is not included in the list of the authentication information. Additionally, the general program can retain the list of security levels indicating types of authentication judgment processings of users who can use the program. Moreover, the logical device control program can retain a list of connection interfaces and transmission addressees for transmitting event data to the information processing apparatus when the event occurs during the job analysis. Furthermore, in the logical device control program, when the event occurs during the job analysis, by referring to the list of connection interfaces and transmission addressees for the transmission to the information processing apparatus, the event data can be transmitted.

Moreover, as described above, according to the present invention, in accordance with the function (attribute value) obtained from the peripheral, the user interface of the control program for controlling the peripheral can automatically be formed (step 4813). Furthermore, the display (FIGS. 81, 82) of the user interface for the peripheral can be controlled in accordance with the obtained function. Additionally, the information (attribute value) concerning the setting range of the function of the peripheral can be obtained. Moreover, the information concerning the setting range is represented by the combination of job-setting inhibited attributes (attribute IDs 801 to 805). Furthermore, the information (attribute value) concerning the function choices of the peripheral can be obtained. When the attribute list (attribute table) indicating the functions of the peripheral is obtained from the peripheral, and the attribute ID of the attribute list is designated, the attribute value can be obtained. Moreover, the attribute list (attribute table) indicating the functions of the physical device control program, logical device control program, resource control program and general control program for generalizing the programs of the peripheral can be obtained from the peripheral. Furthermore, the physical device control program is the scanner control program for controlling the scanner engine of the peripheral. Additionally, the physical device control program is the laser beam printer control program for controlling the laser beam printer engine of the peripheral. Moreover, the physical device control program is the ink jet printer control program for controlling the ink jet printer engine of the peripheral. Furthermore, the logical device control program is the print job control program for controlling the laser beam printer control program, the ink jet printer control program, or the laser beam printer control program and ink jet printer control program of the peripheral. Additionally, the logical device control program is the scanner job control program for controlling the scanner control program of the peripheral. Moreover, the logical device control program is the copy job control program for controlling the scanner control program and laser beam printer control program, or the ink jet printer control program, or the laser beam printer control program and ink jet printer control program of the peripheral. Furthermore, the resource control program is the font control program for managing the font of the peripheral. Additionally, the resource control program is the form overlay control program for managing the form overlay of the peripheral. Moreover, the resource control program is the log control program for managing the log of the peripheral. Furthermore, the resource control program is the color profile control program for managing the color profile.

Moreover, as described above, according to the embodiment, by judging based on the function obtained from the peripheral (MFP 201) whether the job script can be issued to the peripheral (steps 5402 to 5404, 5502 to 5504, 5602 to 5604), the job issuance processing can be controlled in accordance with the judgment result.

Here, the attribute list (attribute table) indicating the functions of the physical device control program, logical device control program, resource control program (font manager 413, form overlay manager 414, log manager 415, color profile manager 416) and general program for generalizing the programs of the peripheral is obtained from the peripheral. Moreover, the combination of attributes in which the job setting is inhibited (attribute IDs 801 to 805) is obtained. Furthermore, the download job or the print job is issued to the peripheral. Additionally, the upload job or the scan job is issued to the peripheral. Moreover, the job issuance method is selected in accordance with the attribute (attribute ID 601) indicating the supported download method of the obtained function and the location of job issuance target data. Furthermore, the job issuance method is selected in accordance with the attribute (attribute ID 602) indicating the supported upload method of the obtained function and the stored position of job issuance target data. Additionally, the job issuance target data is print document data. Moreover, the job issuance target data is scan document data. Furthermore, the job issuance target data is font data. Additionally, the job issuance target data is form overlay data. Moreover, the job issuance target data is color profile data. Furthermore, the job issuance target data is log data. Additionally, the job issuance target data is font data. Moreover, the event format data for the event received from the peripheral is obtained, and the received event is analyzed based on the event format data. Furthermore, the log data of the peripheral and the log format data of the log data are obtained, and the log data is analyzed based on the log format data. Additionally, the charge data (count data) of the peripheral and the format data of the charge data are obtained, and the charge data is analyzed based on the charge format data.

Effect of the Invention

As described above, according to the present invention, it is judged based on the function obtained from the peripheral whether or not the job script can be issued to the peripheral, and the job issuance processing can be controlled in accordance with the judgment result. The attribute list indicating the functions of the physical device control program, logical device control program, resource control program and general program for generalizing the programs of the peripheral can be obtained from the peripheral. Moreover, the combination of attributes in which the job setting is inhibited can be obtained. Furthermore, the download job or the print job can be issued to the peripheral. Additionally, the upload job or the scan job can be issued to the peripheral. Moreover, the job issuance method can be selected in accordance with the attribute indicating the supported download method of the obtained function and the location of job issuance target data. Furthermore, the job issuance method can be selected in accordance with the attribute indicating the supported upload method of the obtained function and the storage position of job issuance target data. Additionally, the job issuance target data is print document data. Moreover, the job issuance target data is scan document data. Furthermore, the job issuance target data is font data. Additionally, the job issuance target data is form overlay data. Moreover, the job issuance target data is color profile data. Furthermore, the job issuance target data is log data. Additionally, the job issuance target data is font data. Moreover, the event format data for the event received from the peripheral is obtained, and the received event can be analyzed based on the event format data. Furthermore, the log data of the peripheral and the log format data of the log data are obtained, and the log data can be analyzed based on the log format data. Additionally, the charge data (count data) of the peripheral and the format data of the charge data are obtained, and the charge data can be analyzed based on the charge format data.

What is claimed is:

1. A peripheral device for providing a plurality of services based on a job, said peripheral device comprising:

a job management unit adapted to manage, for each service of the plurality of services, function information indicating a function of a controller providing that service in correspondence with that service;

an input unit adapted to input a job that requests a service;

a recognition unit adapted to recognize a job start command or a job end command;

a first specifying unit adapted to specify a service of the plurality of services, in accordance with the job inputted by said input unit, in response to a recognition of the job start command by said recognition unit;

a second specifying unit adapted to specify function information indicating a function of the controller providing the service specified by said first specifying unit based on the function information managed by said job management unit; and an execution unit adapted to execute a process related to the specified service based on the function information specified by said second specifying unit, wherein the plurality of services includes a print service and a scan service.

2. A peripheral device according to claim 1, further comprising a transmission unit adapted to transmit information on a method of accessing the plurality of services to an external apparatus.

3. A multi-function peripheral device for providing a copy service based on a job, said device comprising:

a job managing unit adapted to manage controller identification information indicating a printer controller and a scanner controller in correspondence with the copy service, wherein the controller identification information includes a controller ID;

an input unit adapted to input a job that requests the copy service;

a specifying unit adapted to specify the printer controller and the scanner controller that provide the copy service requested by the job inputted by said input unit by referring to the controller identification information managed by said job managing unit; and an execution unit adapted to execute a process related to the copy service using the printer controller and the scanner controller specified by said specifying unit based on the job inputted by said input unit.

4. A device according to claim 3, wherein said execution unit issues a scan job based on the inputted job to cause the specified scanner controller to execute a scan process, issues a print job to cause the printer controller to execute a print process in response to completion of the scan process by the scanner controller, and deletes information on the print job in response to completion of the print process by the printer controller.

5. A method carried out in a peripheral device for providing a plurality of services based on a job, said method comprising:

a job management step of managing, for each service of the plurality of services, function information indicating a function of a controller providing that service in correspondence with that service;

an input step of inputting a job that requests a service;

a recognition step of recognizing a job start command or a job end command;

a first specification step of specifying a service of the plurality of services, in accordance with the job inputted in said input step, in response to a recognition of the job start command in said recognition step;

a second specification step of specifying function information indicating a function of the controller providing the service specified in said first specification step based on the function information managed in said job management step; and an execution step of executing a process related to the specified service based on the function information specified in said second specification step, wherein the plurality of services includes a print service and a scan service.

6. A method according to claim 5, further comprising a transmission step of transmitting information on a method of accessing the plurality of services to an external apparatus.

7. A method carried out in a multi-function peripheral device for providing a copy service based on a job, said method comprising:

a job management step of managing controller identification information indicating a printer controller and a scanner controller in correspondence with the copy service, wherein the controller identification information includes a controller ID;

an input step of inputting a job that requests the copy service;

a specification step of specifying the printer controller and the scanner controller that provide the copy service requested by the job inputted in said input step by referring to the controller identification information managed in said job management step; and an execution step of executing a process related to the copy service using the printer controller and the scanner controller specified in said specification step based on the job inputted in said input step.

8. A method according to claim 7, wherein said execution step includes issuing a scan job based on the inputted job to cause the specified scanner controller to execute a scan process, issuing a print job to cause the printer controller to execute a print process in response to completion of the scan process by the scanner controller, and deleting information on the print job in response to completion of the print process by the printer controller.

9. A storage medium storing a computer-readable program for implementing a method carried out in a peripheral device for providing a plurality of services based on a job, wherein the method comprises:

a job management step of managing, for each service of the plurality of services, function information indicating a function of a controller providing that service in correspondence with that service;

an input step of inputting a job that requests a service;

a recognition step of recognizing a job start command or a job end command;

a first specification step of specifying a service of the plurality of services, in accordance with the job inputted in said input step, in response to a recognition of the job start command in said recognition step;

a second specification step of specifying function information indicating a function of the controller providing the service specified in said first specification step based on the function information managed in said job management step; and an execution step of executing a process related to the specified service based on the function information specified in said second specification step, wherein the plurality of services includes a print service and a scan service.

10. A storage medium storing a computer-readable program for implementing a method carried out in a multi-function peripheral device for providing a copy service based on a job, wherein the method comprises:

a job management step of managing controller identification information indicating a printer controller and a scanner controller in correspondence with the copy service, wherein the controller identification information includes a controller ID;

an input step of inputting a job that requests the copy service;

a specification step of specifying the printer controller and the scanner controller that provide the copy service requested by the job inputted in said input step by referring to the controller identification information managed in said job management step; and an execution step of executing a process related to the copy service using the printer controller and the scanner controller specified in said specification step based on the job inputted in said input step.

11. A computer program product embodying a program for implementing a method carried out in a peripheral device for providing a plurality of services based on a job, wherein the method comprises:

a job management step of managing, for each service of the plurality of services, function information indicating a function of a controller providing that service in correspondence with that service;

an input step of inputting a job that requests a service;

a recognition step of recognizing a job start command or a job end command;

a first specification step of specifying a service of the plurality of services, in accordance with the job inputted in said input step, in response to a recognition of the job start command in said recognition step;

a second specification step of specifying function information indicating a function of the controller providing the service specified in said first specification step based on the function information managed in said job management step; and an execution step of executing a process related to the specified service based on the function information specified in said second specification step, wherein the plurality of services includes a print service and a scan service.

12. A computer program product embodying a program for implementing a method carried out in a multi-function peripheral device for providing a copy service based on a job, wherein the method comprises:

a job management step of managing controller identification information indicating a printer controller and a scanner controller in correspondence with the copy service, wherein the controller identification information includes a controller ID;

an input step of inputting a job that requests the copy service;

a specification step of specifying the printer controller and the scanner controller that provide the copy service requested by the job inputted in said input step by referring to the controller identification information managed in said job management step; and an execution step of executing a process related to the copy service using the printer controller and the scanner controller specified in said specification step based on the job inputted in said input step.

* * * * *

UNITED STATES PATENT AND TRADEMARK OFFICE

CERTIFICATE OF CORRECTION

PATENT NO. : 7,167,253 B2
APPLICATION NO. : 10/650704
DATED : January 23, 2007
INVENTOR(S) : Tomoaki Endoh et al.

It is certified that error appears in the above-identified patent and that said Letters Patent is hereby corrected as shown below:

COLUMN 2:
Line 60, “skin” should read --scan--.

Signed and Sealed this

Thirtieth Day of October, 2007

JON W. DUDAS
*Director of the United States Patent and Trademark Office*